United States Patent
Sinha et al.

(10) Patent No.: US 11,544,187 B2
(45) Date of Patent: Jan. 3, 2023

(54) IO REDIRECTION METHODS WITH COST ESTIMATION

(71) Applicant: Samsung Electronics Co., Ltd., Suwon-si (KR)

(72) Inventors: Vikas K. Sinha, Sunnyvale, CA (US); Gunneswara Rao Marripudi, Fremont, CA (US); Jianjian Huo, San Jose, CA (US); Ajit Yagaty, Santa Clara, CA (US)

(73) Assignee: SAMSUNG ELECTRONICS CO., LTD.

( * ) Notice: Subject to any disclaimer, the term of this patent is extended or adjusted under 35 U.S.C. 154(b) by 161 days.

(21) Appl. No.: 16/911,391

(22) Filed: Jun. 24, 2020

(65) Prior Publication Data

US 2020/0364141 A1 Nov. 19, 2020

Related U.S. Application Data

(63) Continuation of application No. 15/336,772, filed on Oct. 27, 2016, now abandoned, which is a
(Continued)

(51) Int. Cl.
*G06F 12/02* (2006.01)
*G06F 3/06* (2006.01)

(52) U.S. Cl.
CPC .......... *G06F 12/0253* (2013.01); *G06F 3/061* (2013.01); *G06F 3/065* (2013.01);
(Continued)

(58) Field of Classification Search
CPC ........ G06F 3/061; G06F 3/0635; G06F 3/065; G06F 3/067; G06F 12/0253; G06F 2212/702
See application file for complete search history.

(56) References Cited

U.S. PATENT DOCUMENTS 5,530,850 A 6/1996 Ford et al.
5,854,941 A * 12/1998 Ballard ................ G11B 27/105
710/5

(Continued)

OTHER PUBLICATIONS

Lee, "Preemptible I/O Scheduling of Garbage Collection for Solid State Drives," in IEEE Transactions on Computer-Aided Design of Integrated Circuits and Systems, vol. 32, No. 2, pp. 247-260, Feb. 2013 (Year: 2013).*

(Continued)

*Primary Examiner* — Ramon A. Mercado
(74) *Attorney, Agent, or Firm* — Renaissance IP Law Group LLP

(57) ABSTRACT

A distributed storage system node is disclosed. The distributed storage system node may include at least one storage device, which may act as the primary replica for data subject to an Input/Output (I/O) request. A cost analyzer may calculate a local estimated time required to complete the I/O request at the primary replica, and a remote estimated time required to complete the I/O request at a secondary replica of the data. An I/O redirector may direct the I/O request to either the primary replica or the secondary replica based on the local estimated time required and the one remote estimated time required.

21 Claims, 43 Drawing Sheets

Related U.S. Application Data continuation-in-part of application No. 15/046,435, filed on Feb. 17, 2016, now Pat. No. 10,254,998.

(60) Provisional application No. 62/394,724, filed on Sep. 14, 2016, provisional application No. 62/250,421, filed on Nov. 3, 2015.

(52) U.S. Cl.
CPC ............ *G06F 3/067* (2013.01); *G06F 3/0635* (2013.01); *G06F 2212/702* (2013.01)

(56) References Cited

U.S. PATENT DOCUMENTS

| | | | |
|---|---|---|---|
| 5,857,210 A | 1/1999 | Tremblay et al. | |
| 5,870,537 A * | 2/1999 | Kern ................ | G06F 11/2064 |
| | | | 714/E11.085 |
| 7,006,512 B2 * | 2/2006 | Yang ................ | H04L 47/50 |
| | | | 370/413 |
| 7,743,276 B2 | 6/2010 | Jacobson et al. | |
| 8,499,132 B1 * | 7/2013 | Pasupathy ............ | G06F 3/0631 |
| | | | 711/170 |
| 8,521,972 B1 | 8/2013 | Boyle et al. | |
| 8,527,544 B1 | 9/2013 | Colgrove et al. | |
| 8,560,759 B1 | 10/2013 | Boyle et al. | |
| 8,713,268 B2 | 4/2014 | Dillow et al. | |
| 8,788,778 B1 | 7/2014 | Boyle | |
| 8,886,691 B2 | 11/2014 | Colgrove et al. | |
| 9,009,322 B1 * | 4/2015 | Molleti ................ | H04L 45/125 |
| | | | 709/224 |
| 9,229,854 B1 | 1/2016 | Kuzmin et al. | |
| 9,317,435 B1 * | 4/2016 | Bairavasundaram ......... | |
| | | | G06F 12/0848 |
| 9,612,852 B1 * | 4/2017 | Benameur ............ | G06F 9/45533 |
| 9,846,704 B2 * | 12/2017 | Shvachko ............. | G06F 16/182 |
| 2002/0152374 A1 * | 10/2002 | Mayfield ................ | G06F 9/505 |
| | | | 713/153 |
| 2005/0021915 A1 * | 1/2005 | Lowe ................ | G06F 3/067 |
| | | | 711/170 |
| 2005/0108414 A1 * | 5/2005 | Taylor ................ | H04L 67/06 |
| | | | 709/231 |
| 2006/0212746 A1 * | 9/2006 | Amegadzie ............ | G06F 16/185 |
| | | | 707/E17.01 |
| 2008/0140932 A1 * | 6/2008 | Flynn ................ | G06F 3/0613 |
| | | | 711/E12.04 |
| 2010/0077136 A1 | 3/2010 | Ware et al. | |
| 2010/0318584 A1 | 12/2010 | Krishnaprasad et al. | |
| 2011/0047356 A2 | 2/2011 | Flynn et al. | |
| 2011/0145475 A1 | 6/2011 | Eleftheriou et al. | |
| 2012/0036309 A1 | 2/2012 | Dillow et al. | |
| 2012/0286995 A1 * | 11/2012 | Elwell, Jr. ............. | G04R 20/02 |
| | | | 342/357.62 |
| 2013/0042083 A1 * | 2/2013 | Mutalik ................ | G06F 3/067 |
| | | | 711/E12.103 |
| 2013/0086147 A1 * | 4/2013 | Kashyap ................ | H04L 67/10 |
| | | | 709/203 |
| 2013/0159815 A1 | 6/2013 | Jung et al. | |
| 2013/0173954 A1 | 7/2013 | Woo et al. | |
| 2013/0198562 A1 * | 8/2013 | Anthonisamy ..... | G06F 11/2005 |
| | | | 714/6.21 |
| 2013/0232310 A1 | 9/2013 | Kruus | |
| 2014/0180889 A1 * | 6/2014 | Rooney ............... | H04L 43/0858 |
| | | | 705/37 |
| 2014/0201477 A1 * | 7/2014 | Greenfield ............ | G06F 3/0604 |
| | | | 711/158 |
| 2014/0215129 A1 | 7/2014 | Kuzmin et al. | |
| 2014/0358479 A1 * | 12/2014 | Nazari ................ | G06F 3/0605 |
| | | | 702/183 |
| 2014/0379965 A1 | 12/2014 | Gole et al. | |
| 2015/0026514 A1 | 1/2015 | Benhase et al. | |
| 2015/0046668 A1 * | 2/2015 | Hyde, II ................ | G06F 12/00 |
| | | | 711/162 |
| 2015/0222705 A1 | 8/2015 | Stephens | |
| 2015/0277762 A1 * | 10/2015 | Guo ................ | G06F 3/0653 |
| | | | 711/154 |
| 2015/0347025 A1 | 12/2015 | Law | |
| 2015/0347245 A1 * | 12/2015 | Andre ................ | G06F 11/008 |
| | | | 714/6.3 |
| 2016/0011815 A1 | 1/2016 | Klein | |
| 2016/0080490 A1 | 3/2016 | Verma et al. | |
| 2016/0112512 A1 * | 4/2016 | Jibbe ................ | H04L 45/30 |
| | | | 709/219 |
| 2016/0124847 A1 | 5/2016 | Malwankar et al. | |
| 2016/0139820 A1 * | 5/2016 | Fluman ................ | G06F 3/061 |
| | | | 711/114 |
| 2016/0179410 A1 | 6/2016 | Haas et al. | |
| 2016/0306822 A1 | 10/2016 | Waghulde | |
| 2016/0378339 A1 * | 12/2016 | Andre ................ | G06F 3/0689 |
| | | | 711/114 |
| 2017/0046256 A1 | 2/2017 | Horspool et al. | |
| 2017/0052719 A1 | 2/2017 | Boitei | |
| 2017/0123700 A1 * | 5/2017 | Sinha ................ | G06F 3/061 |
| 2020/0364141 A1 * | 11/2020 | Sinha ................ | G06F 3/061 |

OTHER PUBLICATIONS

Lee, Junghee et al., "Preemptible I/O Scheduling of Garbage Collection for Solid State Drives," IEEE Transactions on Computer-Aided Design of Integrated Circuits and Systems, vol. 32, No. 2, Feb. 2013, pp. 247-260.

Final Office Action for U.S. Appl. No. 15/046,435, dated Sep. 10, 2018.

Final Office Action for U.S. Appl. No. 15/336,772, dated Mar. 20, 2020.

J. Lee, Y. Kim, G. M. Shipman, S. Oral and J. Kim, "Preemptible 1/0 Scheduling of Garbage Collection for Solid State Drives," in IEEE Transactions on Computer-Aided Design of Integrated Circuits and Systems, vol. 32, No. 2, pp. 247-260, Feb. 2013. (Year: 2013).

Notice of Allowance for U.S. Appl. No. 15/046,435, dated Nov. 29, 2018.

Office Action for U.S. Appl. No. 15/046,435, dated Sep. 11, 2017.
Office Action for U.S. Appl. No. 15/336,772, dated Aug. 22, 2019.

* cited by examiner

| | Map | | |
|---|---|---|---|
| | Count | Location 1 | Location 2 | Location 3 |
| A, 0 _1403_ | 3 _1415_ | 0, 0x100000 _1427_ | 1, 0x200000 _1430_ | 2, 0x100000 _1433_ |
| A, 1 _1406_ | 3 _1418_ | 0, 0x101000 _1436_ | 1, 0x202000 _1439_ | 3, 0x100000 _1442_ |
| A, 2 _1409_ | 3 _1421_ | 0, 0x102000 _1445_ | 1, 0x203000 _1448_ | 3, 0x101000 _1451_ |
| B, 0 _1412_ | 2 _1424_ | 1, 0x100000 _1454_ | 2, 0x101000 _1457_ | _1460_ |
| ... | ... | ... | ... | |

FIG. 14

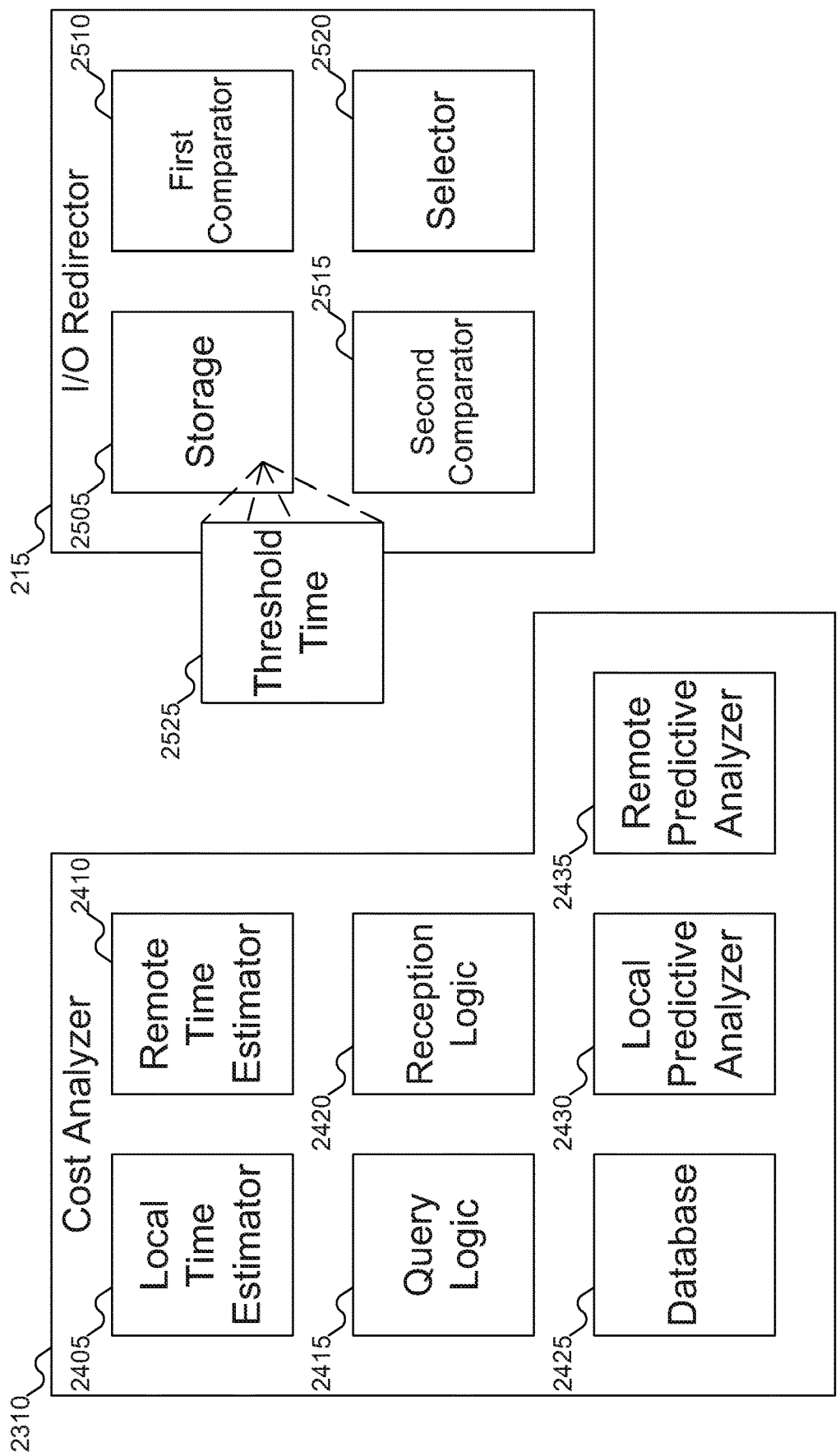

| Database | | |
|---|---|---|
| Historical local GC information 3105 | Worst case local GC 3110 | Average case local GC 3115 |
| Historical processing time information 3120 | Worst case processing time 3125 | Average case processing time 3130 |
| Historical comm. time 3135 | Worst case comm. time 3140 | Average case comm. time 3145 |
| Historical remote processor time 3150 | Worst case remote processor time 3155 | Average case remote processor time 3160 |
| Historical remote GC time 3165 | Worst case remote GC time 3170 | Average case remote GC time 3175 |

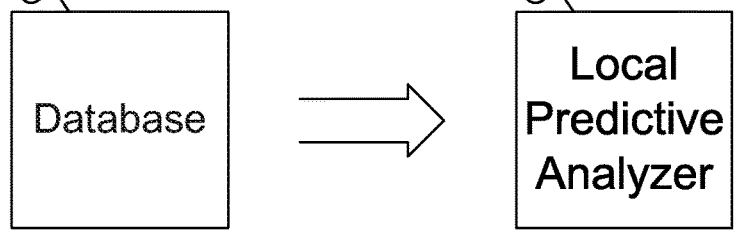

FIG. 32

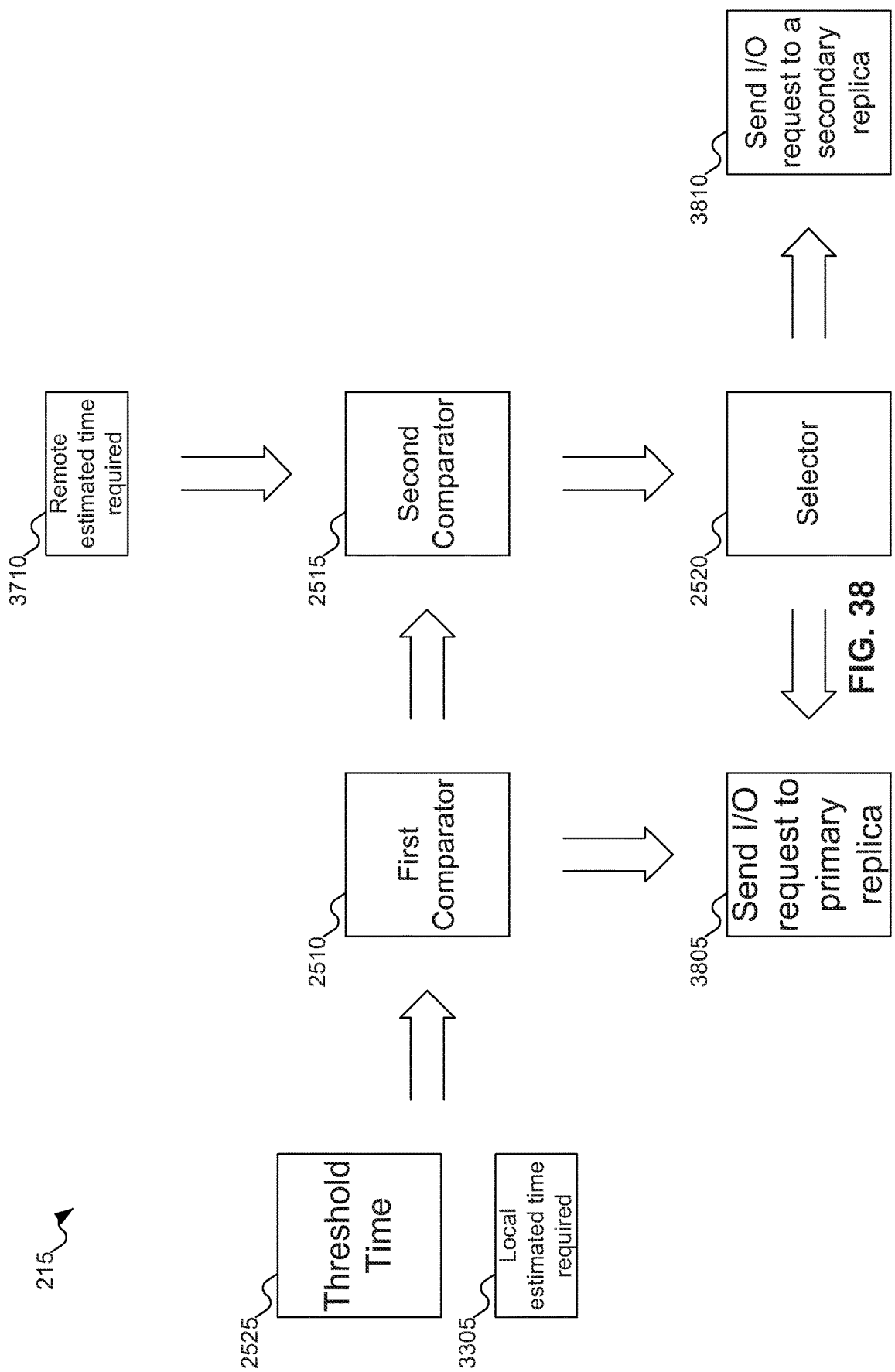

IO REDIRECTION METHODS WITH COST ESTIMATION

RELATED APPLICATION DATA

This application is a continuation of U.S. patent application Ser. No. 15/336,772, filed Oct. 27, 2016, now abandoned, which claims the benefit of U.S. Provisional Patent Application Ser. No. 62/394,724, filed Sep. 14, 2016, both of which are incorporated by reference herein for all purposes.

This application is a continuation of U.S. patent application Ser. No. 15/336,772, now abandoned, which is a continuation-in-part of U.S. patent application Ser. No. 15/046,435, filed Feb. 17, 2016, now U.S. Pat. No. 10,254,998, issued Apr. 9, 2019, which claims the benefit of U.S. Provisional Patent Application Ser. No. 62/250,421, filed Nov. 3, 2015, both of which are hereby incorporated by reference for all purposes.

FIELD

The inventive concepts relate generally to storage, and more particularly to improving Input/Output (I/O) performance where a primary storage device may be delayed.

BACKGROUND

Distributed storage systems such as Ceph, use data replication and/or erasure coding to ensure data availability across drive and storage node failures. Such distributed storage systems may use Solid State Drives (SSDs). SSDs have advantages over more traditional hard disk drives in that data access is faster and not dependent on where data might reside on the drive.

SSDs read and write data in units of a page. That is, to read any data, a whole page is accessed; to write any data, an entire page is written to an available page on the SSD. But when data is written, it is written to a free page: existing data is not overwritten. Thus, as data is modified on the SSD, the existing page is marked as invalid and a new page is written to the SSD. Thus, pages in SSDs have one of three states: free (available for use), valid (storing data), and invalid (no longer storing valid data).

Over time, invalid pages accumulate on the SSD and need to have their states changed to free. But SSDs erase data in units of blocks (which include some number of pages) or superblocks (which include some number of blocks). If the SSD were to wait until all the pages in the erase block or superblock were invalid before attempting to erase a block or superblock, the SSD would likely fill up and reach a state wherein no blocks were free and none could be freed. Thus, recovering invalid pages may involve moving valid pages from one block to another, so that an entire block (or superblock) may be erased.

Erasing blocks or superblocks is time-consuming, relative to the time required to perform reads or writes. Further, part or all of the SSD may be unavailable when a block or superblock is being erased. Thus, it may be important to manage when SSDs perform garbage collection. If all SSDs in a distributed storage system were to perform garbage collection at the same time, for example, no data requests could be serviced, rendering the distributed storage system no better (albeit temporarily) than a system with data stored locally and undergoing garbage collection.

A need remains for a way to minimize the impact of garbage collection operations on a distributed storage system.

BRIEF DESCRIPTION OF THE DRAWINGS

FIG. 14 shows an example of the map of data in FIG. 13, stored in the monitor of FIG. 1.

FIG. 24 shows details of the cost analyzer of FIG. 23.

FIG. 25 shows details of the I/O redirector of FIG. 23.

FIG. 31 shows details of the database of FIG. 24.

FIG. 32 shows details of the local predictive analyzer of FIG. 24.

FIG. 38 shows details of the I/O redirector of FIG. 25.

DETAILED DESCRIPTION

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Figure 1:
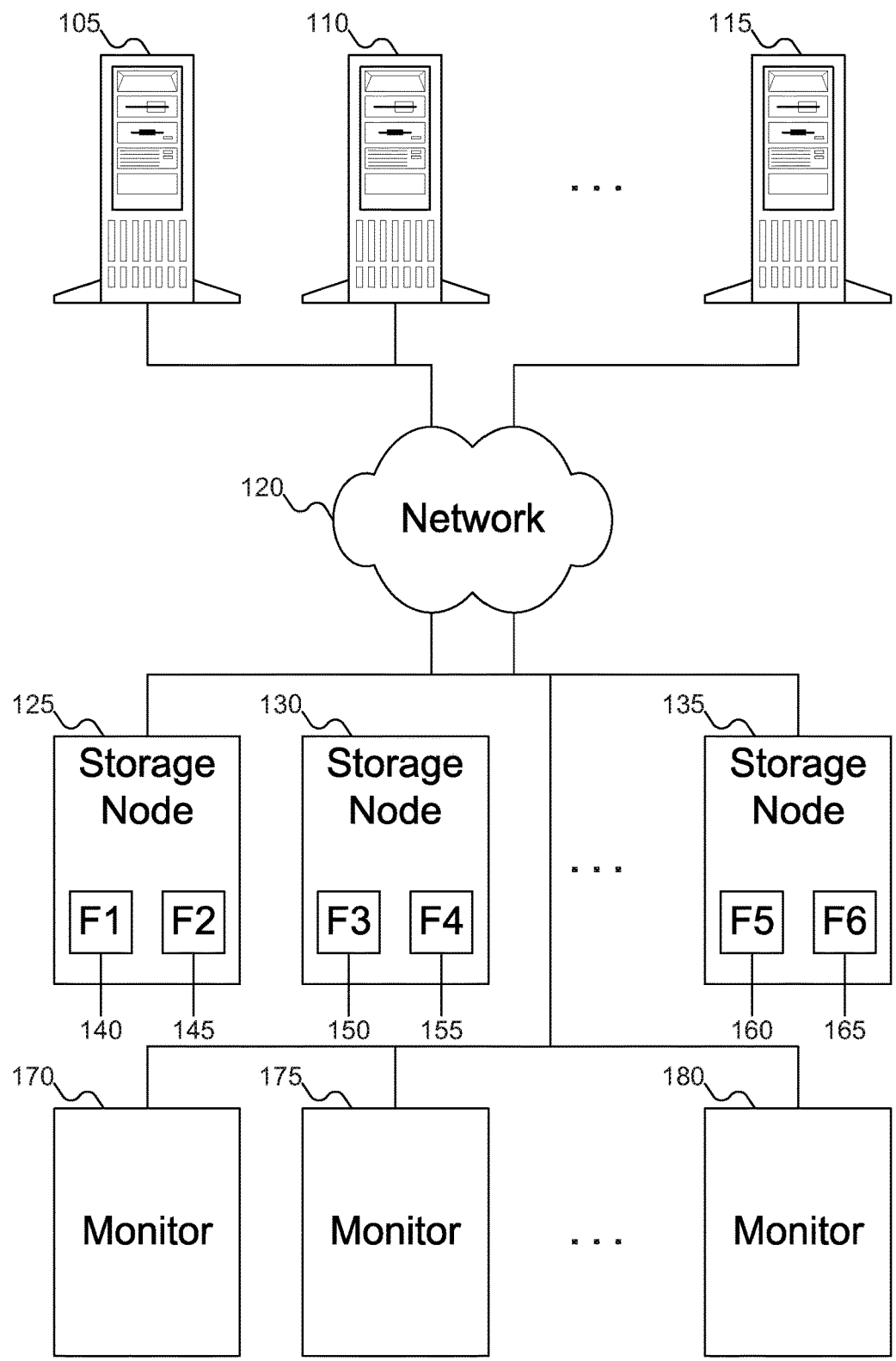
FIG. 1 shows a distributed storage system, according to an embodiment of the inventive concept.

FIG. 1 shows a distributed storage system, according to an embodiment of the inventive concept. In FIG. 1, clients 105, 110, and 115 are shown, in communication with network 120. Clients 105, 110, and 115 may be any desired types of devices, including desktop computers, notebook computers, tablet computers, servers, smartphones, and the like. In addition, while FIG. 1 shows three clients 105, 110, and 115, embodiments of the inventive concept may support any number of clients. Clock synchronization may be maintained across different storage nodes in a storage system using services such as Network Time Protocol.

Network 120 may be any variety of network, including a Local Area Network (LAN), a Wide Area Network (WAN), or a global network, such as the Internet. Network 120 may also include multiple different varieties of networks in combination. For example, network 120 may include multiple LANs that may communicate with each other across a global network using a Virtual Private Network (VPN) to secure the communications.

Also connected to network 120 are storage nodes 125, 130, and 135. Each storage node 125, 130, and 135 provides storage for the distributed network. Each storage node 125, 130, and 135 may include various storage devices, such as flash drives (also called Solid State Drives, or SSDs) 140 and 145 in storage node 125, flash drives 150 and 155 in storage node 130, and flash drives 160 and 165 in storage node 135. Although FIG. 1 shows three storage nodes 125, 130, and 135, embodiments of the inventive concept may support any number of storage nodes. In addition, while FIG. 1 shows each storage node 125, 130, and 135 supporting two flash drives, embodiments of the inventive concept may support any number of flash drives in each storage node 125, 130, and 135. Storage nodes 125, 130, and 135 may also include storage devices of other types, such as traditional hard disk drives, that might or might not benefit from coordinated garbage collection. For example, traditional hard disk drives occasionally require defragmentation to combine scattered portions of files. Defragmentation may be a time-consuming operation, and might benefit from coordination just like garbage collection on flash drives. Storage nodes 125, 130, and 135 may also include variations of SSDs, such as Network Attached SSDs and Ethernet SSDs. Storage nodes 125, 130, and 135 are discussed further with reference to FIGS. 2-3 and 5-12 below.

Also connected to network 120 are monitors (also called monitor nodes) 170, 175, and 180. Monitors 170, 175, and 180 are responsible for keeping track of cluster configuration and notifying entities of changes in the cluster configuration. Examples of such changes may include the addition or subtraction of storage nodes, changes in the availability of storage on the storage nodes (such as the addition or subtraction of a flash drive), and so on. Note that "changes" in this context is not limited to intentional action taken to change the distributed storage system. For example, if a network connection goes down, taking storage node 125 out of the distributed storage system, that action changes the cluster configuration in a manner that would be processed by monitors 170, 175, and 180, even though the storage node might still be operating and attempting to communicate with the rest of the distributed storage system. Monitors 170, 175, and 180 are discussed further with reference to FIGS. 4, 8, and 13 below.

While the rest of the discussion below focuses on SSDs, embodiments of the inventive concept may be applied to any storage devices that implement garbage collection in a manner similar to SSDs. Any reference to SSD below is also intended to encompass other storage devices that perform garbage collection.

Figure 2:
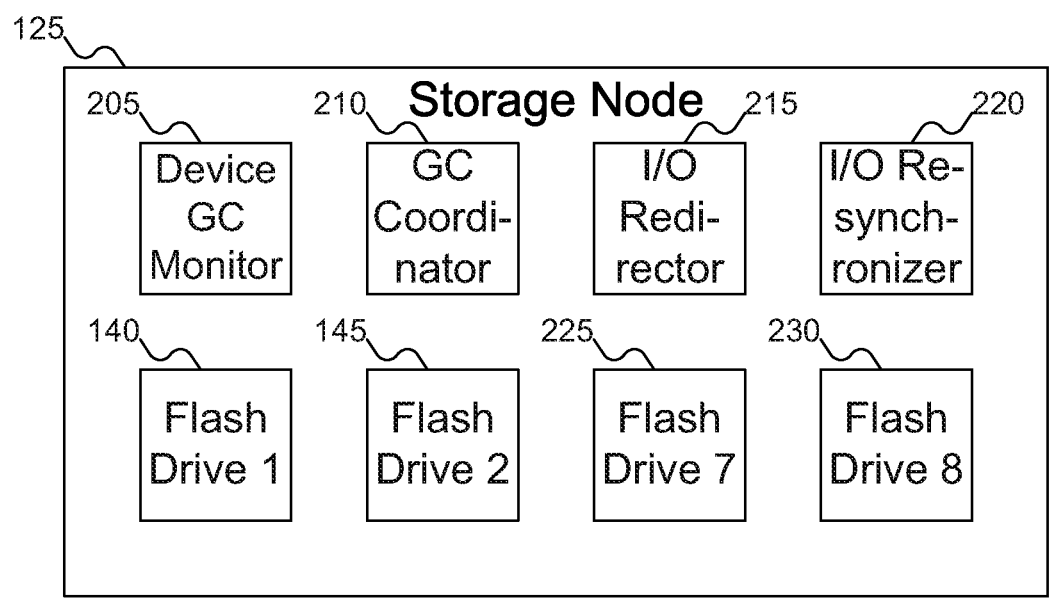
FIG. 2 shows details of the storage node of FIG. 1.

FIG. 2 shows details of storage node 125 of FIG. 1. In FIG. 2, storage node 125 is shown in detail; storage nodes 130 and 135 may be similar. Storage node 125 is shown as including device garbage collection monitor 205, garbage collection coordinator 210, Input/Output (I/O) redirector 215, I/O resynchronizer 220, and four flash drives 140, 145, 225, and 230. Device garbage collection monitor 205 may determine which flash drives need to perform garbage collection, and may estimate how long a flash drive will require to perform garbage collection. Garbage collection coordinator 210 may communicate with one or more of monitors 170, 175, and 180 of FIG. 1 to schedule garbage collection for the selected flash drive, and may instruct the selected flash drive when to perform garbage collection and how long the selected flash drive has for garbage collection. I/O redirector 215 may redirect read and write requests destined for the selected flash drive while it is performing garbage collection. And I/O resynchronizer 220 may bring the flash drive up to date with respect to data changes after garbage collection has completed.

Figure 3:
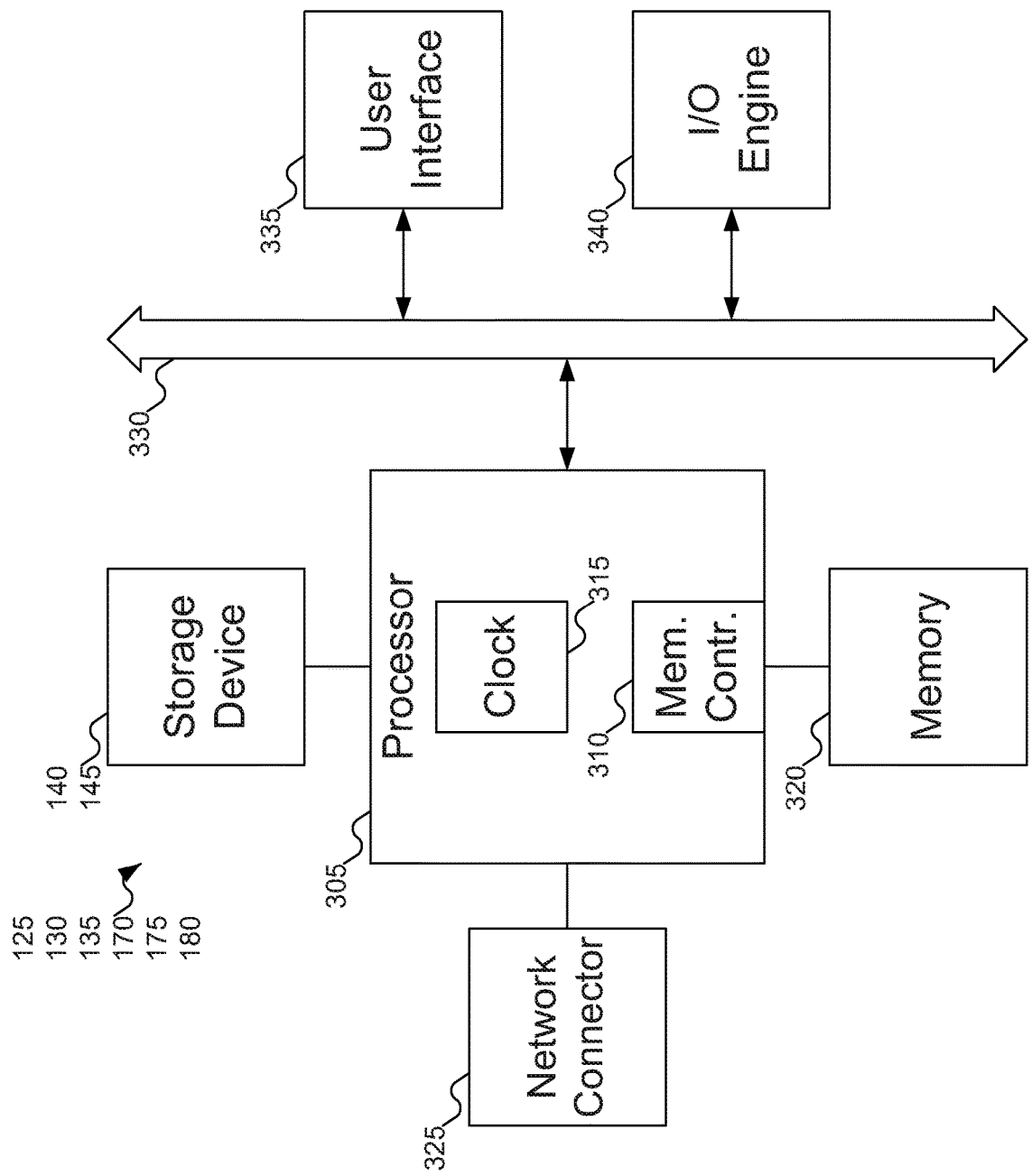
FIG. 3 shows further details of the storage node of FIG. 1.

FIG. 3 shows further details of storage node 125 of FIGS. 1-2. In FIG. 3, typically, storage node 125 may include one or more processors 305, which may include memory controller 310 and clock 315, which may be used to coordinate the operations of the components of storage node 125. Processors 305 may also be coupled to memory 320, which may include random access memory (RAM), read-only memory (ROM), or other state preserving media, as examples. Processors 305 may also be coupled to storage devices 140 and 145, and network connector 325, which may be, for example, an Ethernet connector. Processors 305 may also be connected to a bus 330, to which may be attached user interface 335 and input/output interface ports that may be managed using input/output engine 340, among other components. Another representation of a storage node could be all discrete components as shown in FIG. 3 integrated in a single package or ASIC, and directly connected to network 120 of FIG. 1.

Figure 4:
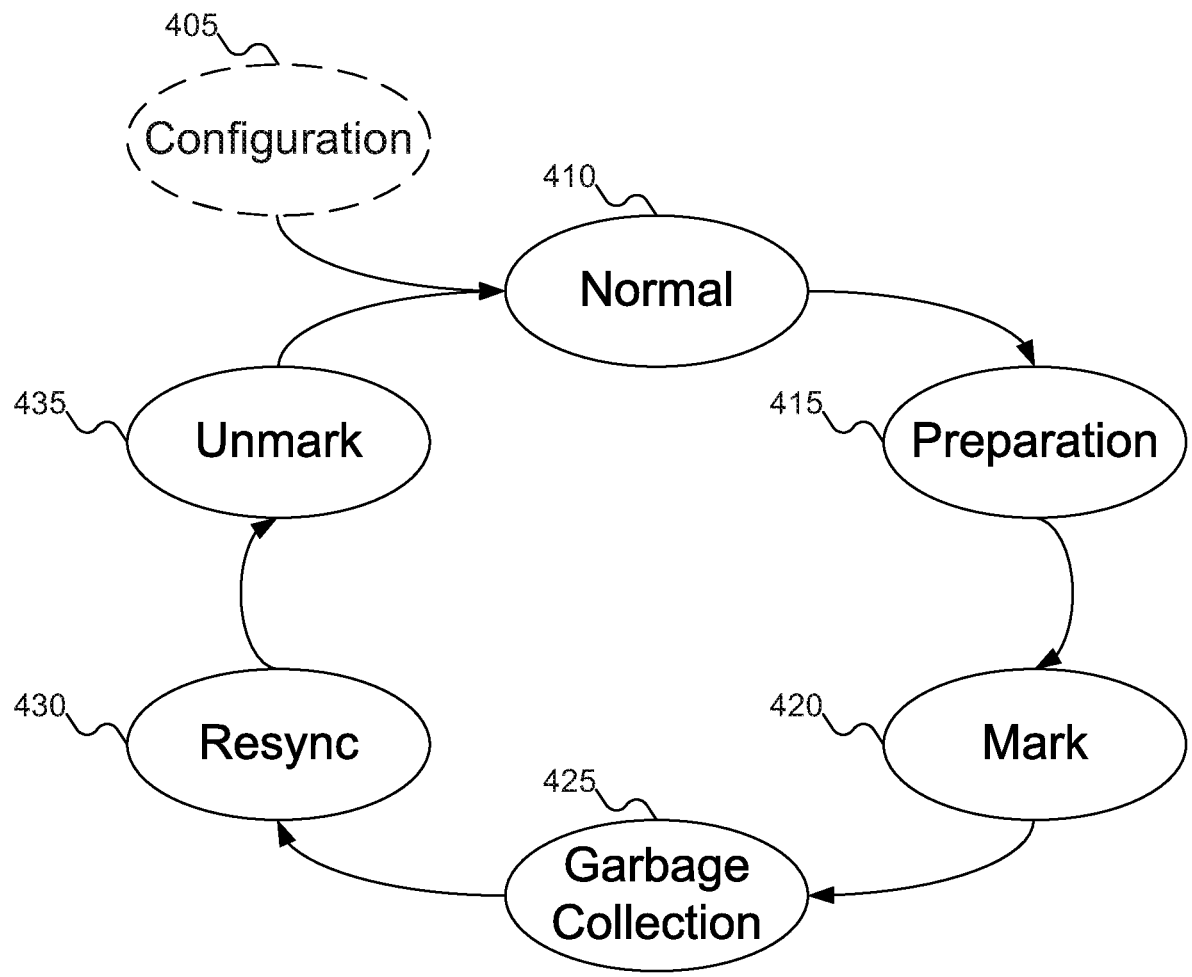
FIG. 4 shows phases that a Solid State Drive (SSD) may be in during use of the distributed storage system of FIG. 1.

FIG. 4 shows phases that a Solid State Drive (SSD) may be in during use of the distributed storage system of FIG. 1. In FIG. 4, SSDs begin at configuration phase 405. In configuration phase 405, the SSDs may be configured to only perform garbage collection upon instruction from storage node 125 of FIGS. 1-2. Configuration phase 405 is optional, as shown by the dashed lines: some SSDs do not support configuration, or the distributed storage system might opt not to configure the SSDs even though they could be configured. Then in normal phase 410, the SSDs operate normally, responding to read and write requests as delivered.

When an SSD needs to perform garbage collection, the SSD may enter preparation phase 415. Preparation phase 415 may include determining when the SSD will perform garbage collection and how much time the SSD will have for garbage collection. Note that in preparation phase 415, the SSD may still process read and write requests as normal. Then, at the appropriate time, the SSD may enter mark phase 420. In mark phase 420, monitors 170, 175, and 180 of FIG. 1 may mark the SSD as performing garbage collection, and therefore unavailable. The SSD may then enter garbage collection phase 425, wherein the SSD may perform garbage collection.

When the SSD completes garbage collection, or when the time allotted for garbage collection expires, the SSD may enter resync phase 430. In resync phase 430, the SSD may be updated with respect to data changes that affect the SSD. After resync phase 430 is complete, the SSD may enter unmark phase 435, wherein monitors 170, 175, and 180 of FIG. 1 may mark the SSD as available again (i.e., reversing the operations in mark phase 420). Finally, the SSD may return to normal phase 410, and may process read and write requests as normal.

Figure 5:
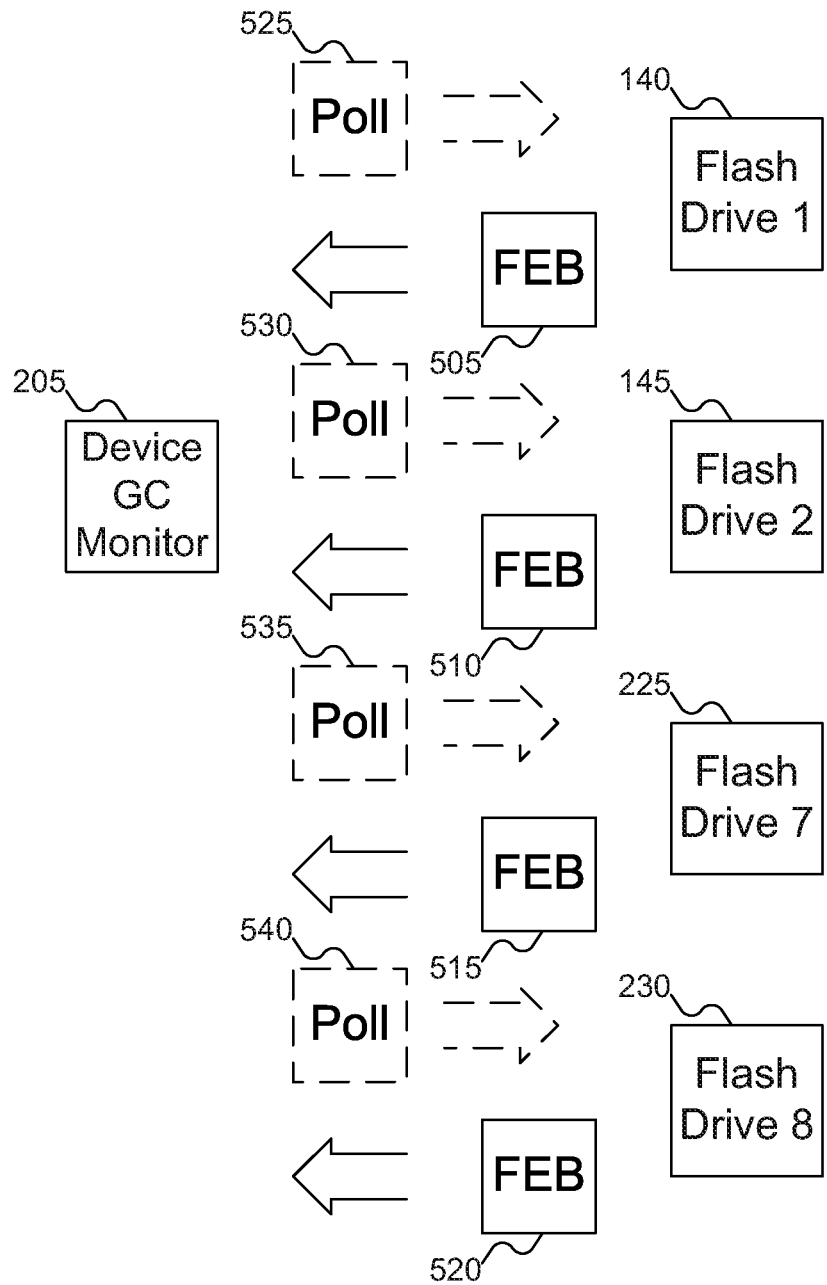
FIG. 5 shows the device garbage collection monitor of FIG. 2 receiving free erase block counts from the SSDs of FIGS. 1-2.

FIG. 5 shows the device garbage collection monitor of FIG. 2 receiving free erase block counts from the SSDs of FIGS. 1-2. In FIG. 5, device garbage collection monitor 205 is shown interacting with flash drives 140, 145, 225, and 230 of storage node 125 of FIG. 1. Typically, device garbage collection monitor 205 only interacts with storage devices on the storage node including device garbage collection monitor 205. But embodiments of the inventive concept may have device garbage collection monitor 205 interacting with storage devices on other storage nodes.

Device garbage collection monitor 205 may periodically receive free erase block counts 505, 510, 515, and 520 from flash drives 140, 145, 225, and 230, respectively. Free erase block counts 505, 510, 515, and 520 may represent the number or percentage of blocks (or superblocks) currently free on each of flash drives 140, 145, 225, and 230. Relative to the total number of blocks available on the SSD, the free erase block count may be a good indicator of how full the SSD is. As the free erase block count drops, the SSD is filling up, and garbage collection might be needed to increase the number of free erase blocks.

In some embodiments of the inventive concept, flash drives 140, 145, 225, and 230 send free erase block counts 505, 510, 515, and 520 to device garbage collection monitor 205 automatically. In other embodiments of the inventive concept, device garbage collection monitor 205 may query flash drives 140, 145, 225, and 230 when it wants to know their free erase block counts 505, 510, 515, and 520. These queries are shown as polls 525, 530, 535, and 540, respectively. Because not all embodiments of the inventive concept have device garbage collection monitor 205 interrogating flash drives 140, 145, 225, and 230 for their free erase block counts 505, 510, 515, and 520, polls 525, 530, 535, and 540 are shown with dashed lines.

Flash drives 140, 145, 225, and 230 may return more than just free erase block counts 505, 510, 515, and 520 to device garbage collection monitor 205. For example, flash drives 140, 145, 225, and 230 may indicate to device garbage collection monitor that they need to perform static wear leveling. In brief, data cells in an SSD may perform only so many write and erase operations before the data cells begin to fail: the manufacturer of the SSD knows on average how many write and erase operations a data cell may take. SSDs may use static wear leveling to attempt to keep the number of write and erase operations fairly consistent across all data cells, hopefully avoiding a premature failure of the SSD due to excessive use of a small number of data cells.

Figure 6:
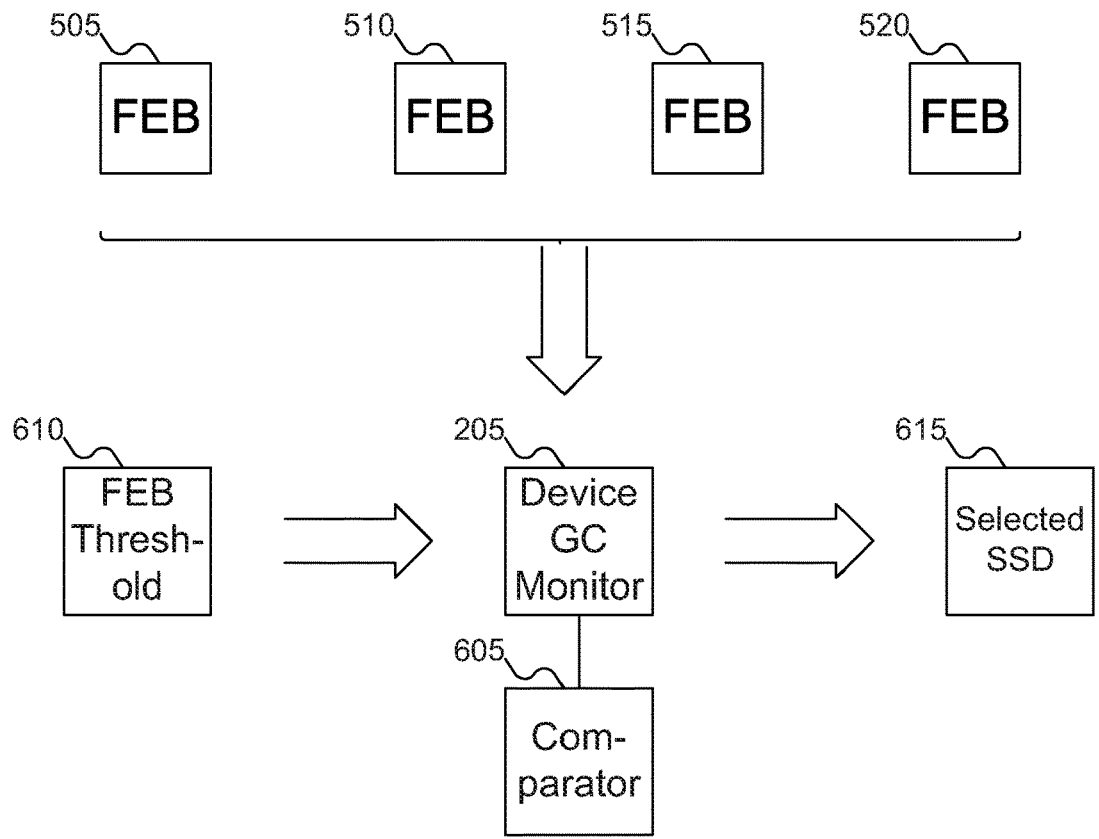
FIG. 6 shows the device garbage collection monitor of FIG. 2 selecting an SSD for garbage collection based on the free erase block counts of FIG. 5 from the SSDs of FIGS. 1-2.

FIG. 6 shows device garbage collection monitor 205 of FIG. 2 selecting an SSD for garbage collection based on free erase block counts 505, 510, 515, and 520 of FIG. 5 from the SSDs of FIGS. 1-2. In FIG. 6, device garbage collection monitor 205 may use comparator 605 to compare free erase block counts 505, 510, 515, and 520 with free erase block threshold 610. If any of free erase block counts 505, 510, 515, and 520 are below free erase block threshold 610, then the SSD providing that free erase block count may become selected SSD 615 for garbage collection.

While FIG. 6 shows a single free erase block threshold 610, embodiments of the inventive concept may support multiple free erase block thresholds 610. That is, comparator 605 may compare free erase block counts 505, 510, 515, and 520 with different free erase block thresholds 610, depending on the flash drive in question. In this manner, embodiments of the inventive concept recognize that SSDs may have different block sizes and counts, and therefore have different thresholds representing how full the flash drive is.

In some embodiments of the inventive concept, free erase block threshold 610 may be a fixed number. For example, consider an SSD with a total capacity of 512 GB and a block size of 2048 KB. Such an SSD has 250,000 blocks. Such an SSD might have free erase block threshold 610 set to 50,000. On the other hand, an SSD with a capacity of 256 GB and a block size of 512 KB would have 500,000 blocks, and could have the free erase block threshold set to 100,000.

In other embodiments of the inventive concept, free erase block threshold 610 may be a percentage, such as 20%. That is, when an SSD has a free erase block count that is less than 20% of its total number of blocks, that SSD needs to perform garbage collection. Note that setting free erase block threshold 610 to 20% (rather than to a fixed number) would cover both example SSDs described above, which would require different free erase block thresholds when using fixed numbers of blocks.

Figure 7:
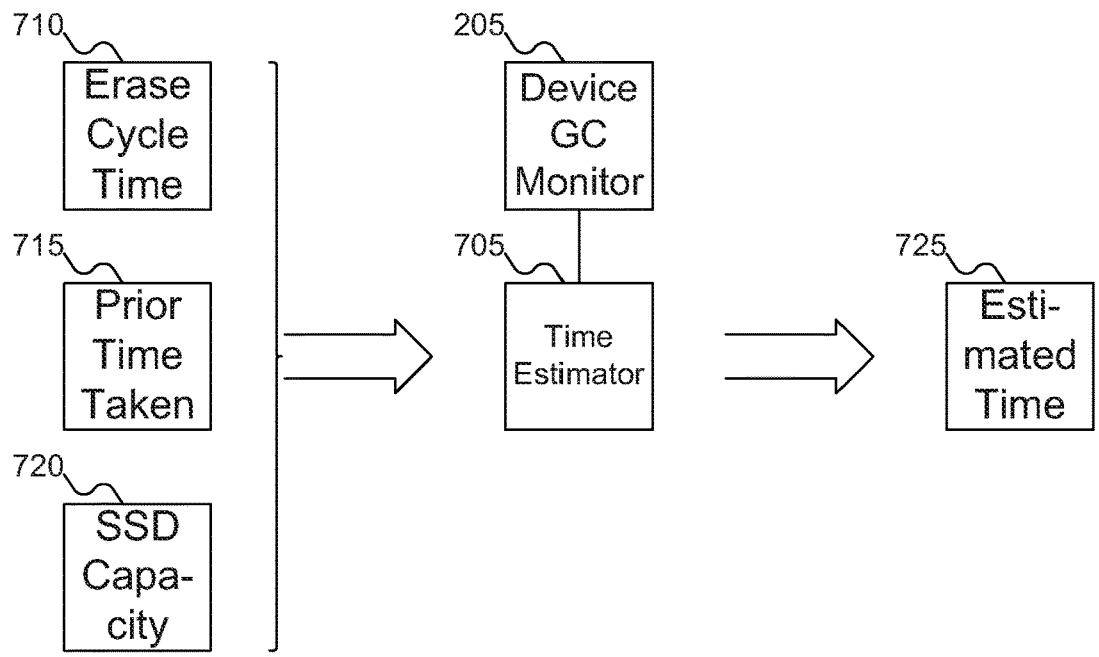
FIG. 7 shows the device garbage collection monitor of FIG. 2 estimating the time required to perform garbage collection on the SSD selected in FIG. 6.

FIG. 7 shows device garbage collection monitor 205 of FIG. 2 estimating the time required to perform garbage collection on selected SSD 615 of FIG. 6. In FIG. 7, device garbage collection monitor 205 may include time estimator 705. Time estimator 705 may estimate the time required to perform the garbage collection on selected SSD 615 of FIG. 6.

Time estimator 705 may use various data to estimate the time required to perform garbage collection on selected SSD 615 of FIG. 6. These data may include erase cycle time 710—the time required to erase a block on selected SSD 615 of FIG. 6, prior time taken 715—the time required by selected SSD 615 of FIG. 6 to perform garbage collection the last time selected SSD 615 of FIG. 6 performed garbage collection, and SSD capacity 720—the total capacity of selected SSD 615 of FIG. 6. Time estimator 705 may also use the number of blocks to be erased on selected SSD 615 of FIG. 6, if this number is known. These data provide a decent (if not perfect) estimate of how long selected SSD 615 of FIG. 6 would take to perform garbage collection.

Figure 8:
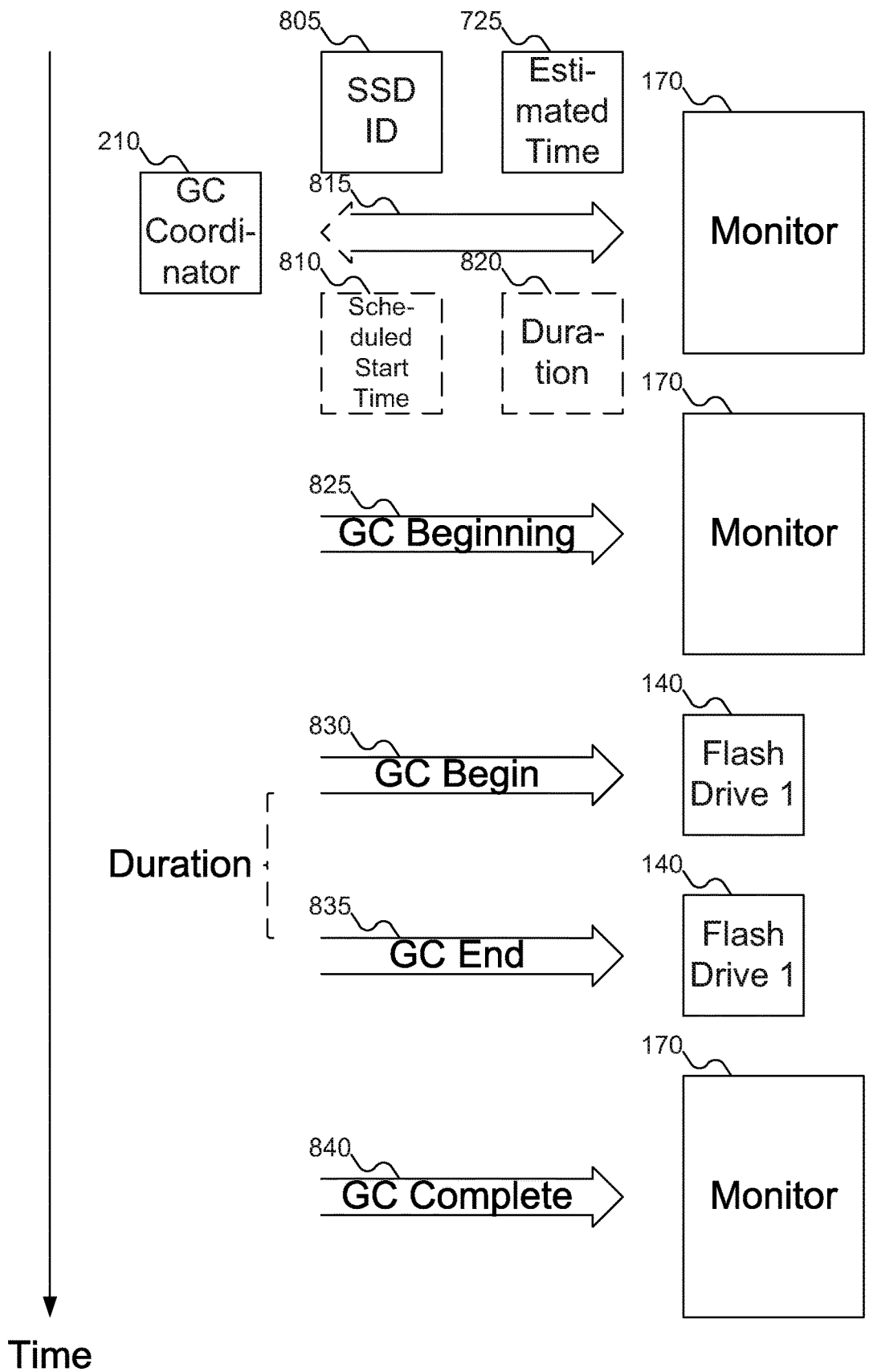
FIG. 8 shows the garbage collection coordinator of FIG. 2 interacting with a monitor of FIG. 1 to schedule and perform garbage collection on the SSD selected in FIG. 6.

FIG. 8 shows garbage collection coordinator 210 of FIG. 2 interacting with monitor 170 of FIG. 1 to schedule and perform garbage collection on selected SSD 615 of FIG. 6. In FIG. 8, garbage collection coordinator 210 may send identifier 805 of selected SSD 615 of FIG. 6, along with estimated time 725 required to perform garbage collection on selected SSD 615 of FIG. 6, to monitor 170. Garbage collection coordinator 210 may also send selected start time 810, which may be selected by garbage collection coordinator, to monitor 170. Monitor 170 may then use this information to be aware of garbage collection on selected SSD 615 of FIG. 6. This exchange of information is shown as exchange 815.

There are different models of how monitor 170 may operate. In one model, called GC with Acknowledgment, monitor 170 (possibly in coordination with the other monitors in the distributed storage system) may decide when each SSD performs garbage collection, and how long the SSD may spend on garbage collection. In this model, garbage collection coordinator 210 does not instruct selected SSD 615 to begin garbage collection until monitor 170 notifies garbage collection coordinator 210 as to when selected SSD 615 of FIG. 6 may perform garbage collection and how long selected SSD 615 of FIG. 1 has to perform garbage collection. That is, until monitor 170 informs garbage collection coordinator 210 about when to perform garbage collection, selected SSD 615 of FIG. 6 remains in normal phase 410 of FIG. 4.

In embodiments of the inventive concept using GC with Acknowledgement, scheduled start time 810 selected by garbage collection coordinator 210 and estimated time 725 are not binding. Only scheduled start time 810 and duration 820 as assigned by monitor 170 are to be used. The information sent by garbage collection coordinator 210 is merely a suggestion to monitor 170.

In embodiments of the inventive concept using GC with Acknowledgement, monitor 170 (possibly in coordination with the other monitors in the distributed storage system) may schedule each SSD requiring garbage collection to minimize the impact of garbage collection on clients 105, 110, and 115 of FIG. 1. For example, if two different SSDs each want to perform garbage collection, monitor 170 may prioritize which SSD may perform garbage collection first, letting the other SSD wait. In this manner, with only one SSD performing garbage collection at any time, the likelihood that a data request may not be serviced by any SSD is reduced.

In other embodiments of the inventive concept, monitor 170 may operate in a model called GC with No Acknowledgment. In this model, monitor 170 may track when SSDs are performing garbage collection, but monitor 170 does not respond or change scheduled start time 810 as selected by garbage collection coordinator and estimated time 725. In embodiments of the inventive concept using GC with No Acknowledgement, it may happen that multiple SSDs may perform garbage collection at the same time. But if the level of redundancy of the data in the distributed storage system is sufficient, the likelihood that a data request will be delayed until an SSD completes its garbage collection is minimal.

For example, if the distributed storage system includes three copies of each unit of data, the likelihood that all three copies will be unavailable when requested by client 105 of FIG. 1 might be sufficiently small as to be acceptable.

There is a mathematical relationship between the number of copies of each unit of data and the likelihood that there will be no available copies at any time (along with other variables, such as how often garbage collection occurs on an SSD or how long garbage collection takes). Given a desired degree of reliability (that is, that at least one copy of each unit of data is likely available at any time), the number of copies of each unit of data may be calculated to provide that desired degree of reliability.

Regardless of whether GC with Acknowledgement or GC with No Acknowledgement is used, eventually garbage collection coordinator 210 may inform monitor 170 that garbage collection is beginning on flash drive 140, as shown by GC Beginning message 825. Garbage collection coordinator 230 may also instruct flash drive 140 to begin garbage collection, as shown by GC Begin instruction 830. Eventually, after duration 820 has passed, garbage collection coordinator 210 may instruct flash drive 140 to end garbage collection, as shown by GC End instruction 835. Finally, garbage collection coordinator 210 may inform monitor 170 that garbage collection has completed on flash drive 140, as shown by GC Complete message 840.

Note that embodiments of the inventive concept do not require all the messages shown in FIG. 8. As described above, in embodiments of the inventive concept using GC with No Acknowledgement, monitor 170 does not send any reply to garbage collection coordinator 170. Further, as monitor 170 is aware of when garbage collection is scheduled to begin and end, garbage collection coordinator may omit messages 825 and 840 to monitor 170. And instruction 835 is only useful if flash drive 140 permits garbage collection to be interrupted: if garbage collection may not be interrupted on flash drive 140, then flash drive 140 would not process instruction 835. But if flash drive 140 does not permit garbage collection to be interrupted via instruction 835, then message 840 might be necessary, to inform monitor 170 when flash drive 140 has completed garbage collection. For example, consider the scenario where flash drive 140 does not permit garbage collection to be interrupted, but duration 820 is less than the time required to perform garbage collection on flash drive 140. If monitor 170 assumes that flash drive 140 has completed garbage collection after duration 820 has passed, monitor 170 might think that flash drive 140 is available when it is not, which could result in data requests being delayed while multiple SSDs perform garbage collection simultaneously.

Figure 9A:
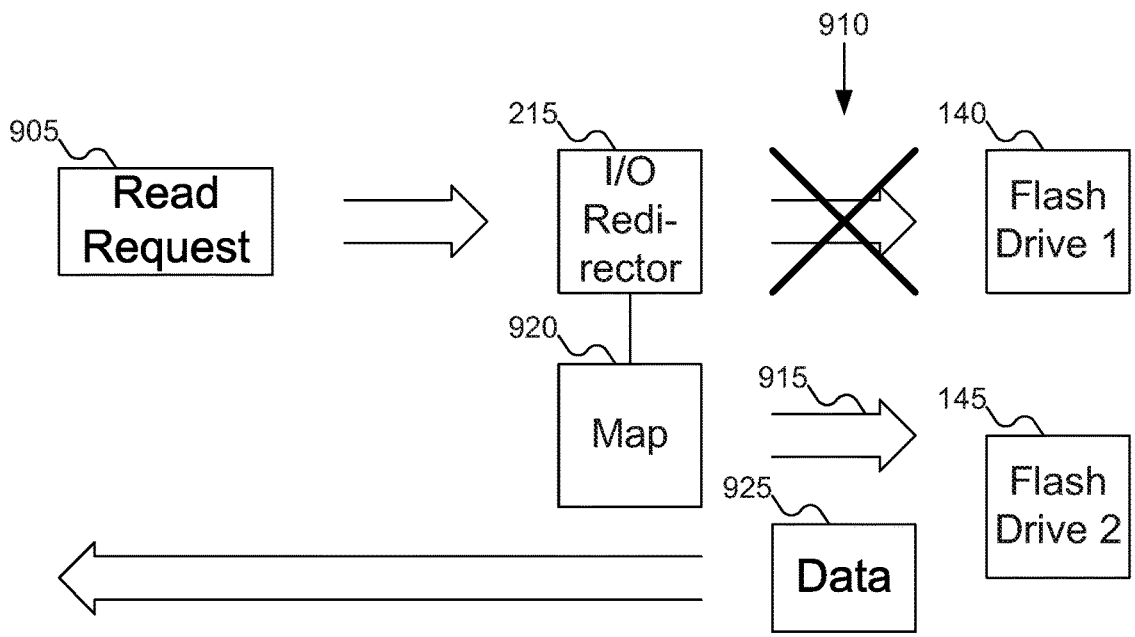
FIGS. 9A-9B show the Input/Output (I/O) redirector of FIG. 2 processing read requests for the SSD selected in FIG. 6, according to embodiments of the inventive concept.
Figure 9B:
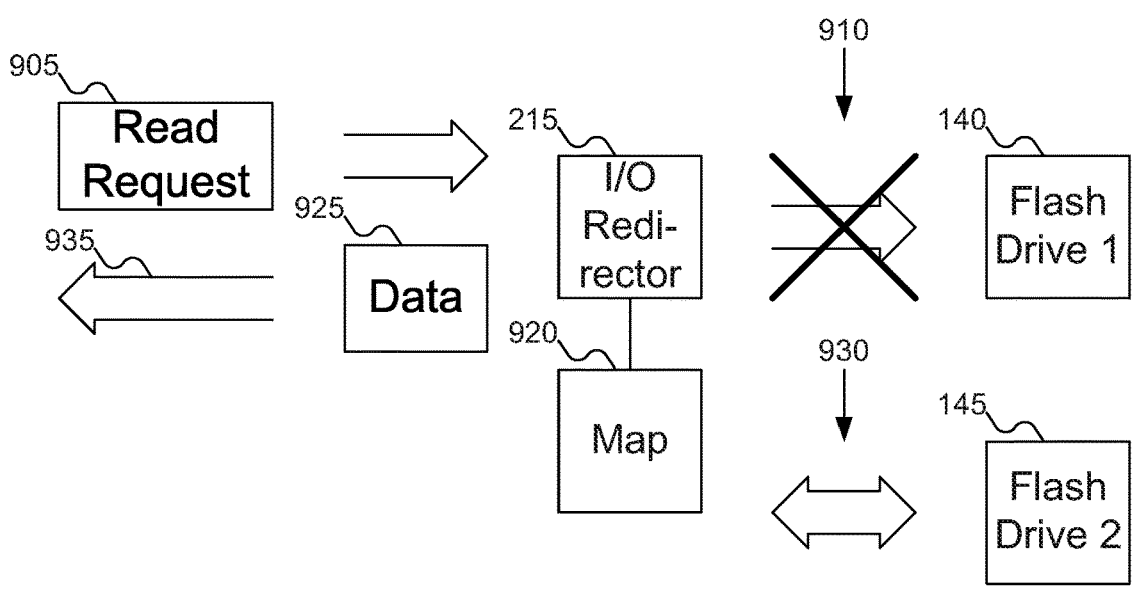

FIGS. 9A-9B show Input/Output (I/O) redirector 215 of FIG. 2 processing read requests for selected SSD 615 of FIG. 6, according to embodiments of the inventive concept. In FIG. 9A, in some embodiments of the inventive concept, I/O redirector 215 may receive read request 905, destined for flash drive 140. But if flash drive 140 is performing garbage collection, letting read request 905 be delivered to flash drive 140 may result in a delay in returning the requested data. Thus, I/O redirector 215 may cancel the delivery of read request 905 to flash drive 140 (as shown by canceled arrow 910), and instead may redirect read request to flash drive 145 (as shown by arrow 915). I/O redirector 215 may use map 920, which may be stored locally or accessed from monitor 170 of FIG. 1, to determine which storage devices on the distributed storage system store other copies of the requested data. I/O redirector 215 may then redirect read request 905 to an appropriate device, such as flash drive 145.

Flash drive 145 may then access data 925 and return it directly to the requesting client.

In FIG. 9B, in other embodiments of the inventive concept, I/O redirector 215 may intercept read request 905 destined for flash drive 140, which is performing garbage collection. But instead of redirecting read request 905 to flash drive 145, I/O redirector 215 may make its own request for the data from flash drive 145 in exchange 930. Flash drive 145 may then return data 925 to I/O redirector 215 in exchange 930, which may then return data 925 to the requesting client in message 935. In the embodiments of the inventive concept shown in FIG. 9B, the requesting client does not receive data from an unexpected source, which might confuse the requesting client if the requesting client is not prepared for this possibility.

Figure 10:
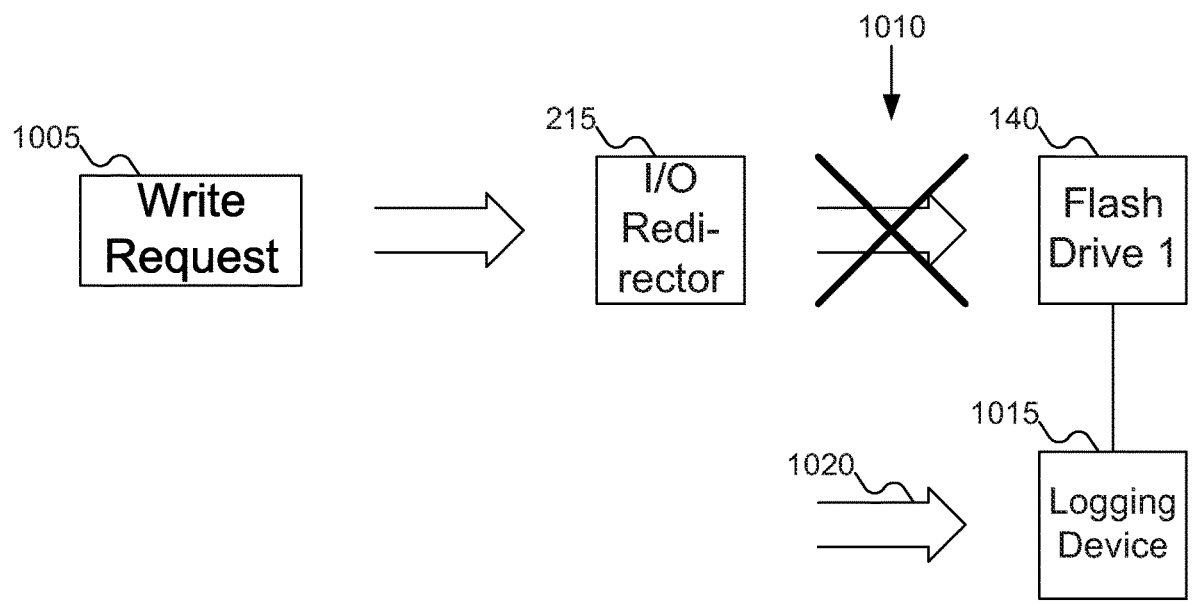
FIG. 10 shows the I/O redirector of FIG. 2 storing write requests in a logging device for the SSD selected in FIG. 6.

Like read request 905 in FIGS. 9A-9B, write requests destined for an SSD performing garbage collection may result in delay. FIG. 10 shows I/O redirector 215 of FIG. 2 storing write requests in a logging device for selected SSD 615 of FIG. 6, to avoid such delays. Instead of delivering write request 1005 to flash drive 145, I/O redirector 215 may intercept write request 1005 (shown by canceled arrow 1010). I/O redirector may then store write request 1005 in logging device 1015 as shown by arrow 1020. Logging device 1015 may be local to storage node 125 of FIG. 1, internal to flash drive 140, or anywhere else desired.

Figure 11:
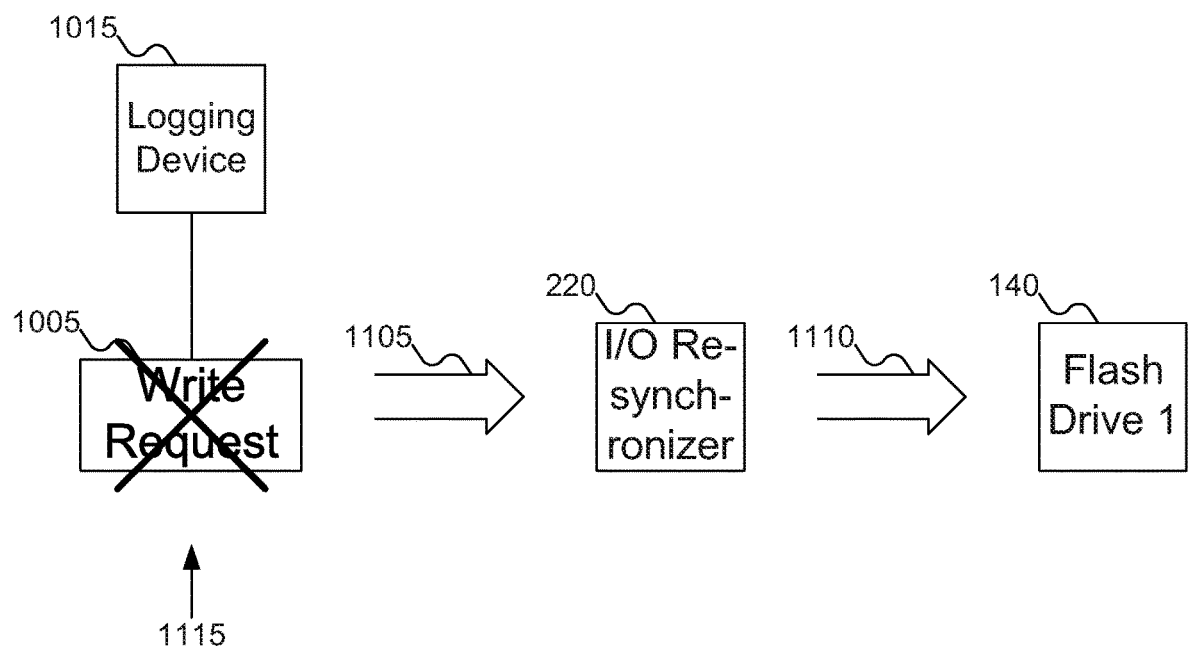
FIG. 11 shows the I/O resynchronizer of FIG. 2 processing write requests stored in the logging device of FIG. 10.

FIG. 11 shows I/O resynchronizer 220 of FIG. 2 processing write requests stored in logging device 1015 of FIG. 10. Once garbage collection has completed on selected SSD 615 of FIG. 6, I/O resynchronizer 220 may access write request 1005 from logging device 1015 as shown by arrow 1105. I/O resynchronizer 220 may then perform write request on flash drive 140, as shown by arrow 1110. Write request 1005 may then be deleted from logging device 1015, as shown by cancellation 1115.

Figure 12:
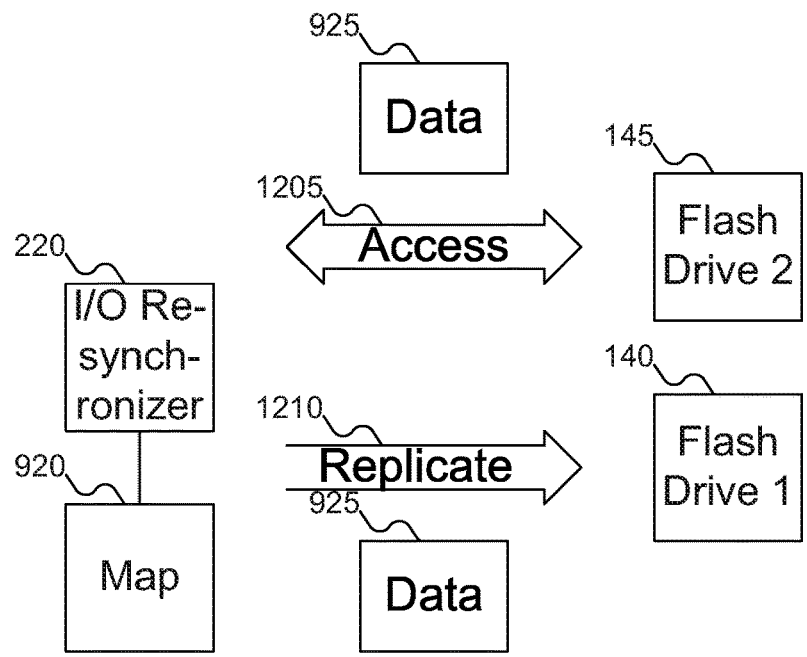
FIG. 12 shows the I/O resynchronizer of FIG. 2 replicating data to the SSD selected in FIG. 6, according to embodiments of the inventive concept.

While logging device 1015 provides a simple way to ensure that flash drive 140 is current with respect to data writes, logging device 1015 is not the only way to resynchronize flash drive 140. Another possibility would be to store information about which pages, blocks, or superblocks on flash drive 140 were due to be changed by write requests that arrived while flash drive 140 was performing garbage collection. I/O resynchronizer 220 may then access the updated data from replicated copies of those pages/blocks/superblocks on other SSDs or other storage devices and write the updated data to flash drive 140. FIG. 12 shows this form of resynchronization.

FIG. 12 shows I/O resynchronizer 220 of FIG. 2 replicating data to selected SSD 615 of FIG. 6, according to embodiments of the inventive concept. In FIG. 12, I/O resynchronizer 220 may request the updated data from flash drive 145 and receive data 925 from flash drive 145 in access exchange 1205. As described above with reference to FIGS. 9A-9B, I/O resynchronizer 220 may identify which SSDs store the updated data, perhaps using map 920, and request the data accordingly: flash drive 145 would not necessarily store all the updated data. I/O resynchronizer 220 may then provide data 925 to flash drive 140 in replicate message 1210.

Figure 13:
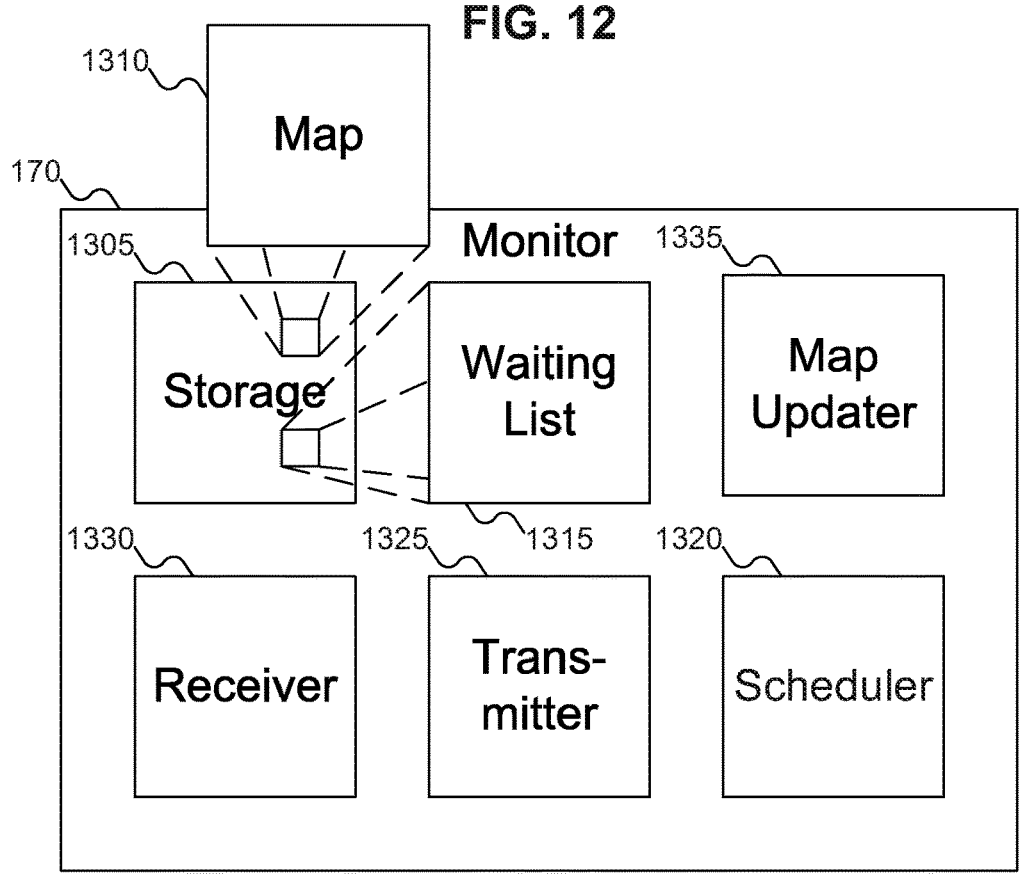
FIG. 13 shows details of the monitor of FIG. 1.

FIG. 13 shows details of monitor 170 of FIG. 1. In FIG. 13, monitor 170 may include storage 1305, which may store map 1310 and waiting list 1315. Monitor 170 may also include receiver 1320, transmitter 1325, and scheduler 1330. Map 1310 may store information about where data is stored on various storage devices across the distributed storage system, along with which devices are available and unavailable: map 1310 is discussed further with reference to FIG.

14 below. Waiting list 1315 may store information about SSDs wanting to perform garbage collection, but which are currently delayed while other SSDs are performing garbage collection, as described above with reference to FIG. 8. Map updater 1335 may update map 1310 as data storage across the distributed storage system changes. Receiver 1320 and transmitter 1325 may be used to receive information from and send information to other devices, such as garbage collection coordinator 210 of FIG. 2. Scheduler 1320 may schedule a garbage collection request for selected SSD 615 of FIG. 6, selecting the time and duration for garbage collection on that SSD.

FIG. 14 shows an example of map 1310 of data of FIG. 13 stored in monitor 170 of FIG. 1. In FIG. 14, map 1310 may include indicators of various units of data 1403, 1406, 1409, and 1412. For example, unit of data 1403 identifies block 0 of file A, unit of data 1406 identifies block 1 of file A, unit of data 1409 identified block 2 of file A, and unit of data 1412 identifies block 0 of file B. Each unit of data may include a count, such as counts 1415, 1418, 1421, and 1424, which indicates how many copies there are of each unit of data. For example, counts 1415, 1418, and 1421 indicate that there are three copies of each of units of data 1403, 1406, and 1409, while count 1424 indicates that there are only two copies of unit of data 1412.

Map 1310 may also include where copies of the various units of data may be found. These are shown as locations 1427, 1430, 1433, 1436, 1439, 1442, 1445, 1448, 1451, 1454, and 1457. Location 1460 is available in case unit of data 1412 eventually has a third copy, but is currently blank as there are only two copies of unit of data 1412 in the distributed storage system.

While FIG. 14 shows map 1310 including four units of data and up to three copies for each unit of data, embodiments of the inventive concept may support any number of units of data and any number of copies for each unit of data. Thus, map 1310 may include theoretically millions (or more) units of data, and might have six copies of each unit of data across the distributed storage system.

Figure 15A:
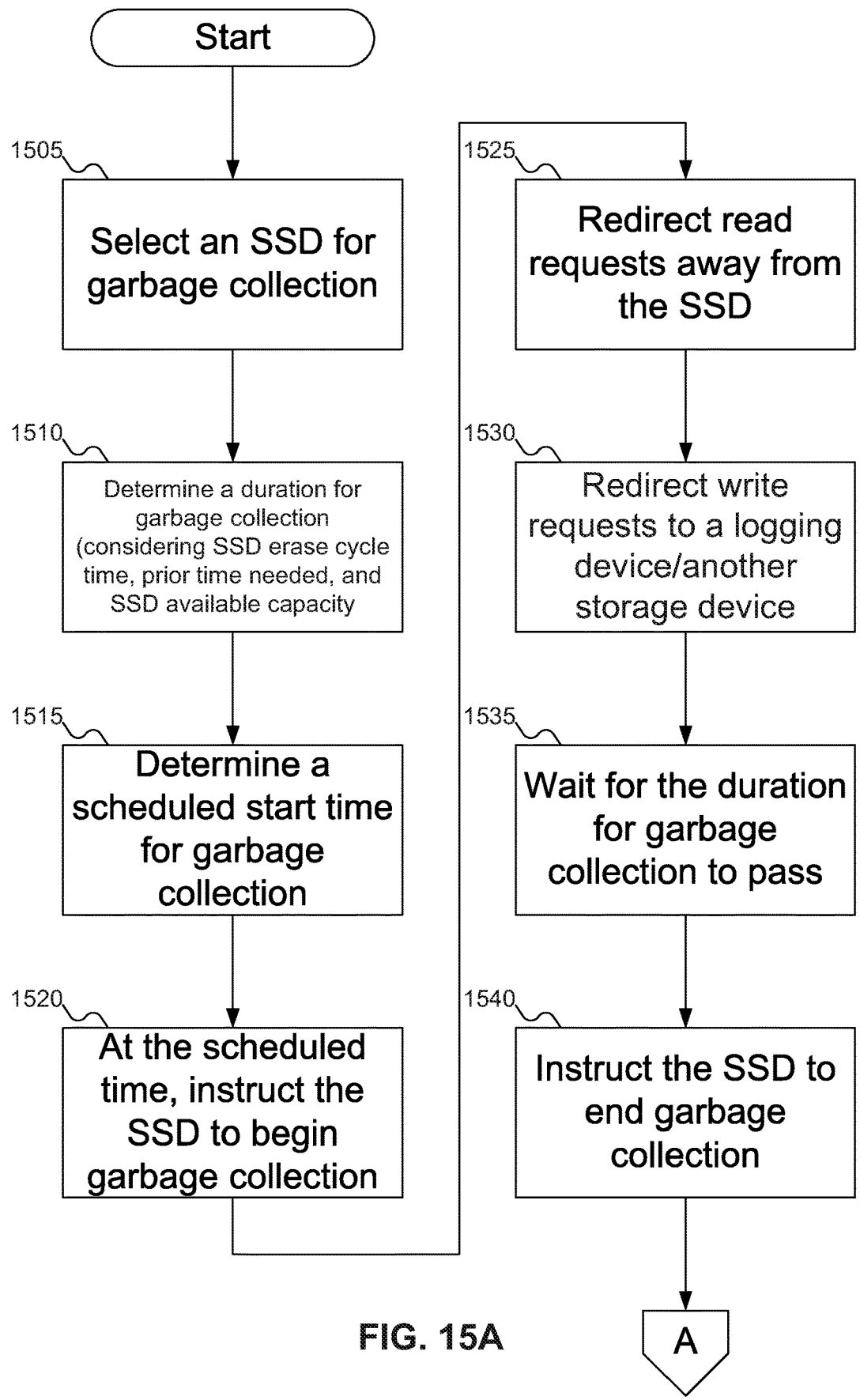
FIGS. 15A-15B show a flowchart of a procedure used by the storage node of FIG. 1 to perform garbage collection on an SSD of FIGS. 1-2, according to an embodiment of the inventive concept.
Figure 15B:
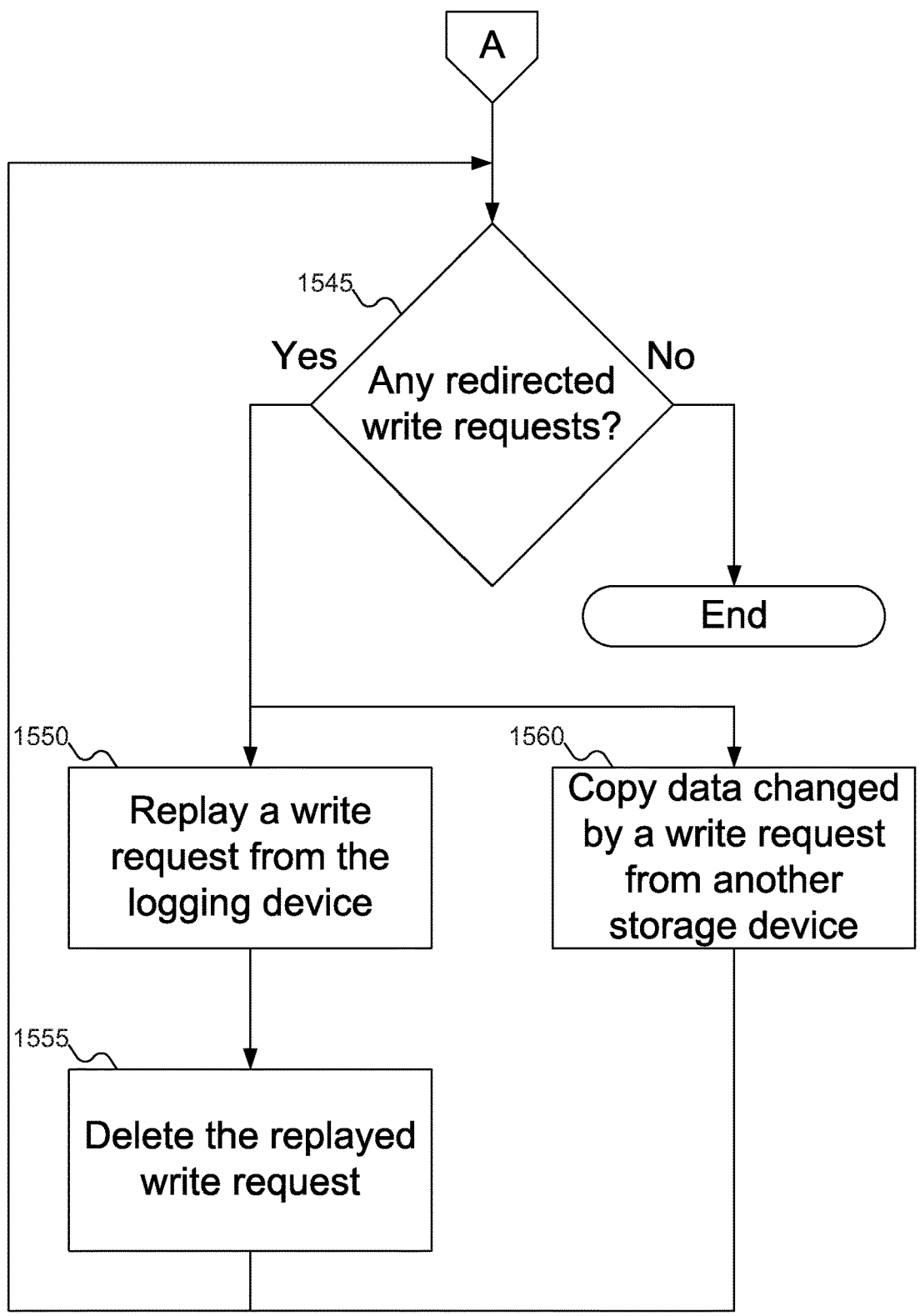

FIGS. 15A-15B show a flowchart of an example procedure used by storage node 125 of FIG. 1 to perform garbage collection on an SSD of FIGS. 1-2, according to an embodiment of the inventive concept. In FIG. 15A, at block 1505, device garbage collection monitor 205 of FIG. 2 may select an SSD, such as flash drive 140 of FIG. 1, to perform garbage collection. At block 1510, device garbage collection monitor 205 of FIG. 2 may determine an estimated time required for flash drive 140 of FIG. 1 to perform garbage collection. Among the factors device garbage collection monitor 205 of FIG. 2 may consider are the erase cycle time required by flash drive 140, the time required for a prior garbage collection event by flash drive 140 of FIG. 1, and the available capacity of flash drive 140 of FIG. 1. At block 1515, garbage collection coordinator 210 of FIG. 2 may determine a scheduled start time for flash drive 140 of FIG. 1 to perform garbage collection. At block 1520, at the scheduled start time, garbage collection coordinator 210 of FIG. 2 may instruct flash drive 140 of FIG. 1 to begin garbage collection.

At block 1525, while flash drive 140 of FIG. 1 is performing garbage collection, I/O redirector 215 of FIG. 2 may redirect read requests 905 away from flash drive 140 of FIG. 1. At block 1530, while flash drive 140 of FIG. 1 is performing garbage collection, I/O redirector may also redirect write requests 1005 of FIG. 10 away from flash drive 140 of FIG. 1 (either to a logging device to store write requests 1005 of FIG. 10, or to another storage device to perform write request 1005 of FIG. 10). At block 1535, storage node 125 of FIG. 1 may wait until flash drive 140 of FIG. 1 completes garbage collection. At block 1540, garbage collection coordinator 210 of FIG. 2 may instruct flash drive 140 of FIG. 1 to end garbage collection. As described above with reference to FIG. 8, block 1540 may be omitted if flash drive 140 may not be interrupted during garbage collection.

At block 1545 (FIG. 15B), I/O resynchronizer 220 of FIG. 2 may determine if there are any write requests 1005 were redirected (in block 1530). If so, then at block 1550 I/O resynchronizer 220 of FIG. 2 may access and replay write request 1005 of FIG. 10 from logging device 1015 of FIG. 10, and at block 1555 I/O resynchronizer 220 of FIG. 2 may delete write request 1005 of FIG. 10 from logging device 1015 of FIG. 10. As described above with reference to FIG. 12, replaying write request 1005 of FIG. 10 in block 1550 may involve accessing updated data from flash drive 145 of FIG. 1, rather than actually replaying the original write request 1005. Therefore, alternatively, at block 1560 I/O resynchronizer 220 of FIG. 2 may copy data changed by write request 1005 of FIG. 10 from another storage device that processed write request 1005 of FIG. 10. Control may then return to block 1545 to check for further write requests 1005 of FIG. 10 in logging device 1015 of FIG. 10.

Figure 16A:
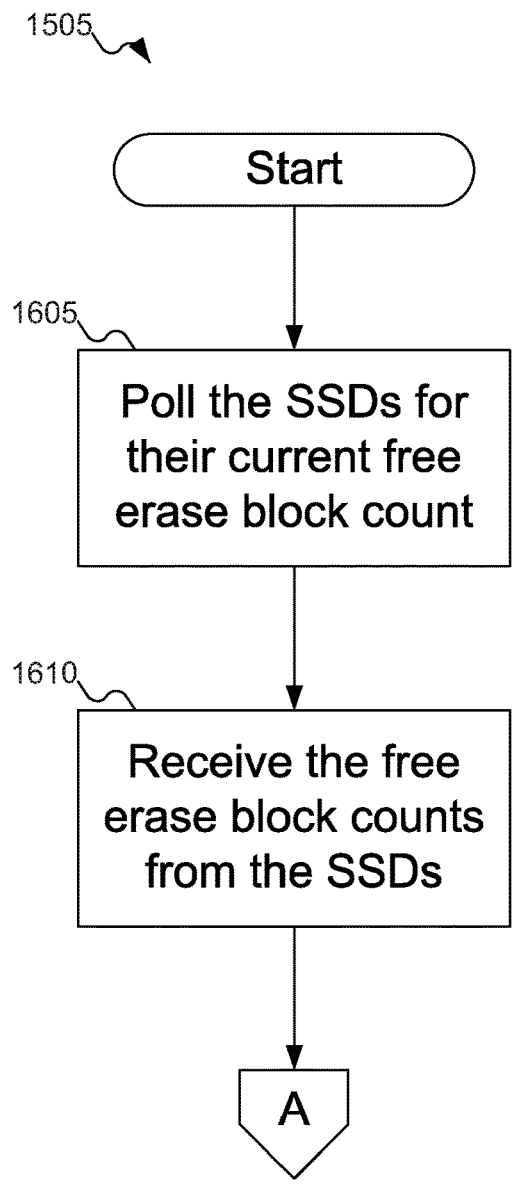
FIGS. 16A-16B show a flowchart of a procedure used by the device garbage collection monitor of FIG. 2 to select an SSD for garbage collection, according to an embodiment of the inventive concept.
Figure 16B:
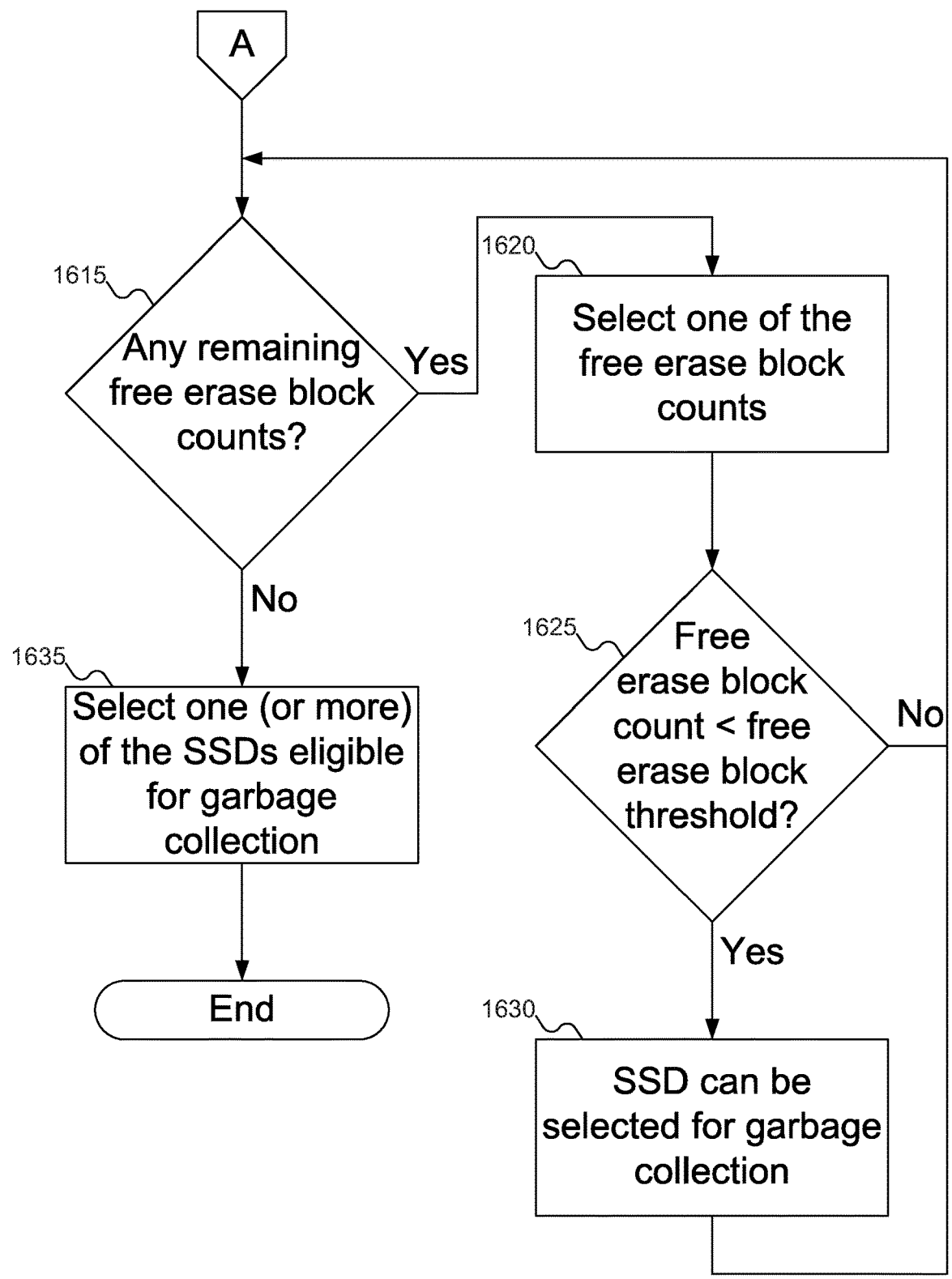

FIGS. 16A-16B show a flowchart of an example procedure used by the device garbage collection monitor of FIG. 2 to select an SSD for garbage collection, according to an embodiment of the inventive concept. In FIG. 16A, at block 1605, device garbage collection monitor 205 of FIG. 2 may poll flash drives 140, 145, 225, and 230 of FIGS. 1-2 for their free erase block counts. At block 1610, device garbage collection monitor 205 of FIG. 1 may receive free erase block counts 505, 510, 515, and 520 of FIG. 5 from flash drives 140, 145, 225, and 230 of FIGS. 1-2.

At block 1615 (FIG. 16B), device garbage collection monitor 205 of FIG. 2 may determine if there are any remaining free erase block counts to process. If so, then at block 1620 device garbage collection monitor 205 of FIG. 2 may select one of the free erase block counts. At block 1625, device garbage collection monitor 205 of FIG. 2 may determine whether the selected free erase block count is below free erase block threshold 610 of FIG. 6. If so, then at block 1630 device garbage collection monitor 205 of FIG. 2 may note that the corresponding SSD may be eligible for garbage collection. Control then returns to block 1615 to check for further free erase block counts to process.

If there are no remaining free erase block counts to process at block 1615, then at block 1635 device garbage collection monitor 205 of FIG. 2 may select one of the eligible SSDs for garbage collection. If there is only one SSD eligible for garbage collection, then that SSD may be selected. If there is more than one eligible SSD, then device garbage collection monitor 205 of FIG. 2 may select one of the eligible SSDs using any desired algorithm. Possible algorithms that may be used include selecting an eligible SSD at random, or selecting the eligible SSD with the lowest free erase block count or the lowest percentage of free erase blocks. Device garbage collection monitor 205 of FIG. 2 may also select more than one eligible SSD for garbage collection. Selecting more than one eligible SSD for garbage collection is particularly useful where monitor 170 of FIG. 1 uses GC with Acknowledgment, since monitor 170 of FIG. 1 could schedule all SSDs eligible for garbage collection in a manner than avoids multiple SSDs performing garbage collection at the same time.

Figure 17:
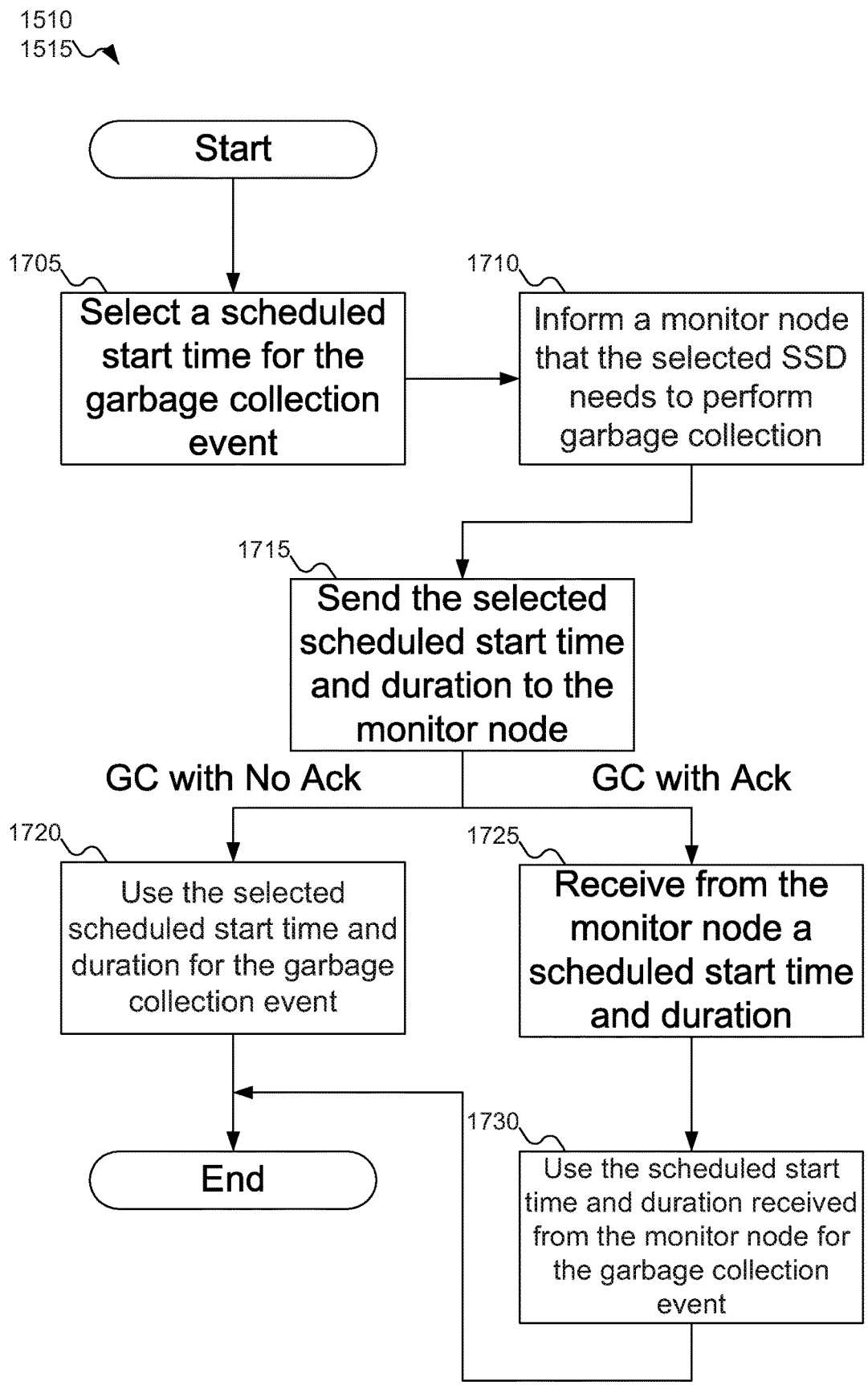
FIG. 17 shows a flowchart of a procedure for the garbage collection coordinator of FIG. 2 to schedule garbage collection for the SSD selected in FIG. 6.

FIG. 17 shows a flowchart of an example procedure for garbage collection coordinator 210 of FIG. 2 to schedule garbage collection for selected SSD 615 of FIG. 6. In FIG. 17, at block 1705, garbage collection coordinator 210 of FIG. 2 may select scheduled start time 810 for selected SSD 615 of FIG. 6. As described above with reference to FIG. 8, scheduled start time 810 selected by garbage collection coordinator 210 of FIG. 2 is not necessarily binding, and a different scheduled start time 810 of FIG. 8 may be assigned by monitor 170 of FIG. 1. At block 1710, garbage collection coordinator 210 of FIG. 2 may notify monitor 170 of FIG. 1 that selected SSD 615 of FIG. 6 needs to perform garbage collection. At block 1715, garbage collection coordinator 210 of FIG. 2 may notify monitor 170 of FIG. 1 of selected start time 810 of FIG. 8 and estimated time 725 of FIG. 7 required by selected SSD 615 of FIG. 6 to perform garbage collection.

At this point, the flowchart may diverge, depending on whether embodiments of the inventive concept use GC with Acknowledgement or GC with No Acknowledgment. In embodiments of the inventive concept using GC with No Acknowledgement, at block 1720 garbage collection coordinator 210 of FIG. 2 uses scheduled start time 810 of FIG. 8 and estimated time 725 of FIG. 7 required by selected SSD 615 of FIG. 6 to perform garbage collection, and may instruct selected SSD 615 of FIG. 6 to perform garbage collection at scheduled start time 810 of FIG. 8.

In embodiments of the inventive concept using GC with Acknowledgement, at block 1725 garbage collection coordinator 210 of FIG. 2 may receive scheduled start time 810 and duration 820 of FIG. 8 from monitor 170 of FIG. 1. Then, at block 1730, garbage collection coordinator may use scheduled start time 810 and duration 820 of FIG. 8 received from monitor 170 of FIG. 1 to schedule when selected SSD 615 of FIG. 6 performs garbage collection.

Figure 18:
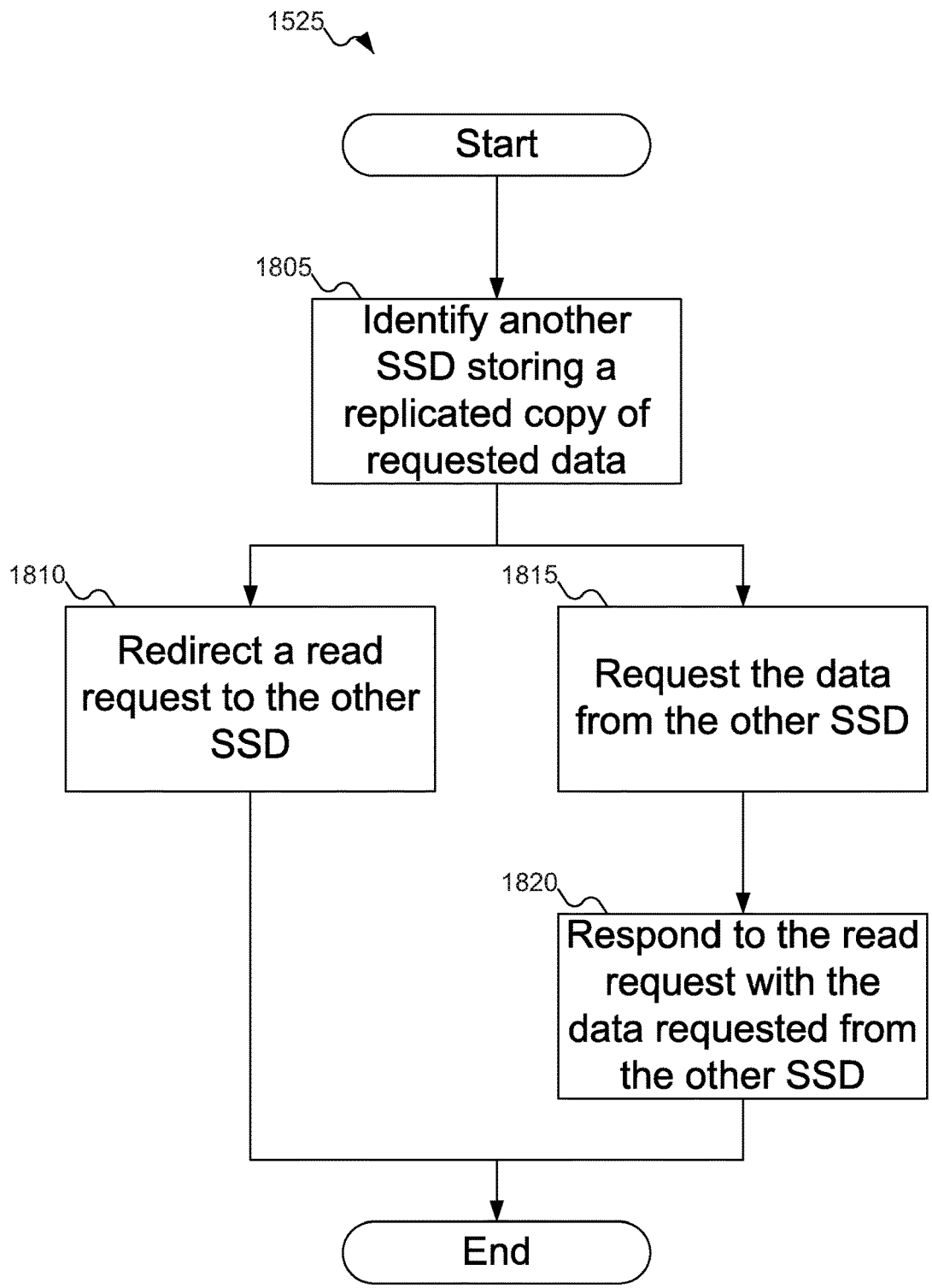
FIG. 18 shows a flowchart of a procedure for the I/O redirector of FIG. 2 to redirect read requests, according to an embodiment of the inventive concept.

FIG. 18 shows a flowchart of an example procedure for I/O redirector 215 of FIG. 2 to redirect read requests 905 of FIG. 9, according to an embodiment of the inventive concept. In FIG. 18, at block 1805, I/O redirector 215 of FIG. 2 may identify flash drive 145 of FIG. 1 as storing a replicated copy of the requested data. As described above with reference to FIGS. 9A-9B, I/O redirector 215 of FIG. 2 may use map 920 of FIGS. 9A-9B to determine that flash drive 145 of FIG. 1 stores a replicated copy of the requested data, and map 920 of FIGS. 9A-9B may be stored either locally to storage node 125 of FIG. 1, on monitor 170 of FIG. 1, or elsewhere, as desired.

Once I/O redirector 215 of FIG. 2 has determined that flash drive 145 of FIG. 1 stores a replicated copy of the requested data, different embodiments of the inventive concept may proceed in different ways. In some embodiments of the inventive concept, at block 1810 I/O redirector 215 of FIG. 2 may simply redirect read request 905 of FIGS. 9A-9B to flash drive 145 of FIG. 1, and let flash drive 145 of FIG. 1 provide the data 925 of FIGS. 9A-9B directly to the requesting client. In other embodiments of the inventive concept, at block 1815, I/O redirector 215 of FIG. 2 may request the data from flash drive 145 of FIG. 1, and at block 1820 I/O redirector 215 of FIG. 2 may provide the data 925 of FIGS. 9A-9B to the requesting client.

Figure 19:
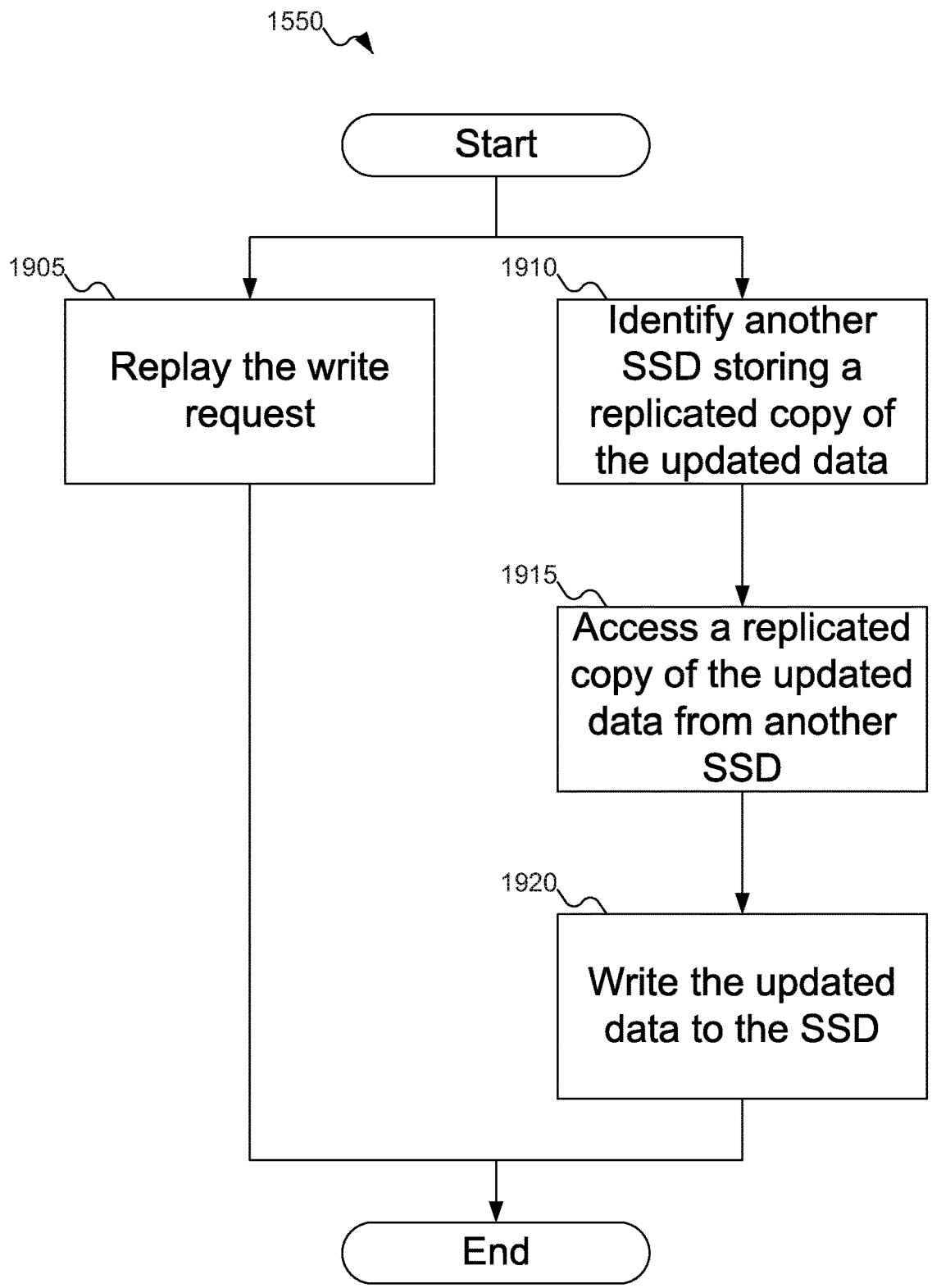
FIG. 19 shows a flowchart of a procedure for the I/O resynchronizer of FIG. 2 to process logged write requests, according to an embodiment of the inventive concept.

FIG. 19 shows a flowchart of an example procedure for I/O resynchronizer 220 of FIG. 2 to process logged write requests 1005 of FIG. 10, according to an embodiment of the inventive concept. How I/O resynchronizer 220 of FIG. 2 processes logged write requests 1005 of FIG. 10 depends on how logging device 1015 of FIG. 10 was used. If logging device 1015 of FIG. 10 stores write requests 1005 of FIG. 10 as originally generated by the requesting client, then at block 1905 I/O resynchronizer 220 of FIG. 2 may simply replay write requests 1005 of FIG. 10 as though they had just been received.

But logging device 1015 of FIG. 10 might store just an indicator of what pages, blocks, or superblocks are affected by write requests 1005 of FIG. 10. In that case, at block 1910 I/O resynchronizer 220 of FIG. 2 may identify flash drive 145 of FIG. 1 as storing a replicated copy of the updated data. As described above with reference to FIG. 12, I/O resynchronizer 220 of FIG. 2 may use map 920 of FIG. 12 to determine that flash drive 145 of FIG. 1 stores a replicated copy of the update data, and map 920 of FIG. 12 may be stored either locally to storage node 125 of FIG. 1, on monitor 170 of FIG. 1, or elsewhere, as desired.

Once I/O redirector 220 of FIG. 2 has identified that flash drive 145 stores a replicated copy of the updated data, at block 1915 I/O redirector 220 of FIG. 2 may access the updated data from flash drive 145 of FIG. 1. Then, at block 1920, I/O redirector 220 of FIG. 2 may instruct selected SSD 615 of FIG. 6 to write the updated data.

Figure 20:
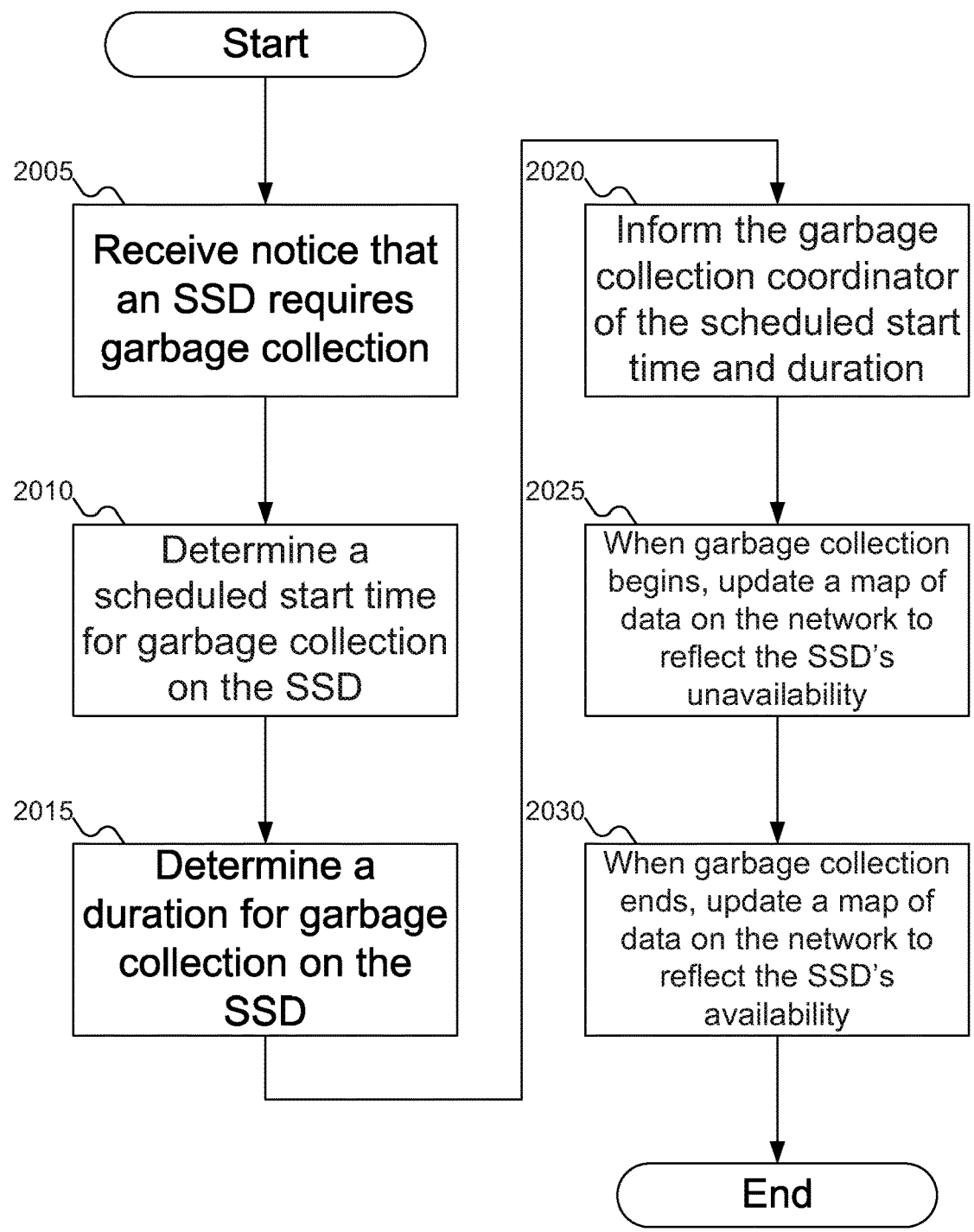
FIGS. 20 and 21 show flowcharts of procedures for the monitor of FIG. 1 to handle when the SSD selected in FIG. 6 is performing garbage collection, according to embodiments of the inventive concept.
Figure 21:
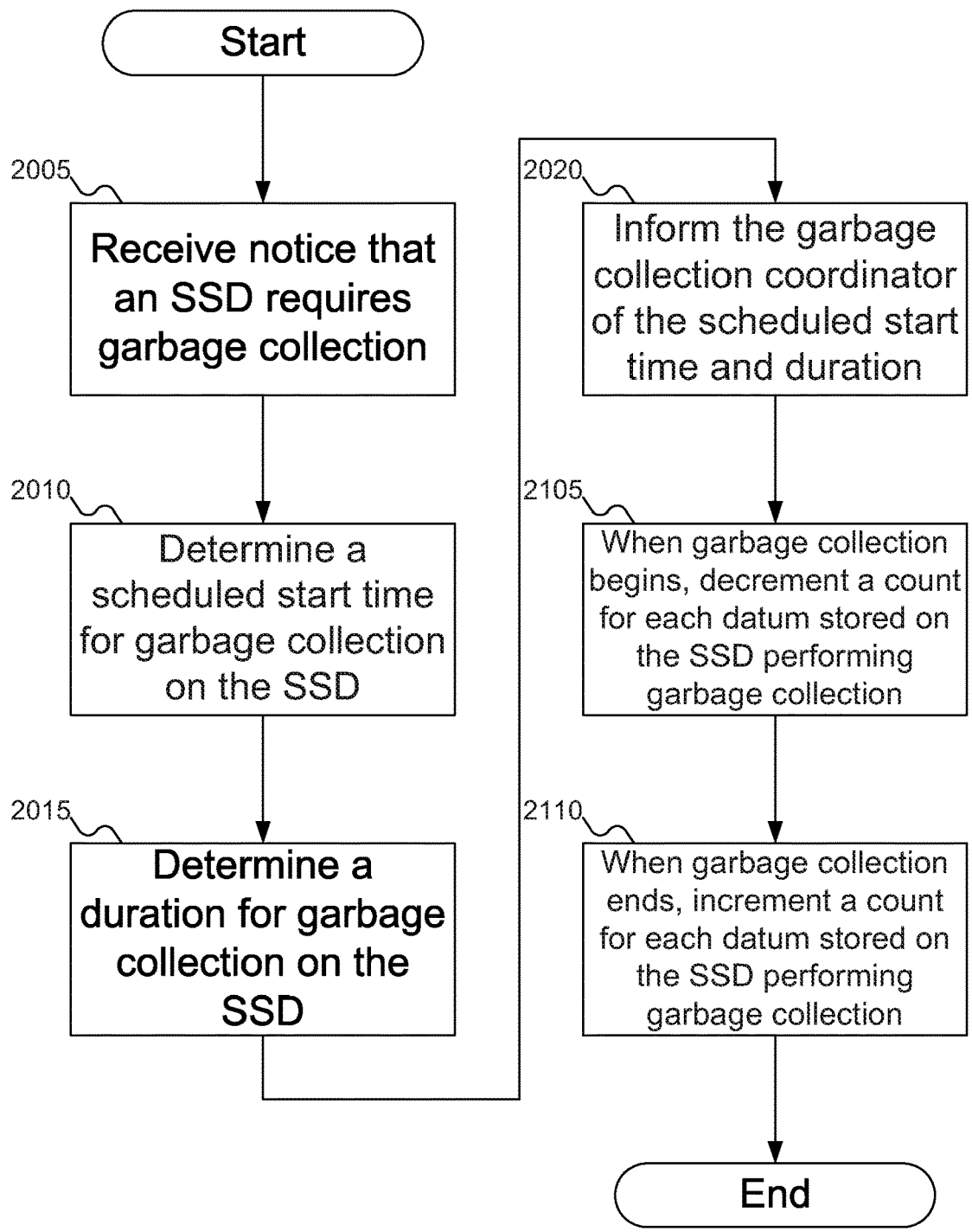

FIGS. 20 and 21 show flowcharts of example procedures for monitor 170 of FIG. 1 to handle when selected SSD 615 of FIG. 6 is performing garbage collection, according to embodiments of the inventive concept. In FIG. 20, at block 2005, monitor 170 of FIG. 1 may receive notice from garbage collection coordinator 210 of FIG. 1 that selected SSD 615 of FIG. 6 needs to perform garbage collection. This notice may include scheduled start time 810 of FIG. 8 and estimated time 725 of FIG. 7 required by selected SSD 615 of FIG. 6 to perform garbage collection. At block 2010, monitor 170 of FIG. 1 may select a scheduled start time for selected SSD 615 of FIG. 6 to perform garbage collection, and at block 2015, monitor 170 of FIG. 1 may select a duration for selected SSD 615 of FIG. 6 to perform garbage collection. At block 2020, monitor 170 may notify garbage collection coordinator 210 of FIG. 2 of scheduled start time 810 and duration 820 of FIG. 8.

At block 2025, when scheduled start time 810 of FIG. 8 for garbage collection arrives, monitor 170 of FIG. 1 may update map 1310 of FIG. 13 of data in the distributed storage system to reflect that selected SSD 615 of FIG. 6 is now unavailable. Monitor 170 of FIG. 1 may be informed that garbage collection has started on selected SSD 615 of FIG. 6 via a notification from garbage collection coordinator 210 of FIG. 2. At block 2030, when garbage collection completes, monitor 170 of FIG. 1 may update map 1310 of FIG. 13 of data in the distributed storage system to reflect that selected SSD 615 of FIG. 6 is now once again available. Monitor 170 of FIG. 1 may be informed that garbage collection has ended on selected SSD 615 of FIG. 6 via a notification from garbage collection coordinator 210 of FIG. 2.

FIG. 20 represents embodiments of the inventive concept using GC with Acknowledgement. In embodiments of the inventive concept using GC with No Acknowledgement, blocks 2010, 2015, and 2020 would be omitted, as monitor 170 of FIG. 1 would not select scheduled start time 810 or duration 820 of FIG. 8 for garbage collection on selected SSD 615 of FIG. 6.

FIG. 21 is similar to FIG. 20. The difference between FIGS. 20 and 21 is that in FIG. 21, blocks 2025 and 2030 are replaced with blocks 2105 and 2110. At block 2105, when scheduled start time 810 of FIG. 8 for garbage collection arrives, monitor 170 of FIG. 1 may decrement counts 1415, 1418, 1421, and 1424 of FIG. 14 for each unit 1403, 1406, 1409, and 1412 of FIG. 14 of data in map 1310 of FIG. 13 of data in the distributed storage system to reflect that data stored on selected SSD 615 of FIG. 6 is now unavailable. Monitor 170 of FIG. 1 may be informed that garbage collection has started on selected SSD 615 of FIG. 6 via a notification from garbage collection coordinator 210 of FIG. 2. At block 2110, when garbage collection completes, monitor 170 of FIG. 1 may increment counts 1415, 1418, 1421, and 1424 of FIG. 14 for each unit 1403, 1406, 1409, and 1412 of FIG. 14 of data in map 1310 of FIG. 13 of data in the distributed storage system to reflect that data stored on selected SSD 615 of FIG. 6 is now once again available. Monitor 170 of FIG. 1 may be informed that garbage collection has ended on selected SSD 615 of FIG. 6 via a notification from garbage collection coordinator 210 of FIG. 2.

Figure 22A:
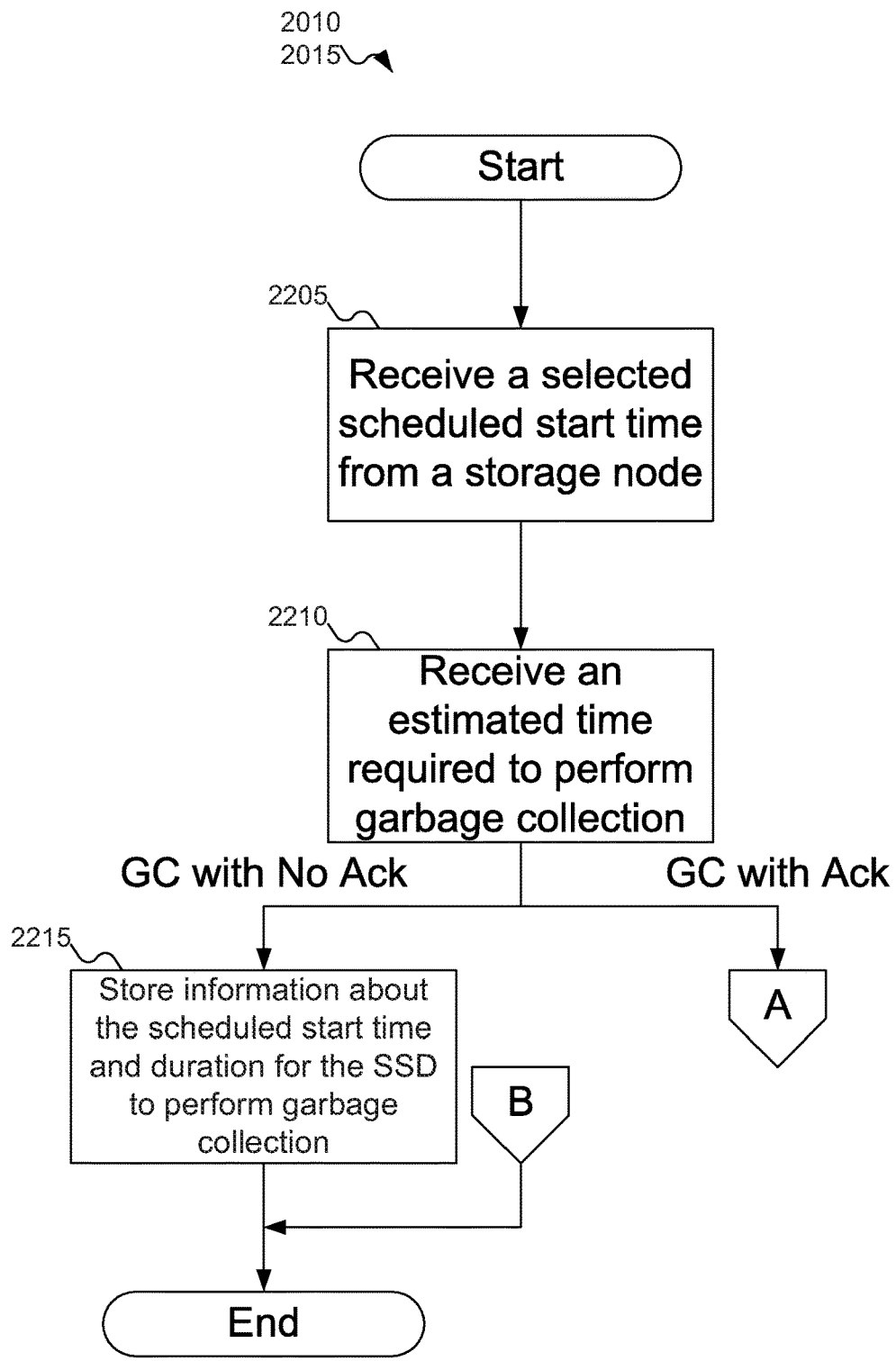
FIGS. 22A-22B show a flowchart of a procedure for the monitor of FIG. 1 to determine the start time and duration of garbage collection for the SSD selected in FIG. 6, according to an embodiment of the inventive concept.
Figure 22B:
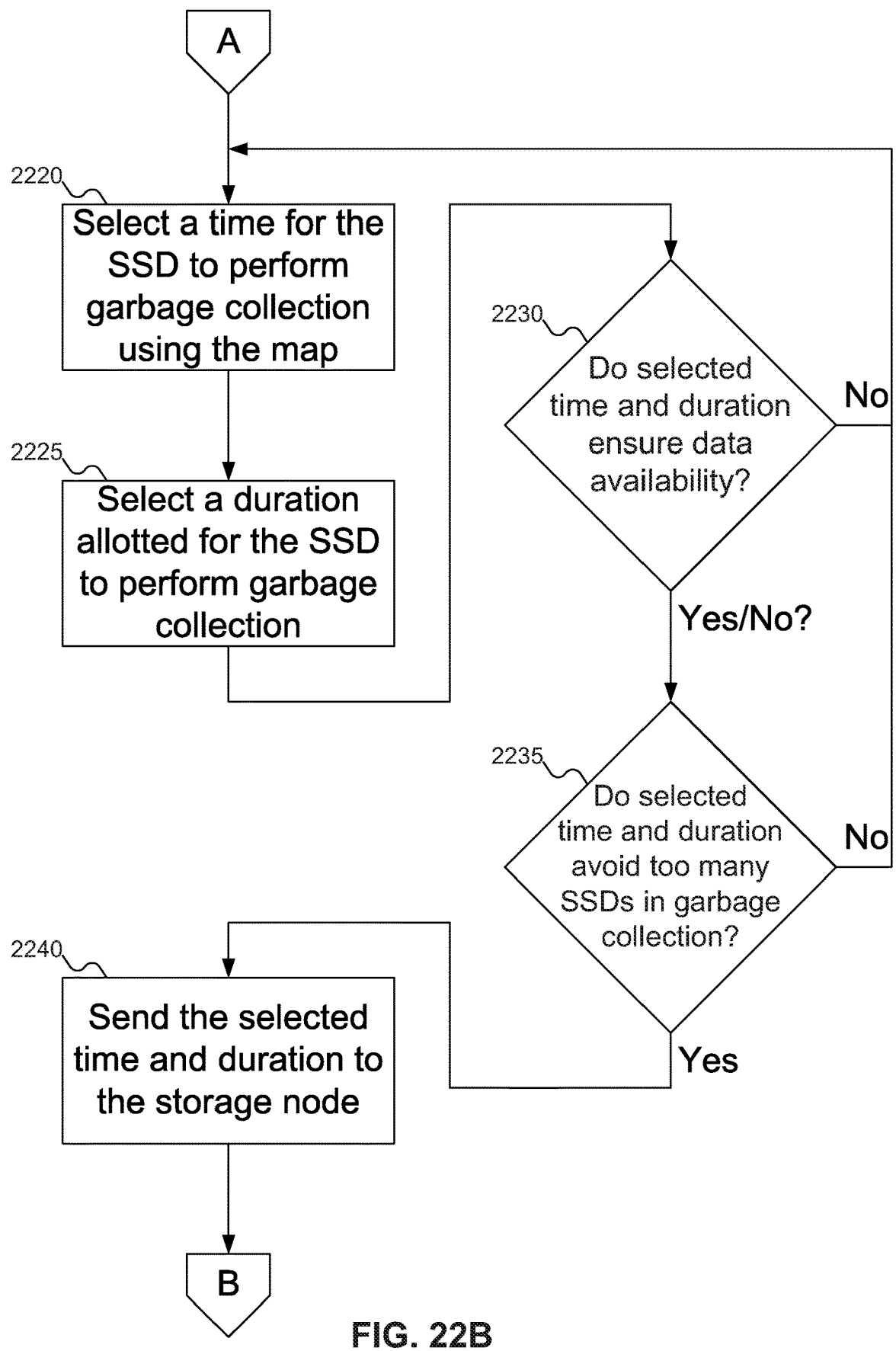

FIGS. 22A-22B show a flowchart of an example procedure for monitor 170 of FIG. 1 to determine scheduled start time 810 and duration 820 of FIG. 8 of garbage collection for selected SSD 615 of FIG. 6, according to an embodiment of the inventive concept. In FIG. 22A, at block 2205, monitor 170 of FIG. 1 may receive scheduled start time 810 of FIG. 8 as selected by garbage collection coordinator 210 of FIG. 2. At block 2210, monitor 170 of FIG. 1 may receive estimated time 725 of FIG. 7 required for selected SSD 615 of FIG. 6 to perform garbage collection.

At this point, the flowchart may diverge, depending on whether embodiments of the inventive concept use GC with Acknowledgement or GC with No Acknowledgment. In embodiments of the inventive concept using GC with No Acknowledgement, at block 2215, monitor 170 may store scheduled start time 810 of FIG. 8 and estimated time 725 of FIG. 7 required for selected SSD 615 of FIG. 6 to perform garbage collection. Since monitor 170 does not send an acknowledgement when the distributed storage system uses GC with No Acknowledgement, at this point monitor 170 of FIG. 1 has completed its determination of scheduled start time 810 and duration 820 of FIG. 8.

In embodiments of the inventive concept using GC with Acknowledgement, at block 2220 (FIG. 22B) monitor 170 may select a start time for selected SSD 615 of FIG. 6 to perform garbage collection. At block 2225, monitor 170 of FIG. 1 may select a time allotted for selected SSD 615 to perform garbage collection. At block 2230, monitor 170 of FIG. 1 may check to see if the selected start time and time allotted for selected SSD 615 of FIG. 6 ensure that data stored on selected SSD 615 of FIG. 6 will be available (via replicated copies on other storage devices). At block 2235, monitor 170 of FIG. 1 may check to see if the selected start time and time allotted for selected SSD 615 of FIG. 6 would overlap with other SSDs performing garbage collection, making too many devices unavailable at the same time. If the checks in either of blocks 2230 and 2235 return negative results (either data would be completely unavailable, or too many SSDs would be performing garbage collection at the same time), then control may return to block 2220 for monitor 170 of FIG. 1 to select a new start time and time allotted. Otherwise, at block 2240 monitor 170 may send to garbage collection coordinator 210 of FIG. 2 the selected start time and time allotted as scheduled start time 810 and duration 820 of FIG. 8.

Note that the two checks in blocks 2230 and 2235 are different. For example, it may happen that block 2230 indicates that replicated copies of the data on selected SSD 615 are available on other storage devices, but because too many other SSDs are performing garbage collection at the same time, block 2235 would fail. On the other hand, if only one other SSD is performing garbage collection at the same time, block 2235 might indicate that selected SSD 615 of FIG. 6 could perform garbage collection: but if the other SSD performing garbage collection had the only other copy of some data on selected SSD 615 of FIG. 6, block 2230 would fail.

Note also that the arrow leading from block 2230 to block 2235 is labeled "Yes/No?". If block 2230 indicates that data would be available despite selected SSD 615 performing garbage collection, then control may proceed to block 2235. But it might happen that selected SSD 615 has the only copy of some data on the distributed storage system. If this happens, then selected SSD 615 of FIG. 6 could not be scheduled for garbage collection at any time without some data becoming unavailable (at least, until that data is replicated). In this situation, selected SSD 615 of FIG. 6 might have to be permitted to perform garbage collection, despite the fact that some data would become unavailable.

Another reason why selected SSD 615 of FIG. 6 might be scheduled for garbage collection even though some data would become unavailable would be if selected SSD 615 of FIG. 6 has waited a sufficient amount of time to perform garbage collection. That is, if selected SSD 615 of FIG. 6 has been waiting to perform garbage collection beyond some threshold amount of time, selected SSD 615 of FIG. 6 may be permitted to perform garbage collection even though that fact might mean that some data on the distributed storage system would be unavailable.

FIGS. 22A-22B do not show monitor 170 of FIG. 1 using waiting list 1315 of FIG. 13. If monitor 170 of FIG. 1 may not schedule selected SSD 615 of FIG. 6 for garbage collection because too many SSDs are performing garbage collection, monitor 170 of FIG. 1 may store information about selected SSD 615 of FIG. 6 in waiting list 1315 of FIG. 13 until fewer SSDs are performing garbage collection. Monitor 170 may then remove selected SSD 615 of FIG. 6 from waiting list 1315 of FIG. 13, and return control to block 2220 to again attempt to schedule garbage collection for selected SSD 615 of FIG. 6.

If too many SSDs want to perform garbage collection at the same time and monitor 170 of FIG. 1 may not schedule them all, monitor 170 of FIG. 1 may use any desired algorithm to select which SSDs get to perform garbage collection. Possible approaches include selecting an appropriate number of SSDs at random, selecting SSDs based on the arrival times of the notices from garbage collection coordinator 210 of FIG. 2, selecting SSDs that are considered the most important (to keep those SSDs as open as possible for new data writes), or selecting SSDs that store the least amount of important data (to keep important data available). How many SSDs may be permitted to perform garbage collection at the same time is a system parameter, and may be specified as a percentage of available SSDs or a fixed number, and may be specified statically (when the distributed storage system is deployed) or dynamically (changing as conditions within the distributed storage system change).

Although FIGS. 22A-22B describe an example operation of monitor 170 of FIG. 1 with respect to only one selected SSD 615 of FIG. 6, monitor 170 of FIG. 1 may perform the example procedure of FIGS. 22A-22B for many SSDs at the same time. For example, monitor 170 of FIG. 1 might receive notice at the same time that a number of SSDs all need to perform garbage collection. Monitor 170 of FIG. 1 may perform the example procedure of FIGS. 22A-22B for all the SSDs at the same time.

The above discussion describes how an I/O request may be redirected when a storage device is performing garbage collection. But there may be situations where, even though the storage device is undergoing garbage collection, processing the I/O request locally might still be preferable. For example, if the storage device is will only be performing garbage collection for a few microseconds more, the time required to communicate with another replica of the data will be more than the time required to simply let the storage device complete its garbage collection and then process the I/O request. There are also other reasons why it might be more efficient to process the I/O request at the primary replica, rather than directing the I/O request to a secondary replica. Alternatively, there might be situations in which the primary replica is not undergoing garbage collection, but it would nevertheless be more efficient to process the I/O request at a secondary replica rather than at the primary replica.

Figure 23:
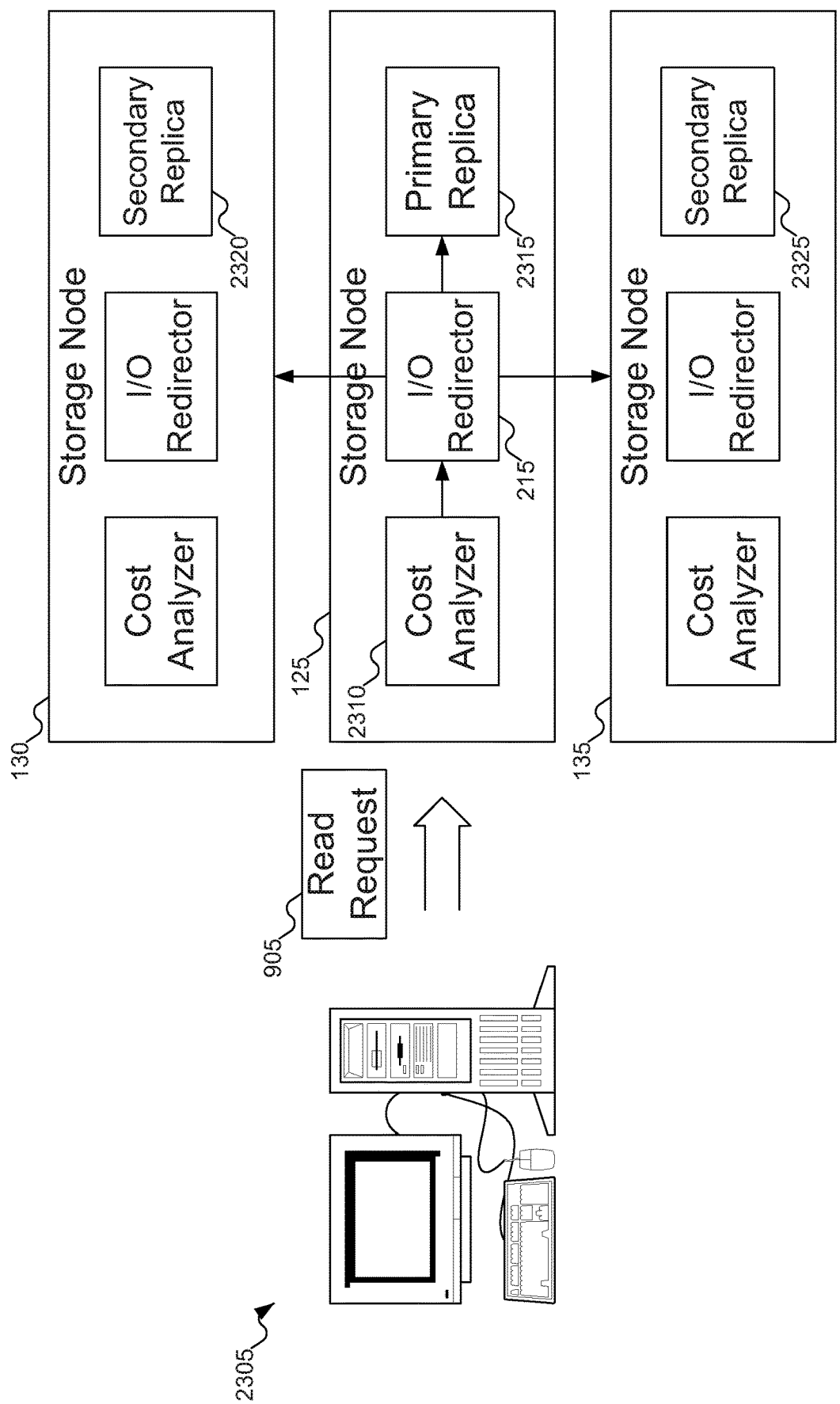
FIG. 23 shows a client sending an I/O request to the storage node of FIG. 1, which may then redirect the I/O request another node containing a replica of the requested data, according to an embodiment of the inventive concept.

FIG. 23 shows a client sending an I/O request to the storage node of FIG. 1, which may then redirect the I/O request another node containing a replica of the requested data, according to an embodiment of the inventive concept. In FIG. 23, client 2305 is sending read request 905 to system node 125; any other I/O request could be substituted for read request 905 without loss of generality.

System node 125 (and system nodes 130 and 135 as well) may include cost analyzer 2310 and I/O redirector 215 in addition to storage device(s). In FIG. 23, the storage device in system node 125 is identified as primary replica 2315, as system node 125 may store the primary copy of the data in question. In contrast, the storage devices in system nodes 130 and 135 are identified as secondary replicas 2320 and 2325, since they store backup copies of the data in question.

As described below with reference to FIGS. 24-38, cost analyzer 2310 may determine the costs associated with processing the I/O request both locally (at the primary replica) and remotely (at one of the secondary replicas). In this context, "cost" may be interpreted as "time": that is, will it take more or less time to process I/O request 905 at primary replica 2315 relative to one of secondary replicas 2320 and 2325. But in other embodiments of the inventive concept, "costs" may mean other concepts than time, such as I/O performance metrics (Input/Output Operations Per Second (IOPS), latency, throughput, etc.), different service levels, etc. I/O redirector 215 may then compare the cost to perform I/O request 905 at primary replica 2315 vs. secondary replicas 2320 and 2325, and select a replica accordingly.

FIG. 24 shows details of cost analyzer 2310 of FIG. 23. In FIG. 24, cost analyzer 2310 may include local time estimator 2405, remote time estimator 2410, query logic 2415, reception logic 2420, database 2425, local predictive analyzer 2430, and remote predictive analyzer 2435. Local time estimator 2405 and remote time estimator 2410 may attempt to calculate the time required to process I/O request 905 of FIG. 23 at primary replica 2315 of FIG. 23 and secondary replicas 2320 and 2325 of FIG. 23, based on current information. Local time estimator 2405 and remote time estimator 2410 are described further below with reference to FIGS. 26 and 27 below, respectively.

Query logic 2415 and reception logic 2420 may be used to send requests for information and receive the responses to those requests. For example, as described below with reference to FIG. 28, query logic 2415 may query primary replica 2315 of FIG. 23 for the number of free pages, and reception logic 2420 may receive that number of free pages from primary replica 2315 of FIG. 23. Query logic 2415 may request information, such as the number of free pages and threshold number of free pages on primary replica 2315 or secondary replicas 2320 and 2325, all of FIG. 23, the number of pending I/O requests at primary replica 2315 of FIG. 23 and the time required to process individual I/O requests, the time required to communicate with system nodes 130 and 135, which include secondary replicas 2320 and 2325, all of FIG. 23, and the remote processor load and remote software stack load from processors associated with system nodes 130 and 135, which include secondary replicas 2320 and 2325, all of FIG. 23, either on an as-needed basis—that is, when local time estimator 2405 needs to calculate the local estimated time required to process I/O request 905 of FIG. 23 at primary replica 2315 of FIG. 23—or periodically (typically, at some regular interval, such as every 10 seconds, every few seconds, every second, or every fraction of a second), to maintain current information about the replicas for eventual use.

Database 2425 may store information used by the various modules of cost analyzer 2310, such as local time estimator 2405, remote time estimator 2410, local predictive analyzer 2430, and remote predictive analyzer 2435. Database 2425 is discussed further with reference to FIG. 31 below. Finally, local predictive analyzer 2430 and remote predictive analyzer 2435 may make predictions about the time required to process I/O request 905 of FIG. 23 locally and remotely based on historical data. Local predictive analyzer 2430 and remote predictive analyzer 2435 are discussed further with reference to FIGS. 32 and 36 below, respectively.

FIG. 25 shows details of I/O redirector 215 of FIG. 23. In FIG. 25, I/O redirector may include storage 2505, first comparator 2510, second comparator 2515, and selector 2520. Storage 2505 may store information, such as threshold time 2525. Threshold time 2525 may be a threshold time below which there is no value in sending I/O request 905 of FIG. 23 to a secondary replica. For example, threshold time 2525 might be an amount of time that is less than the time required to communicate with secondary replicas 2320 and 2325 of FIG. 23. If the time required to process I/O request 905 of FIG. 23 at primary replica 2315 of FIG. 23 is less than threshold time 2525, then there is no need to even calculate the time required to process I/O request 905 of FIG. 23 at secondary replicas 2320 and 2325 of FIG. 23. I/O redirector 215 may compare the estimated time required to process I/O request 905 of FIG. 23 at primary replica 2315 of FIG. 23 using first comparator 2510 to make this determination.

Second comparator 2515 may compare the estimated time required to process I/O request 905 of FIG. 23 at primary replica 2315 of FIG. 2 with the estimated time required to process I/O request 905 of FIG. 23 at secondary replicas 2320 and 2325 of FIG. 23. Selector 2520 may then select one of primary replica 2315 of FIG. 23 and secondary replicas 2320 and 2325 of FIG. 23, based on the results of second comparator 2515.

Figure 26:
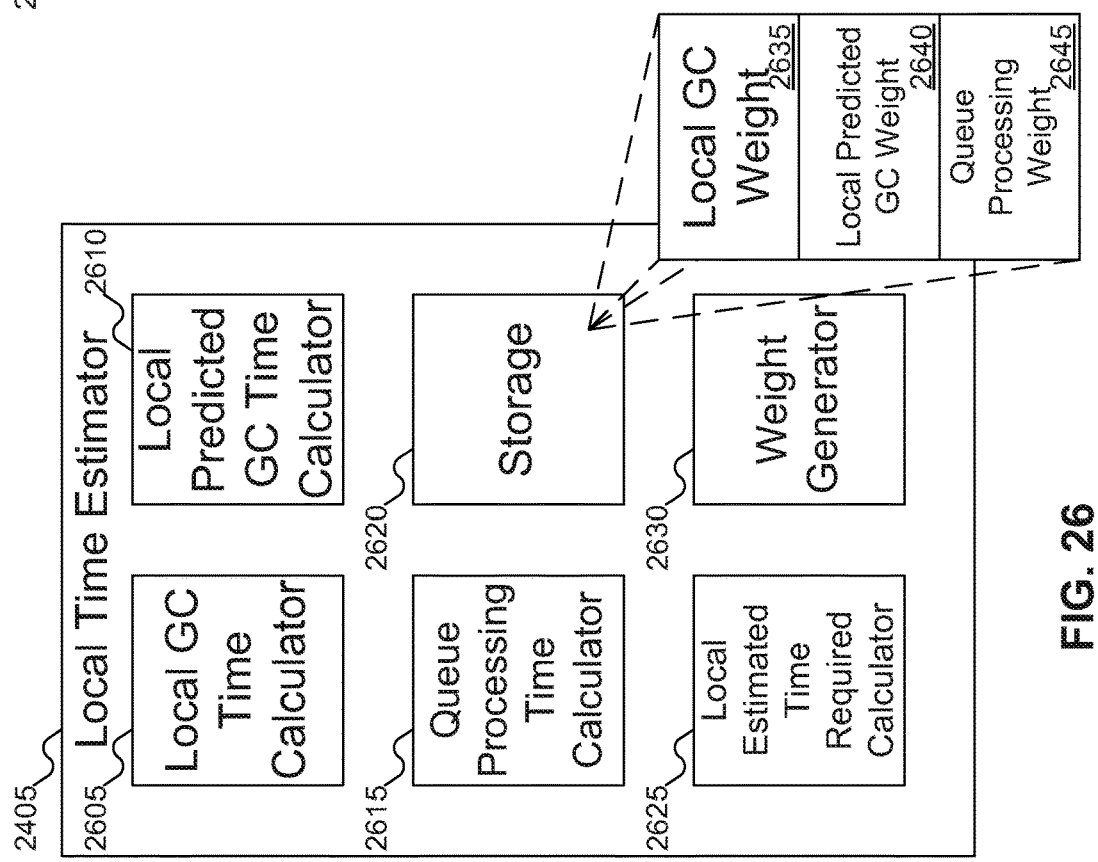
FIG. 26 shows details of the local time estimator of FIG. 24.

FIG. 26 shows details of local time estimator 2405 of FIG. 24. Local time estimator 2405 may estimate how long it will take primary replica 2315 of FIG. 23 to satisfy I/O request 905 of FIG. 23. To support this operation, local time estimator 2405 may include local garbage collection time calculator 2605, local predicted garbage collection time calculator 2610, queue processing time calculator 2615, storage 2620, local estimated time required calculator 2625, and weight generator 2630. Local garbage collection time calculator 2605 may calculate the local garbage collection time for primary replica 2315 of FIG. 23, when primary replica 2315 of FIG. 23 is currently undergoing garbage collection. Local predicted garbage collection time calculator 2610 is similar to local garbage collection time calculator 2605, except that local predicted garbage collection time calculator 2610 estimates how long primary replica 2315 of FIG. 23 will take to perform an upcoming garbage collection. Queue processing time calculator 2615 may calculate how long it will take process the I/O requests in the queue at primary replica 2315 of FIG. 23 (which would be completed before I/O request 905 of FIG. 23 is processed, assuming that primary replica 2315 of FIG. 23 processes I/O requests in the order received). Storage 2620 may store information used by local time estimator 2405, such as local garbage collection weight 2635, local predicted garbage collection weight 2640, and queue processing weight 2645. These weights, which may be generated by weight generator 2630, are discussed further with reference to FIG. 33 below. Finally, local estimated time required calculator 2625 may generate an estimate of the time required to complete the processing of I/O request 905 of FIG. 23 based on historical information rather than actual current information.

Figure 27:
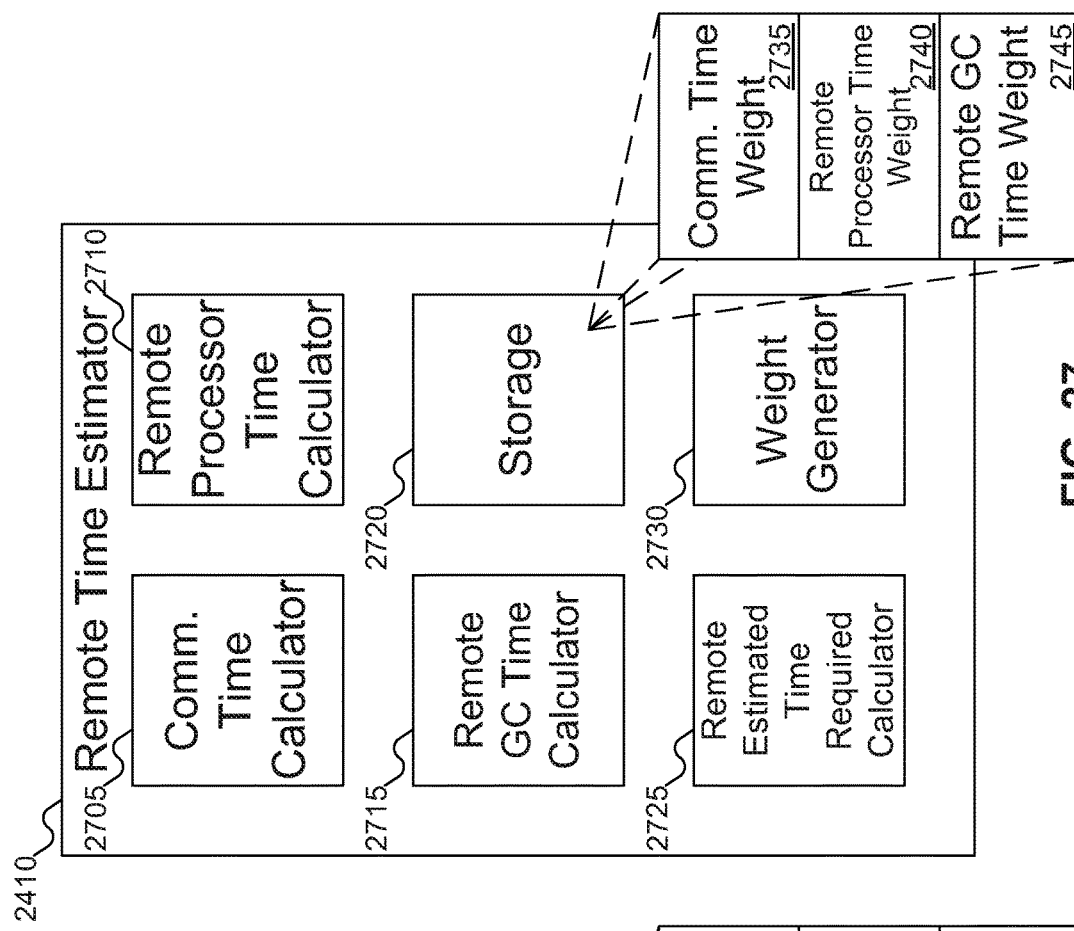
FIG. 27 shows details of the remote time estimator of FIG. 24.

FIG. 27 shows details of remote time estimator 2410 of FIG. 24. Remote time estimator 2410 may estimate how long it will take secondary replicas 2320 and 2325 of FIG. 23 to satisfy I/O request 905 of FIG. 23. To support this operation, remote time estimator 2410 may include communication time calculator 2705, remote processing time calculator 2710, remote garbage collection time calculator 2715, storage 2720, remote estimated time required calculator 2725, and weight generator 2730. Communication time calculator 2705 may calculate the time required for communication with secondary replica 2320 and 2325 of FIG. 23. Remote processor time calculator 2710 may calculate the time required to process I/O request 905 of FIG. 23 based on the current loads on the processors at system nodes 130 and 135 (including secondary replicas 2320 and 2325, respectively) in FIG. 23. Remote garbage collection time calculator 2715 may calculate the remote garbage collection time for secondary replicas 2320 and 2325 of FIG. 23, assuming that secondary replicas 2320 and/or 2325 of FIG. 23 are currently undergoing garbage collection. Storage 2720 may store information used by remote time estimator 2405, such as communication time weight 2735, remote processor time weight 2740, and remote garbage collection weight 2745. These weights, which may be generated by weight generator 2630, are discussed further with reference to FIG. 37 below. Finally, remote estimated time required calculator 2725 may generate an estimate of the time required to complete the processing of I/O request 905 of FIG. 23 based on historical information rather than actual current information.

Figure 28:
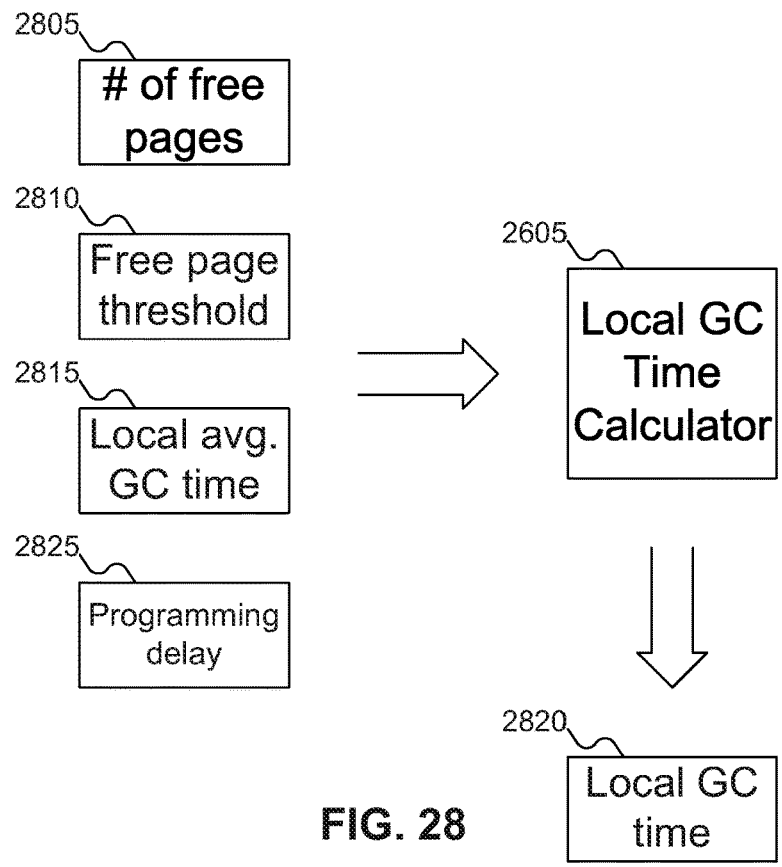
FIGS. 28 and 29 show the local garbage collection time calculator and the local predicted garbage collection time calculator, both of FIG. 26, calculating the local garbage collection time and the local predicted garbage collection time.
Figure 29:
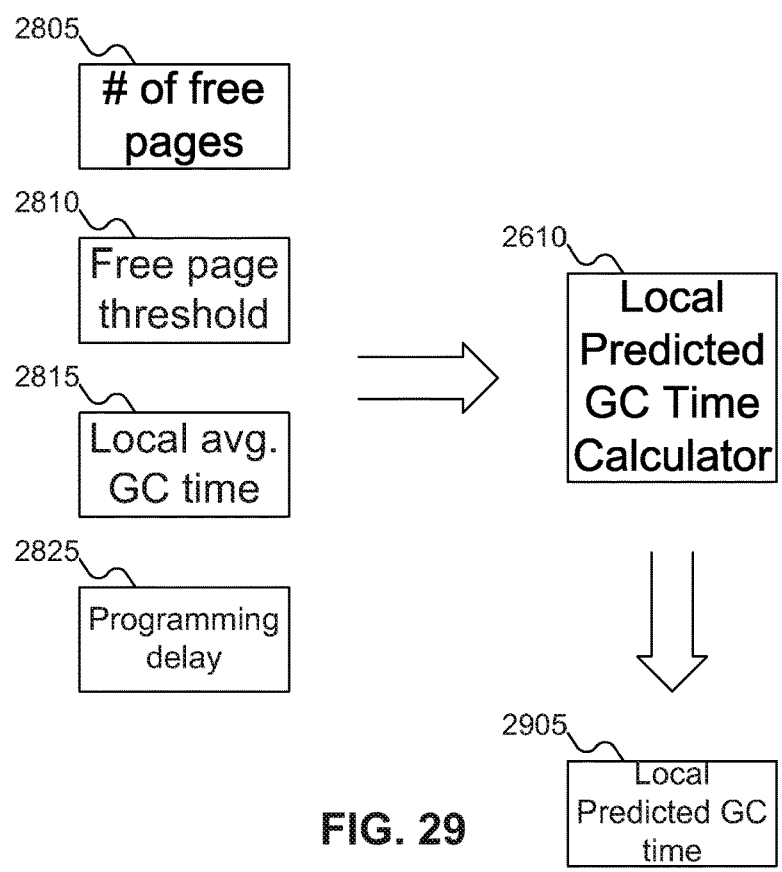

FIGS. 28 and 29 show local garbage collection time calculator 2605 and local predicted garbage collection time calculator 2610, both of FIG. 26, calculating the local garbage collection time and the predicted garbage collection time. Because the operations of these two calculators are very similar, they may be discussed together. The only difference between their operations is that local garbage collection time calculator 2605 determines the time required to complete a garbage collection operation already underway on primary replica 2315 of FIG. 23, whereas local predicted garbage collection time calculator 2610 determines the time required to perform a garbage collection operation that is due to begin (but has not yet actually begun).

In each case, query logic 2415 of FIG. 24 may query primary replica 2315 of FIG. 23 for its actual number of free pages 2805 and its free page threshold 2810. (Alternatively, as free page threshold 2810 is typically a constant for a given model of storage device, free page threshold 2810 may be stored in storage 2620 of FIG. 26 and accessed therefrom, rather than by querying primary replica 2315 of FIG. 23.) Number of free pages 2805 may indicate how many free pages are currently present on primary replica 2315 of FIG. 23; free page threshold 2810 may indicate a minimum number of free pages required on primary replica 2315 of FIG. 23. If number of free pages 2805 drops below free page threshold 2810, then primary replica 2315 of FIG. 23 will perform garbage collection to free up more pages for data writes.

Once reception logic 2420 of FIG. 24 receives number of free pages 2805 and free page threshold 2810, local garbage collection time calculator 2605 and local predicted garbage collection time calculator 2610 may determine local average garbage collection time 2815. Local average garbage collection time 2815 may represent the amount of time needed, on average, to free a single page on primary replica 2315 of FIG. 23. Local average garbage collection time 2815 may be determined either by accessing a fixed value that may be stored in storage 2620 or database 2425 of FIG. 24, or it may be calculated from historical information about garbage collection operations on primary replica 2315 of FIG. 23: this historical information may be stored in database 2425 of FIG. 24.

Although local average garbage collection time 2815 includes the term "average" in its name, local average garbage collection time 2815 may be calculated in any desired manner. For example, local average garbage collection time 2815 may be calculated as the mean, median, or mode of the time to recover a single page over all garbage collection operations performed on primary replica 2315 of FIG. 23. Or, local average garbage collection time 2815 may be calculated using linear regression analysis over the historical local garbage collection information on primary replica 2315 of FIG. 23. Or, local average garbage collection time 2815 may be calculated based on a sliding window of the most recent garbage collection operations, such as the most recent 10 (or any other desired number) garbage collection operations. Still other techniques to calculate local average garbage collection time 2815 may be used.

Local garbage collection time calculator 2605 and local predicted garbage collection time calculator 2610 may then calculate local garbage collection time 2820 and local predicted garbage collection time 2905 as the difference between actual number of free pages 2805 on primary replica 2315 of FIG. 23 and free page threshold 2810, multiplied by local average garbage collection time 2815.

Optionally, local garbage collection time calculator 2605 and local predicted garbage collection time calculator 2610 may also add in Programming delay 2825, which may account for the time required to Program valid pages in erase blocks into other pages before the erase blocks are erased. Programming delay 2825, like local average garbage collection time 2815, may either be a fixed number determined in advance or it may be computed from historical information in much the same way as local average garbage collection time 2815. Programming delay 2825 may just be added in as a constant to local garbage collection time 2820 and local predicted garbage collection time 2905, or it may be multiplied by the difference between actual number of free pages 2805 and free page threshold 2810 (to account for the fact that the number of pages requiring Programming may be variable).

Because local garbage collection time calculator 2605 and local predicted garbage collection time calculator 2610 operate so similarly, in some embodiments of the inventive concept they may be implemented using a single logic to cover both variations. They may each be implemented using logic circuits or with software running on a processor (for example, an In-Storage Processor on a SSD). In addition, remote garbage collection time calculator 2715 of FIG. 27 operates similarly to local garbage collection time calculator 2805, except that queries are about the garbage collection state of secondary replicas 2320 and 2325 of FIG. 23. Thus, remote garbage collection time calculator 2715 of FIG. 27 may be understood based on the description of local garbage collection time calculator 2605, and is not described in additional detail.

Figure 30:
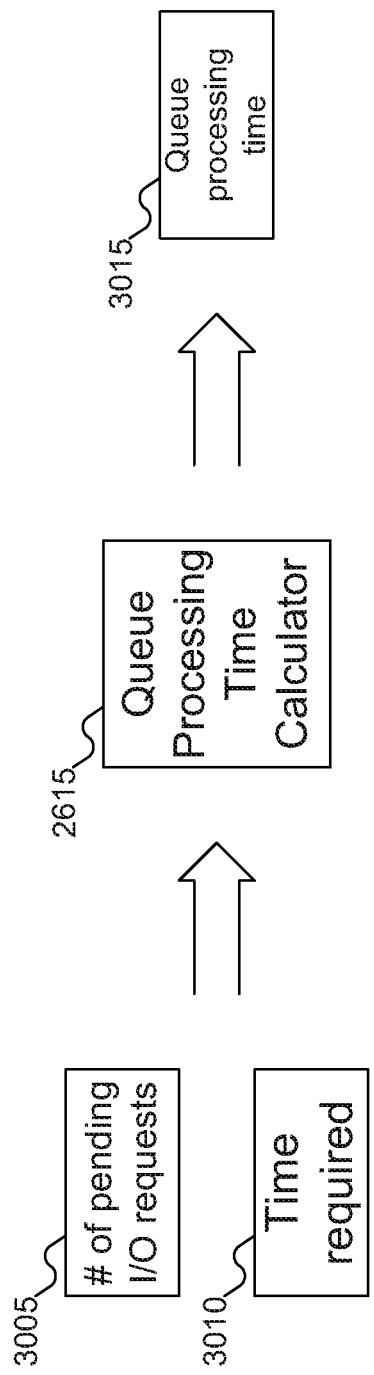
FIG. 30 shows the queue processing time calculator of FIG. 26 calculating the queue processing time.

FIG. 30 shows queue processing time calculator 2615 of FIG. 26 calculating the queue processing time. Queue processing time calculator 2615 may take number of pending I/O requests 3005 and time required to process a single I/O request 3010 and multiply the two values together to determine queue processing time 3015.

Query logic 2415 of FIG. 24 may query primary replica 2315 of FIG. 23 for the number of pending requests, which reception logic 2420 of FIG. 24 may receive. Time required 3010 is typically a fixed value and may be stored in storage 2620 of FIG. 26 or in database 2425 of FIG. 24, but time required 3010 may also be computed from historical information stored in database 2425 of FIG. 24. Much like local average garbage collection time 2815 of FIG. 28, time required 3010 may be computed as the mean, median, or mode of the times required to perform an I/O command historically on primary replica 2315 of FIG. 23, or it may be computed using linear regression analysis from such historical information. In addition, the historical information used may include all historical data or just a sliding window of historical information.

FIG. 31 shows details of database 2425 of FIG. 24. In FIG. 31, database 2425 is shown as storing various data. This information may include:

Historical local garbage collection information 3105: historical information about how long garbage collection has taken when performed on primary replica 2315 of FIG. 23.

Worst case local garbage collection information 3110: how long garbage collection has taken in the worst case when performed on primary replica 2315 of FIG. 23.

Average case local garbage collection information 3115: how long garbage collection has taken, on average, performed on primary replica 2315 of FIG. 23.

Historical processing time information 3120: historical information about how long primary replica 2315 of FIG. 23 has needed to process a single I/O request 905.

Worst case processing time information 3125: how long primary replica 2315 of FIG. 23 has taken to process a single I/O request 905 in the worst case.

Average case processing time information 3130: how long primary replica 2315 of FIG. 23 has taken, on average, to process a single I/O request 905.

Historical communication time information 3135: historical information about how long it has taken to communicate with secondary replicas 2320 and 2325 of FIG. 23.

Worst case communication time information 3140: how long it has taken to communicate with secondary replicas 2320 and 2325 of FIG. 23 in the worst case.

Average case communication time information 3145: how long it has taken, on average, to communicate with secondary replicas 2320 and 2325 of FIG. 23.

Historical remote processor time information 3150: historical information about the processor and software stack loads on processors associated with system nodes 130 and 135 that include secondary replicas 2320 and 2325 of FIG. 23, and how they have affected the time required to process a single I/O request 905 at secondary replicas 2320 and 2325 of FIG. 23.

Worst case remote processor time information 3155: the time impact of the remote processor and software stack loads of processors associated with system nodes 130 and 135 that include secondary replicas 2320 and 2325 of FIG. 23 in the worst case.

Average case remote processor time information 3160: the time impact, on average, of the remote processor and software stack loads of processors associated with system nodes 130 and 135 that include secondary replicas 2320 and 2325 of FIG. 23.

Historical remote garbage collection information 3165: historical information about how long garbage collection has taken when performed on secondary replicas 2320 and 2325 of FIG. 23.

Worst case remote garbage collection information 3170: how long garbage collection has taken in the worst case when performed on secondary replicas 2320 and 2325 of FIG. 23.

Average case remote garbage collection information 3175: how long garbage collection has taken, on average, performed on secondary replicas 2320 and 2325 of FIG. 23.

As may be seen by a quick examination of the information that may be stored in database 2425, some of this information is pertinent to local time estimator 2405 of FIG. 24, and some of this information is pertinent to remote time estimator 2410 of FIG. 24. But while FIGS. 24 and 31 suggest that all of this information is stored in a single database (i.e., database 2425), embodiments of the inventive concept may divide this information into multiple databases, and may store the information in various locations. For example, information 3105-3130 might be stored in a database within local time estimator 2405 of FIG. 24 (perhaps within storage 2620 of FIG. 26), and information 3135-3175 might be stored in a database within remote time estimator 2410 of FIG. 24 perhaps within storage 2720 of FIG. 27).

FIG. 32 shows details of local predictive analyzer 2430 of FIG. 24. Local garbage collection time calculator 2605, local predicted garbage collection time calculator 2610, and queue processing time calculator 2615, all of FIG. 26, may use current information about primary replica 2315 of FIG. 23 to estimate how long it will take primary replica 2315 of FIG. 23 to process I/O request 905 of FIG. 23. In contrast, local predictive analyzer 2430 may make an estimate of the time required for primary replica 2315 of FIG. 13 to process I/O request 905 of FIG. 23 based solely on historical information. Using historical information in this manner may provide a counterpoint to the information provided by local garbage collection time calculator 2605, local predicted garbage collection time calculator 2610, and queue processing time calculator 2615, all of FIG. 26.

In addition, local predictive analyzer 2430 may provide a predicted time required for primary replica 2315 of FIG. 23 to process I/O request 905 of FIG. 23 in situations where primary replica 2315 may not provide information needed by local garbage collection time calculator 2605, local predicted garbage collection time calculator 2610, and queue processing time calculator 2615, all of FIG. 26. For example, if primary replica 2315 may not provide information about number of free pages 2805 of FIG. 28, then local garbage collection time calculator 2605 and local predicted garbage collection time calculator 2610, both of FIG. 26, may not estimate the time required to perform garbage collection on primary replica 2315 of FIG. 23. Local predictive analyzer 2430, on the other hand, uses only historical information, and does not depend on being able to access information from primary replica 2315 of FIG. 23.

Local predictive analyzer 2430 may access information from database 2425 and use that information to generate predicted local time 3205, which may predict how long it will take primary replica 2315 of FIG. 23 to complete I/O request 905 of FIG. 23. For example, local predictive analyzer 2430 may take historical information about how long primary replica 2315 of FIG. 23 has taken in the past to process, and use that information to make a prediction about how long it will take primary replica 2315 of FIG. 23 to process I/O request 905 of FIG. 23. Note that since local predictive analyzer 2430 uses historical information rather than current information about primary replica 2315 of FIG. 23, predicted local time 3205 might not be accurate. Predicted local time 3205 might be less than the actual required time, if primary replica 2315 of FIG. 23 is busier than in the past—for example, if primary replica 2315 of FIG. 23 needs to perform a larger than normal amount of garbage collection. On the other hand, predicted local time 3205 might be greater than the actual required time, if primary replica 2315 of FIG. 23 is not as busy as in the past—for example, if primary replica 2315 of FIG. 23 is busy processing a few pending I/O requests, but not needing to perform garbage collection.

Local predictive analyzer 2430 may calculate predicted local time 3205 from the information in database 2425 in any desired manner. For example, local predictive analyzer 2430 may compute the mean, median, or mode of historical local garbage collection information 3105 of FIG. 31, and it may compute the mean, median, or mode of historical processing time information 3120 of FIG. 31, and then may combine the two statistical calculations using a weighted sum. Or, local predictive analyzer 2430 may consider only historical local garbage collection information 3105 of FIG. 31, and ignore any processing time information. Or, local predictive analyzer 2430 may consider only a sliding window of the information in database 2425. Embodiments of the inventive concept are intended to encompass all such variations in how local predictive analyzer 2430 calculates predicted local time 3205.

Figure 33:
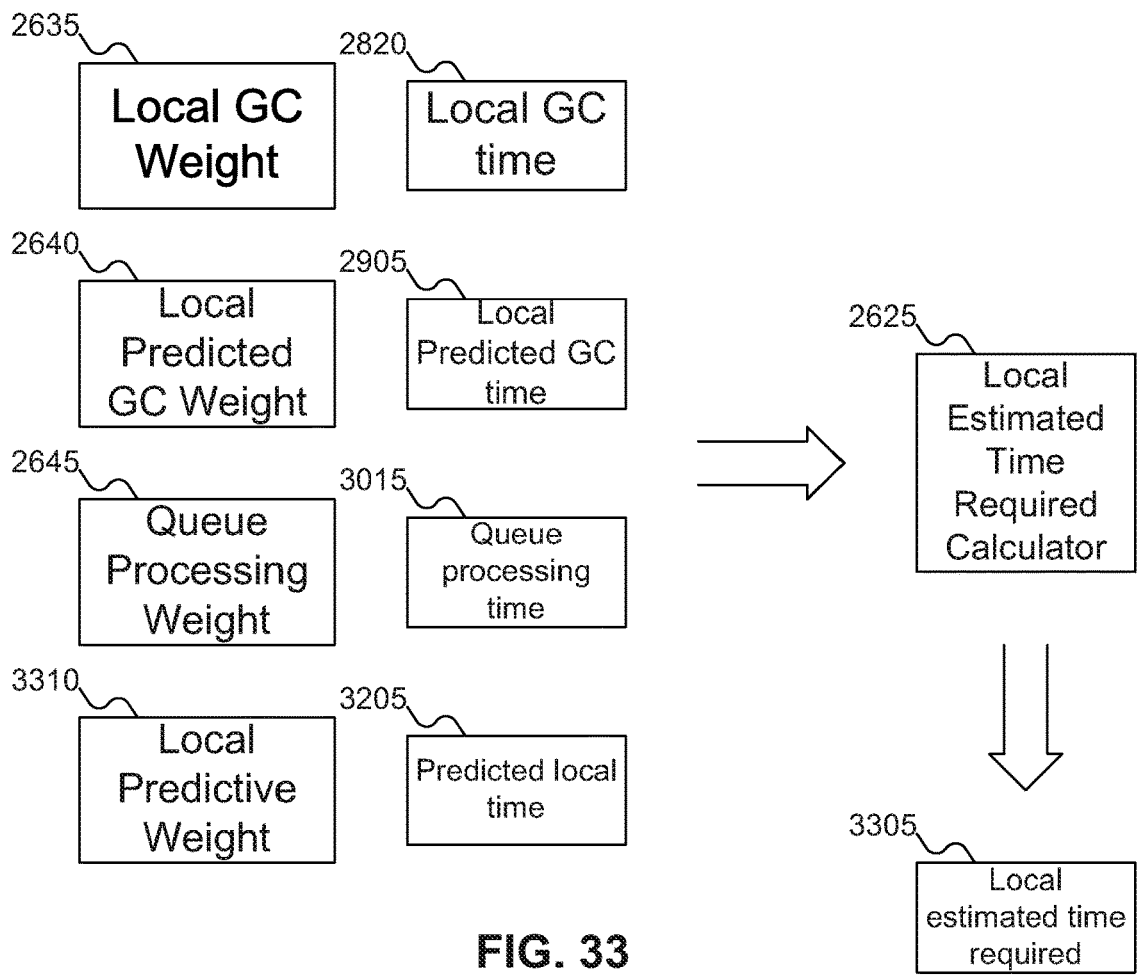
FIG. 33 shows details of the local estimated time required calculator of FIG. 26.

FIG. 33 shows details of local estimated time required calculator 2625 of FIG. 26. In FIG. 33, local estimated time required calculator 2625 may take information such as local garbage collection time 2820, local predicted garbage collection time 2905, and queue processing time 3015, and may combine them to calculate local estimated time required 3305. Local estimated time required calculator 2625 may also include local garbage collection weight 2635, local predicted garbage collection weight 2640, and queue processing weight 2645. These weights may represent how significantly each corresponding time factors into the calculation of local estimated time required 3305. For example, each of the times may be multiplied by its corresponding weight, and the resulting products may be summed together to calculate local estimated time required 3305.

Local garbage collection weight 2635, local predicted garbage collection weight 2640, and queue processing weight 2645 may be computed by any desired means. For example, weight generator 2630 of FIG. 26 may perform a linear regression analysis on the information on database 2425 of FIG. 24 to calculate the weights. This linear regression analysis may be performed on all the information in database 2425 of FIG. 24, or it may be performed on a sliding window of information in database 2425.

Local estimated time required calculator 2625 may also factor in predicted local time 3205, which may also optionally be weighted by local predictive weight 3310 (which may also be generated by weight generator 2630 of FIG. 26). By factoring in predicted local time 3205, local estimated time required calculator 2625 may balance against unusual information coming from primary replica 2315 of FIG. 23 that could lead to unusually low or high estimated times required.

While the above description uses weights 2635, 2640, 2645, and 3310, a weighted computation is optional. For example, local estimated time required calculator 2625 may compute a sum without applying any weights to the values. Put another way, weights 2635, 2640, 2645, and 3310 may all be implied weights, rather than actually stored within storage 2620 of FIG. 26. In a similar manner, if local estimated time required calculator 2625 is designed to compute local estimated time required 3305 using only a subset of the available values (for example, just local garbage collection time 2820), the "weights" applied to the other values may be set to 0 to avoid those values from influencing the result. Again, in this situation, the weights may implied: local garbage collection weight 2635 may be implicitly 1, and weights 2640, 2645, and 3310 may be 0. Of course, in situations where a weight is set to 0, the corresponding value does not need to be computed in the first place either, and the corresponding components that produce that value may also be omitted from embodiments of the inventive concept, as appropriate.

Figure 34:
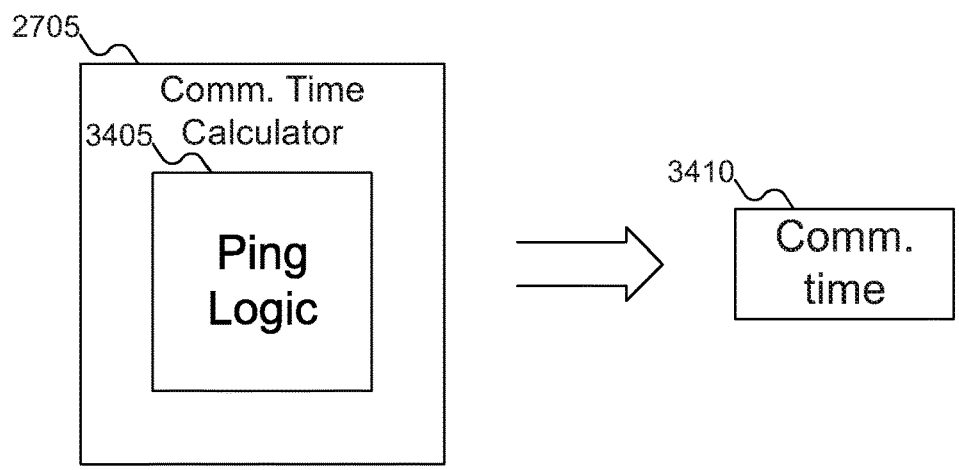
FIG. 34 shows details of the communication time calculator of FIG. 27.

FIG. 34 shows details of communication time calculator 2705 of FIG. 27. Communication time calculator 2705 may include ping logic 3405, which may ping system nodes 130 and 135, which contain secondary replicas 2320 and 2325, all of FIG. 23, to determine the time required to communicate with the nodes. Alternatively, communication time calculator may access historical communication time information 3135, worst case communication time 3140, and average case communication time 3145 from database 2425 of FIG. 31, and use that information to calculate communication time 3410. Embodiments of the inventive concept may also include other approaches to calculating the communication time with system nodes 130 and 135. For example, ping logic 3405 may send a small data request to secondary replicas 2320 and 2325 of FIG. 23, and measuring how long it takes to communicate with secondary replicas 2320 and 2325 of FIG. 23 using this small data request.

Figure 35:
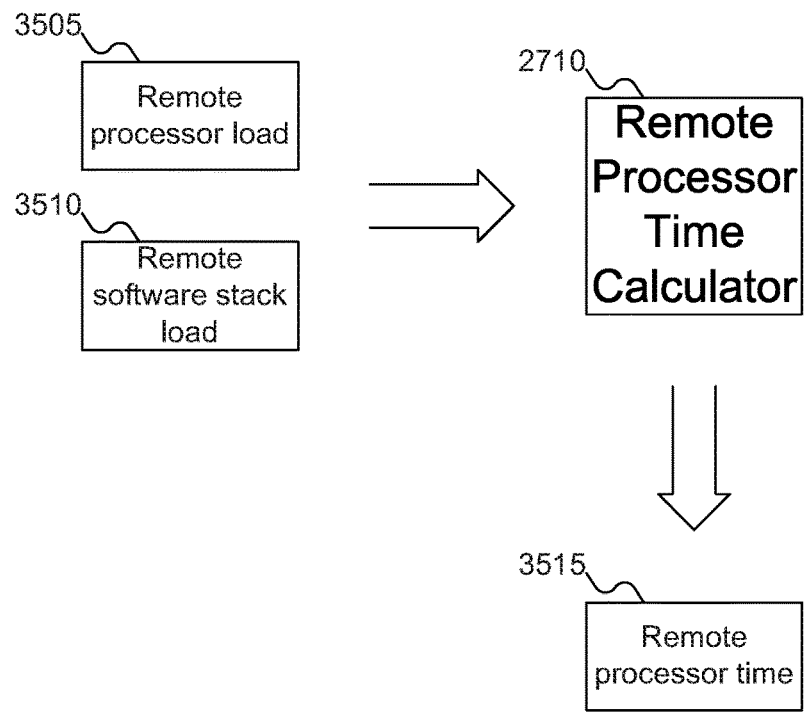
FIG. 35 shows details of the remote processor time calculator of FIG. 27.

FIG. 35 shows details of remote processor time calculator 2710 of FIG. 27. In FIG. 35, remote processor time calculator 2710 may take remote processor load 3505 and remote software stack load 3510. Query logic 2415 and reception logic 2420, both of FIG. 24, may request and receive remote processor load 3505 and remote software stack load 3510 from a processor associated with system nodes 130 and 135 of FIG. 23, which include secondary replicas 2320 and 2325 of FIG. 23. Remote processor load 3505 may represent the load on the processor in system nodes 130 and 135 of FIG. 23, while remote software stack lock 3510 may represent the load on the software running on the processor in system nodes 130 and 135 of FIG. 23. Remote processor time calculator may use any desired approach to translate loads 3505 and 3510 into remote processor time 3515. In addition, remote processor time calculator 2710 may calculate remote processor time 3515 based on only one of loads 3505 and 3510, rather than both.

Figure 36:
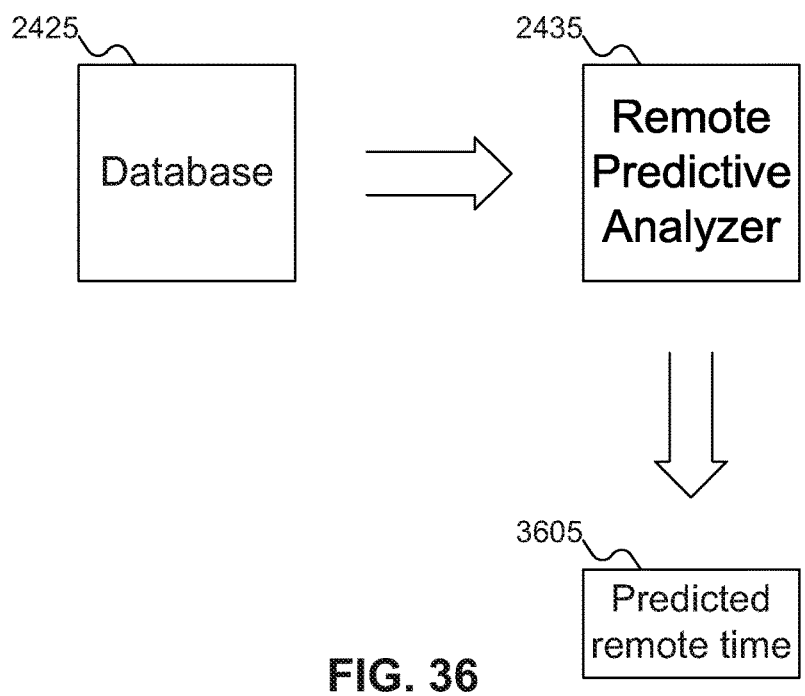
FIG. 36 shows details of the remote predictive analyzer of FIG. 24.

FIG. 36 shows details of remote predictive analyzer 2435 of FIG. 24. Communication time calculator 2705, remote processor time calculator 2710, and remote garbage collection time calculator 2715, all of FIG. 27, may use current information about secondary replicas 2320 and 2325 of FIG.

23 to estimate how long it will take secondary replicas 2320 and 2325 of FIG. 23 to process I/O request 905 of FIG. 23. In contrast, remote predictive analyzer 2435 may make an estimate of the time required for secondary replicas 2320 and 2325 of FIG. 13 to process I/O request 905 of FIG. 23 based solely on historical information. Using historical information in this manner may provide a counterpoint to the information provided by communication time calculator 2705, remote processor time calculator 2710, and remote garbage collection time calculator 2715, all of FIG. 27.

In addition, remote predictive analyzer 2435 may provide a predicted time required for secondary replicas 2320 and 2325 of FIG. 23 to process I/O request 905 of FIG. 23 in situations where secondary replicas 2320 and 2325 may not provide information needed by communication time calculator 2705, remote processor time calculator 2710, and remote garbage collection time calculator 2715, all of FIG. 26. For example, if secondary replicas 2320 and 2325 may not provide information about number of free pages 2805 of FIG. 28, then remote garbage collection time calculator 2715 of FIG. 27 may not estimate the time required to perform garbage collection on secondary replicas 2320 and 2325 of FIG. 23. Remote predictive analyzer 2435, on the other hand, uses only historical information, and does not depend on being able to access information from secondary replicas 2320 and 2325 of FIG. 23.

Remote predictive analyzer 2435 may access information from database 2425 and use that information to generate predicted remote time 3605, which may predict how long it will take secondary replicas 2320 and 2325 of FIG. 23 to complete I/O request 905 of FIG. 23. For example, remote predictive analyzer 2435 may take historical information about how long secondary replicas 2320 and 2325 of FIG. 23 has taken in the past to process, and use that information to make a prediction about how long it will take secondary replicas 2320 and 2325 of FIG. 23 to process I/O request 905 of FIG. 23. Note that since remote predictive analyzer 2435 uses historical information rather than current information about secondary replicas 2320 and 2325 of FIG. 23, predicted remote time 3605 might not be accurate. Predicted remote time 3605 might be less than the actual required time, if secondary replicas 2320 and 2325 of FIG. 23 are busier than in the past—for example, if secondary replicas 2320 and 2325 of FIG. 23 need to perform a larger than normal amount of garbage collection. On the other hand, predicted remote time 3605 might be greater than the actual required time, if secondary replicas 2320 and 2325 of FIG. 23 are not as busy as in the past—for example, if secondary replicas 2320 and 2325 of FIG. 23 are busy processing a few pending I/O requests, but not needing to perform garbage collection.

Remote predictive analyzer 2435 may calculate predicted remote time 3605 from the information in database 2425 in any desired manner. For example, remote predictive analyzer 2435 may compute the mean, median, or mode of historical remote garbage collection information 3165 of FIG. 31, and it may compute the mean, median, or mode of historical communication time information 3135 of FIG. 31, and then may combine the two statistical calculations using a weighted sum. Or, remote predictive analyzer 2435 may consider only historical remote garbage collection information 3165 of FIG. 31, and ignore any communication time and remote processor time information. Or, remote predictive analyzer 2435 may consider only a sliding window of the information in database 2425. Embodiments of the inventive concept are intended to encompass all such variations in how remote predictive analyzer 2435 calculates predicted remote time 3605.

Figure 37:
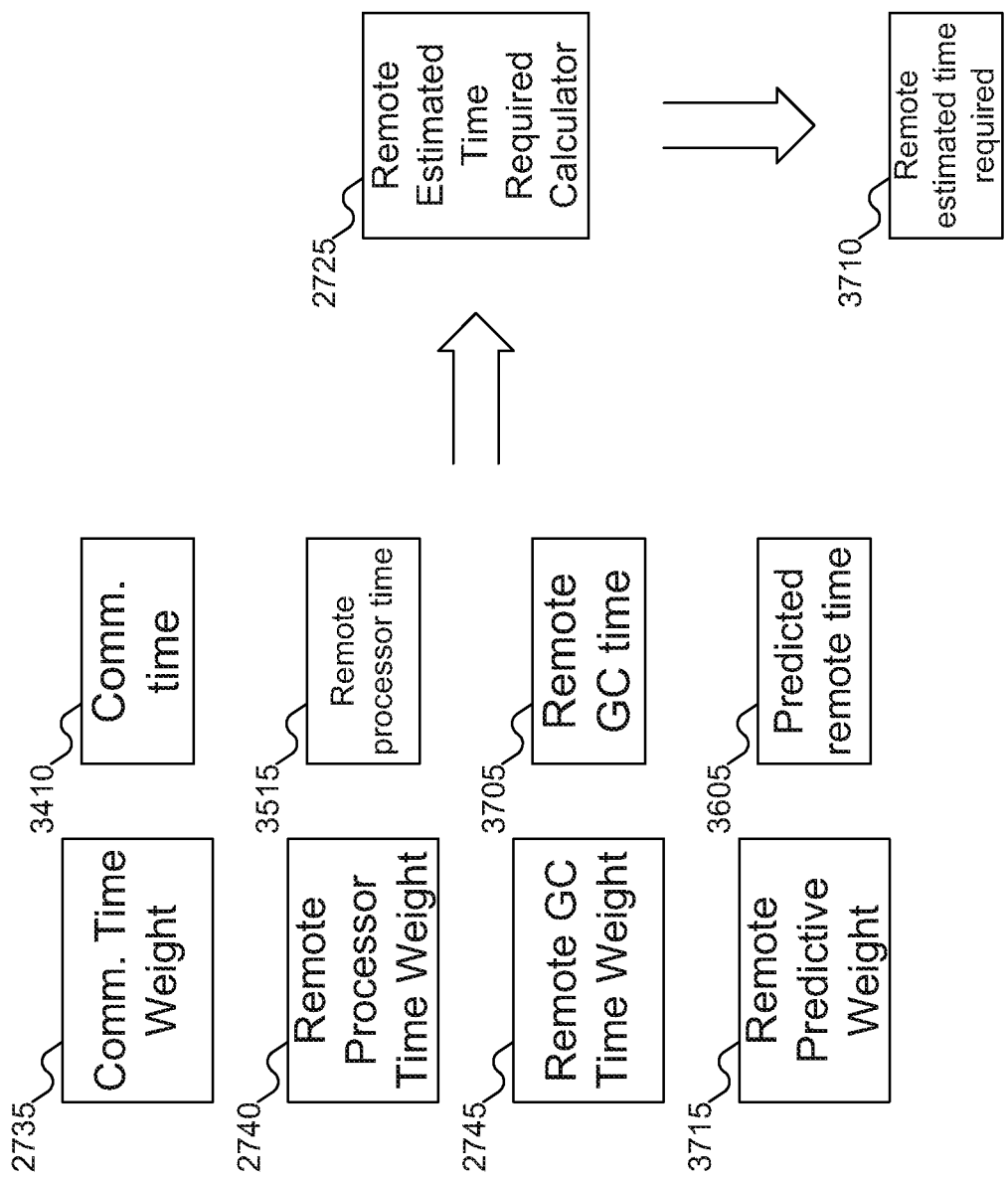
FIG. 37 shows details of the remote estimated time required calculator of FIG. 27.

FIG. 37 shows details of remote estimated time required calculator 2725 of FIG. 27. In FIG. 37, remote estimated time required calculator 2725 may take information such as communication time 3410, remote processor time 3515, and remote garbage collection time 3705, and may combine them to calculate remote estimated time required 3710. Remote estimated time required calculator 2725 may also include communication time weight 2735, remote processor time weight 2740, and remote garbage collection time weight 2745. These weights may represent how significantly each corresponding time factors into the calculation of remote estimated time required 3710. For example, each of the times may be multiplied by its corresponding weight, and the resulting products may be summed together to calculate remote estimated time required 3710.

Communication time weight 2735, remote processor time weight 2740, and remote garbage collection time weight 2745 may be computed by any desired means. For example, weight generator 2730 of FIG. 27 may perform a linear regression analysis on the information on database 2425 of FIG. 24 to calculate the weights. This linear regression analysis may be performed on all the information in database 2425 of FIG. 24, or it may be performed on a sliding window of information in database 2425.

Remote estimated time required calculator 2725 may also factor in predicted remote time 3605, which may also optionally be weighted by remote predictive weight 3715 (which may also be generated by weight generator 2730 of FIG. 27). By factoring in predicted remote time 3605, remote estimated time required calculator 2725 may balance against unusual information coming from secondary replicas 2320 and 2325 of FIG. 23 that could lead to unusually low or high estimated times required.

While the above description uses weights 2735, 2740, 2745, and 3715, a weighted computation is optional. For example, remote estimated time required calculator 2725 may compute a sum without applying any weights to the values. Put another way, weights 2735, 2740, 2745, and 3715 may all be implied weights, rather than actually stored within storage 2720 of FIG. 27. In a similar manner, if remote estimated time required calculator 2725 is designed to compute remote estimated time required 3710 using only a subset of the available values (for example, just remote garbage collection time 3705), the "weights" applied to the other values may be set to 0 to avoid those values from influencing the result. Again, in this situation, the weights may be implied: remote garbage collection weight 2745 may be implicitly 1, and weights 2735, 2740, and 3715 may be 0. Of course, in situations where a weight is set to 0, the corresponding value does not need to be computed in the first place either, and the corresponding components that produce that value may also be omitted from embodiments of the inventive concept, as appropriate.

FIG. 38 shows details of I/O redirector 215 of FIG. 25. In FIG. 38, I/O redirector 215 may receive threshold time 2525 and local estimated time requested 3305. First comparator 2510 may compare these values. If local estimated time requested 3305 is less than threshold time 2525, the I/O redirector 215 may direct I/O request 905 of FIG. 23 to primary replica 2315 of FIG. 23, as shown by box 3805. Otherwise, local estimated time required 3305 may be passed to second comparator 2515, which may also receive remote estimated time required 3710 for each secondary replica 130 and 135 of FIG. 23. Selector 2520 may then select one of primary replica 2315 and secondary replicas 2320 and 2325, all of FIG. 23, based on which has the lowest estimated time required, after which I/O redirector 215 may send I/O request 905 of FIG. 23 to the selected replica: either primary replica 2315 of FIG. 23, as shown by box 3805, or one of secondary replicas 2320 and 2325 of FIG. 23, as shown by box 3810.

Figure 39A:
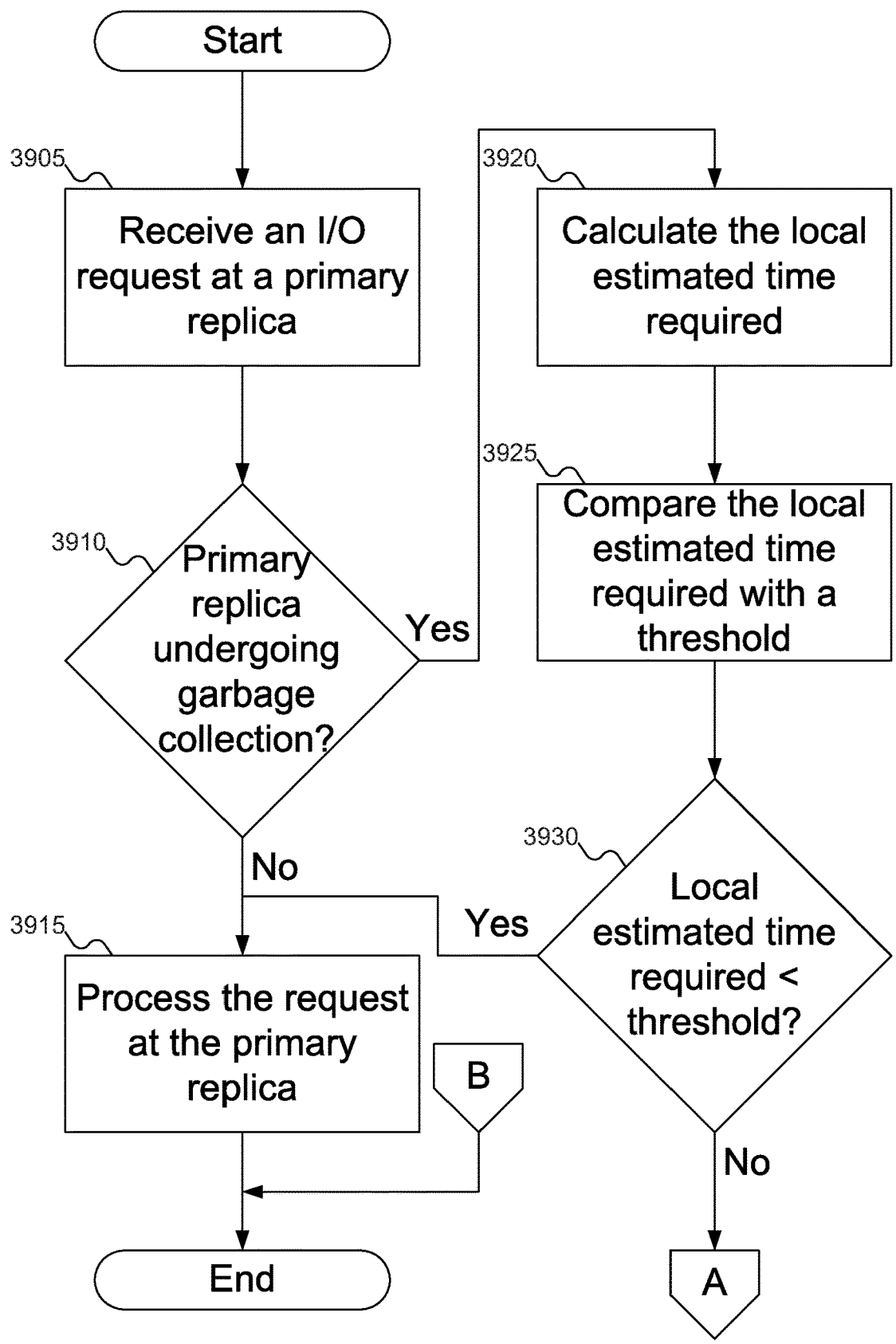
FIGS. 39A-39B show a flowchart of a procedure for the cost analyzer and I/O redirector, both of FIG. 23, to determine where to send an I/O request, according to an embodiment of the inventive concept.
Figure 39B:
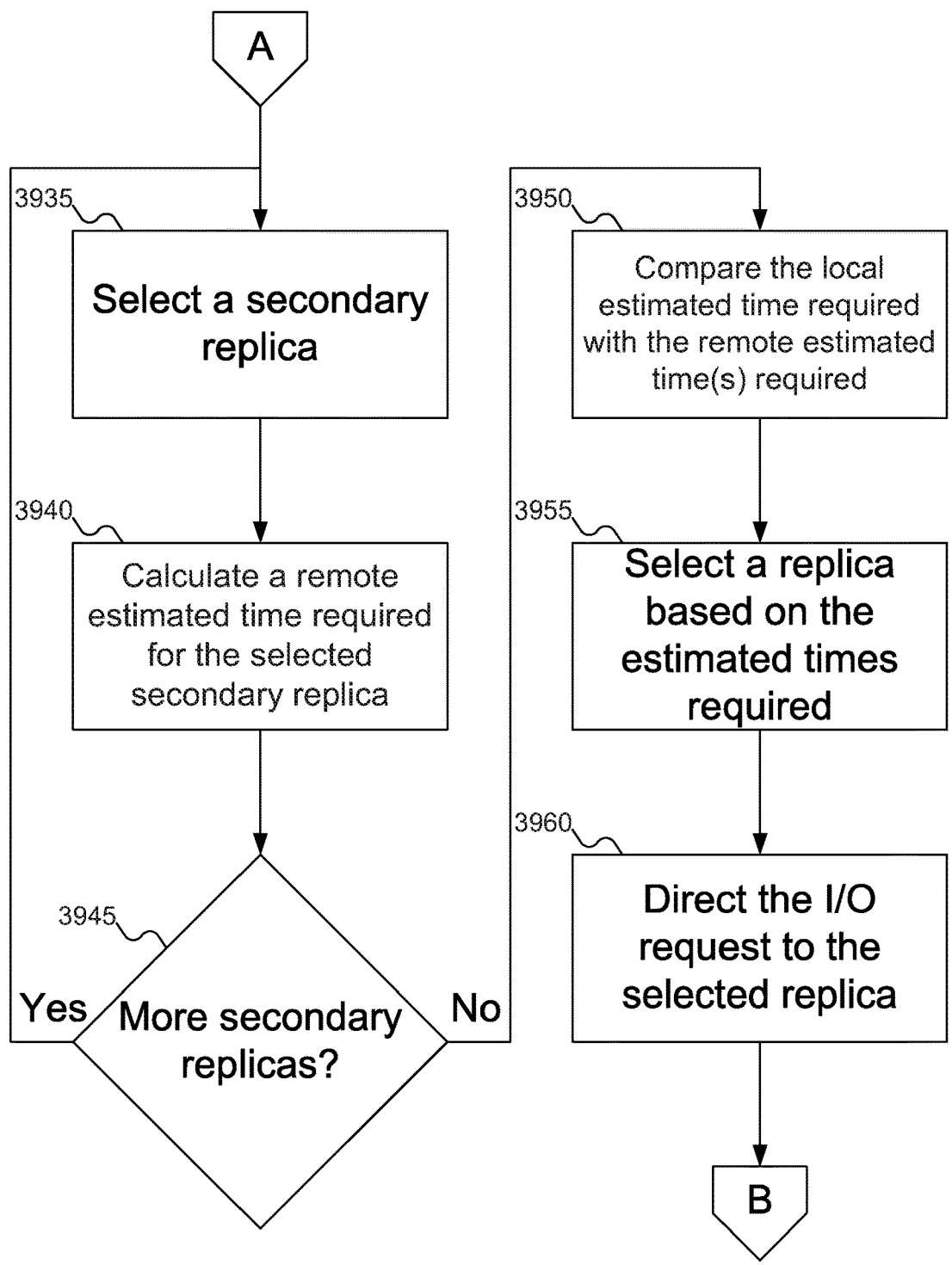

FIGS. 39A-39B show a flowchart of a procedure for cost analyzer 2310 and I/O redirector 215, both of FIG. 23, to determine where to send I/O request 905 of FIG. 23, according to an embodiment of the inventive concept. In FIG. 39A, at block 3905, system node 125 of FIG. 23 may receive I/O request 905 of FIG. 23. At block 3910, I/O redirector 215 of FIG. 23 may determine whether primary replica 2315 of FIG. 23 is currently undergoing garbage collection. If primary replica 2315 of FIG. 23 is not currently undergoing garbage collection, then at block 3915, I/O redirector 215 of FIG. 23 may send I/O request 905 of FIG. 23 to primary replica 2315 of FIG. 23.

If primary replica 2315 of FIG. 23 is currently undergoing garbage collection, then at block 3920, local estimated time required calculator 2625 of FIG. 26 may calculate local estimated time required 3305 of FIG. 33. At block 3925, first comparator 2510 may compare local estimated time required 3305 of FIG. 33 with threshold time 2525 of FIG. 25. At block 3930 determines whether local estimated time required 3305 of FIG. 33 is less than threshold time 2525 of FIG. 25. If local estimated time required 3305 of FIG. 33 is less than threshold time 2525 of FIG. 25, then processing continues at block 3915 for I/O redirector 205 of FIG. 23 to direct I/O request 905 of FIG. 23 to primary replica 2315 of FIG. 23.

On the other hand, if local estimated time required 3305 of FIG. 33 is greater than threshold time 2525 of FIG. 25, then at block 3935 (FIG. 39B) cost estimator 2310 of FIG. 23 selects one of secondary replicas 2320 and 2325 of FIG. 23. At block 3940, remote estimated time required calculator 2725 of FIG. 27 may calculate remote estimated time required 3710 of FIG. 37. At block 3945, cost estimator 2310 of FIG. 23 determines if there are any more secondary replicas of the data requested by I/O request 905 of FIG. 23: if so, then processing returns to block 3935 to calculate remote estimated time required 3710 of FIG. 37 for another secondary replica. Otherwise, at block 3950, second comparator 2515 may compare local estimated time required 3305 of FIG. 33 with the remote estimated times required 3710 of FIG. 37 for each of secondary replicas 2320 and 2325 of FIG. 23. At block 3955, selector 2520 may select one of primary replica 2315 and secondary replicas 2320 and 2325, all of FIG. 23, based on which has the associated lowest estimated time required. Finally, at block 3960, I/O redirector 215 of FIG. 23 may direct I/O request 905 of FIG. 23 to the selected replica, after which processing is complete.

In FIGS. 39A-39B, the flowchart shows I/O redirector 215 of FIG. 23 sending I/O request 905 of FIG. 23 to primary replica 2315 of FIG. 23 if primary replica 2315 of FIG. 23 is not currently undergoing garbage collection. Garbage collection is often the primary reason why it might be more efficient to send I/O request 905 of FIG. 23 to one of secondary replicas 2320 and 2325 of FIG. 23. Therefore, if primary replica 2315 of FIG. 23 is not performing garbage collection, then I/O request 905 of FIG. 23 may often be most efficiently processed at primary replica 2315 of FIG. 23. But in some embodiments of the inventive concept, block 3910 may be omitted and cost estimator 2310 of FIG. 23 may calculate the local and remote estimated times required even if primary replica 2315 of FIG. 23 is performing garbage collection.

Figure 40:
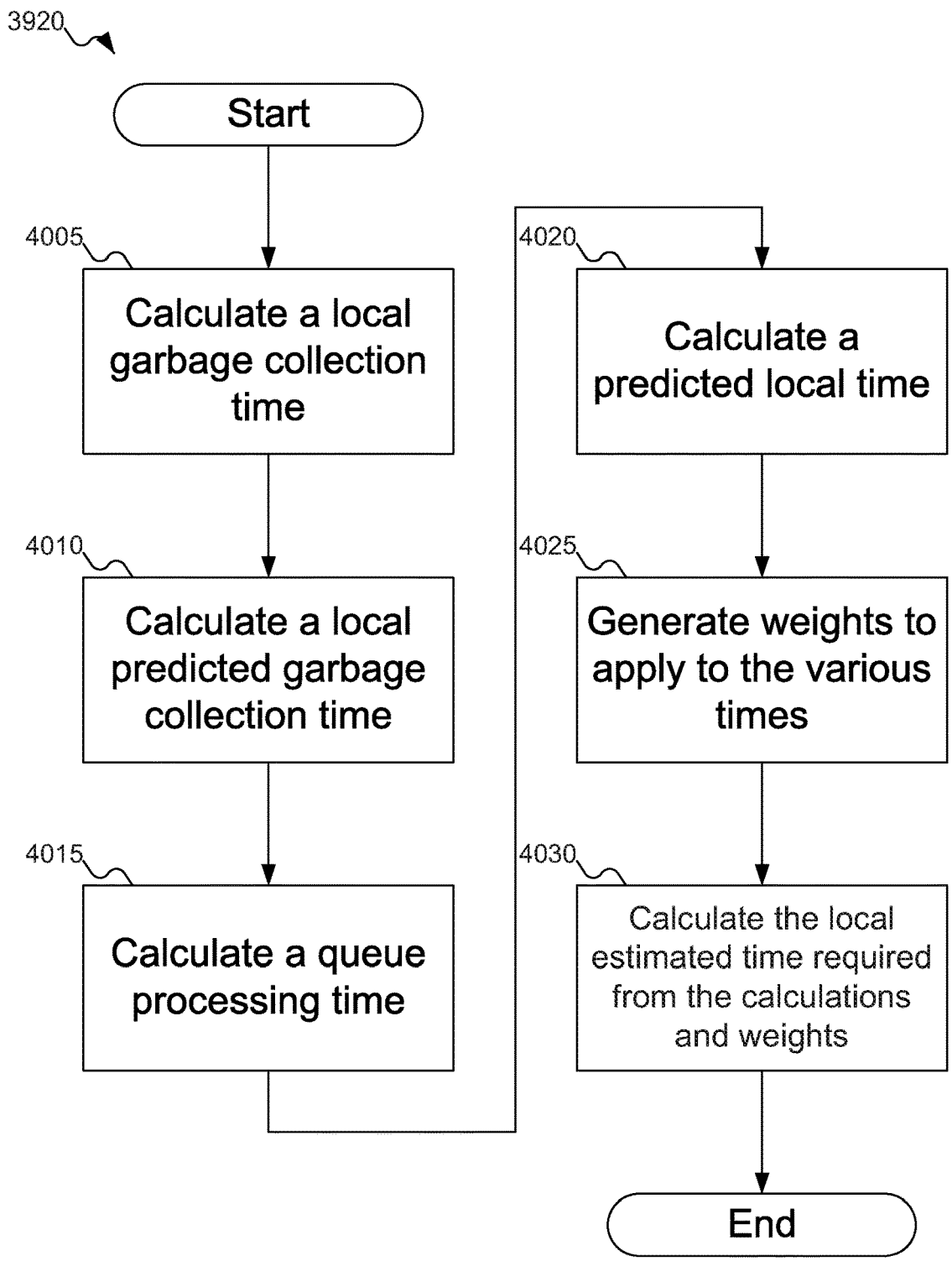
FIG. 40 shows a flowchart of a procedure for the local estimated time required calculator of FIG. 26 to calculate the local estimated time required, according to an embodiment of the inventive concept.

FIG. 40 shows a flowchart of a procedure for local estimated time required calculator 2625 of FIG. 26 to calculate local estimated time required 3305 of FIG. 33, according to an embodiment of the inventive concept. In FIG. 40, at block 4005, local garbage collection time calculator 2605 of FIG. 26 may calculate local garbage collection time 2820 of FIG. 28. At block 4010, local predicted garbage collection time calculator 2610 of FIG. 26 may calculate local predicted garbage collection time 2905 of FIG. 29. At block 4015, queue processing time calculator 2615 of FIG. 26 may calculate queue processing time 3015 of FIG. 30. At block 4020, local predictive analyzer 2430 of FIG. 24 may calculate predicted local time 3205 of FIG. 32. At block 4025, weight generator 2630 of FIG. 26 may calculate weights to be applied to the various times used in calculating local estimated time required 3305 of FIG. 33. Finally, at block 4030, local estimated time required calculator 2625 of FIG. 26 may calculate local estimated time required 3305 of FIG. 33 from the various times and weights.

Figure 41A:
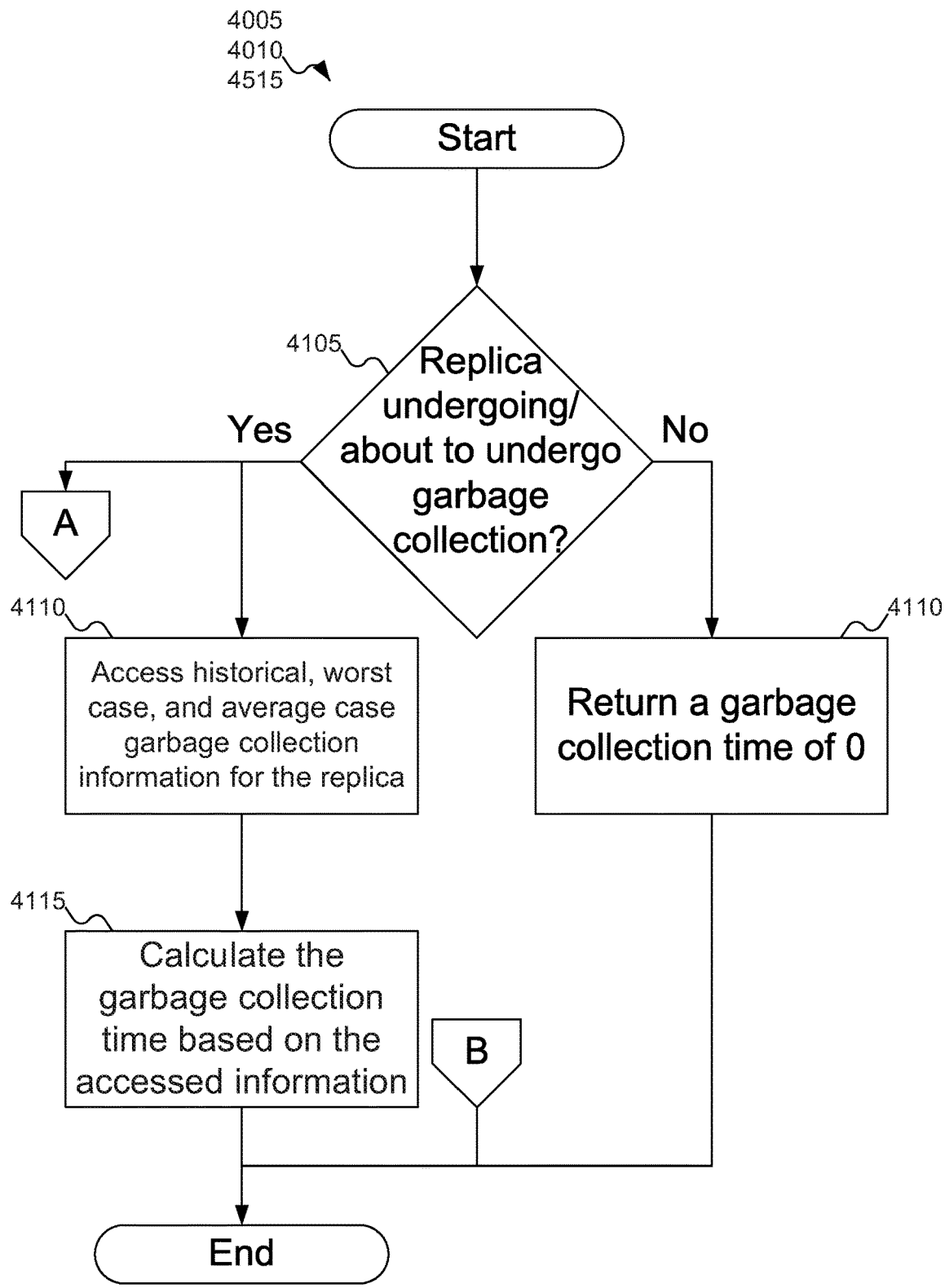
FIGS. 41A-41B show a flowchart of a procedure for the local garbage collection time calculator and the local predicted garbage time calculator, both of FIG. 26, and the remote garbage collection time calculator of FIG. 27 to calculate the garbage collection time, according to an embodiment of the inventive concept.
Figure 41B:
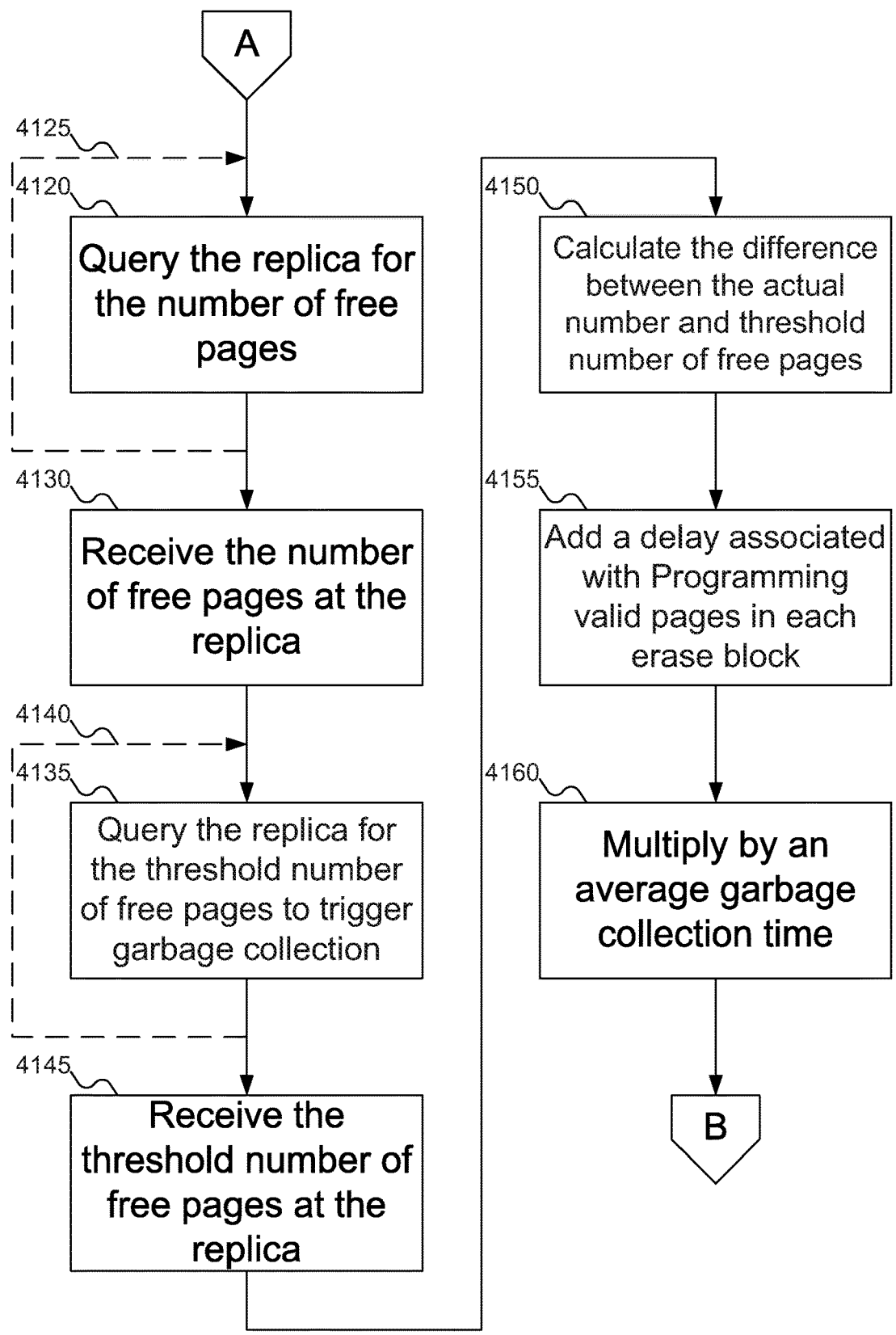

FIGS. 41A-41B show a flowchart of a procedure for local garbage collection time calculator 2605 and local predicted garbage time calculator 2610, both of FIG. 26, and remote garbage collection time calculator 2715 of FIG. 27 to calculate local garbage collection times 2820 of FIG. 28, local predicted garbage collection time 2905 of FIG. 29, and remote garbage collection time 3705 of FIG. 37, according to an embodiment of the inventive concept. For simplicity of description, with reference to FIGS. 41A-41B, all references to local garbage collection time calculator 2605 of FIG. 26 are intended to also refer to local predicted garbage collection time calculator 2610 of FIG. 26 and remote garbage collection time calculator 2715 of FIG. 27; all references to primary replica 2315 of FIG. 23 are intended to also refer to secondary replicas 2320 and 2325 of FIG. 23; all references to local average garbage collection time 2815 of FIG. 28 are intended to also refer to a remote average garbage collection time; and all references to local garbage collection time 2805 of FIG. 28 are intended to also refer to local predicted garbage collection time 2905 of FIG. 29 and remote garbage collection time 3705 of FIG. 37.

In FIG. 41A, at block 4105, local garbage collection time calculator 2605 of FIG. 26 may check to see if primary replica 2315 of FIG. 23 is undergoing or about to undergo garbage collection. This check may be done by comparing number of free pages 2805 of FIG. 28 with free page threshold 2810 of FIG. 28: if number of free pages 2805 of FIG. 28 is lower than free page threshold 2810 of FIG. 28, then primary replica 2315 of FIG. 23 either is undergoing or is about to begin garbage collection.

If primary replica 2315 of FIG. 23 is not undergoing garbage collection nor is about to begin garbage collection, then local garbage collection time calculator 2605 of FIG. 26 may return local garbage collection time 2820 of FIG. 28 as 0. Otherwise, primary replica 2315 of FIG. 23 is either undergoing garbage collection or about to begin garbage collection.

At this point, there are two possible approaches that may be taken. One approach is to use historical information about garbage collection on primary replica 2315 of FIG. 23, as stored in database 2425 of FIG. 24. At block 4110, local garbage collection time calculator 2605 of FIG. 26 may access the historical information in database 2425 of FIG. 24, and at block 4115 local garbage collection time calculator 2625 of FIG. 26 may calculate local garbage collection time 2820 of FIG. 28 using the historical information.

The other approach is shown in FIG. 41B. At block 4120, query logic 2415 of FIG. 24 may query for number of free pages 2805 of FIG. 28. As shown by dashed arrow 4125, block 4120 may be repeated as often as necessary: either because query logic 2415 of FIG. 24 is set up to make the query on a regular basis, or because there are multiple replicas to query (for example, there may be multiple secondary replicas to query to calculate all possible remote garbage collection times 2905 of FIG. 29). At block 4130, reception logic 2420 of FIG. 24 may receive number(s) of free pages 2805 of FIG. 28 from the replica(s). At block 4135, query logic 2415 of FIG. 24 may query for free page threshold 2810 of FIG. 28. As shown by dashed arrow 4140, block 4135 may be repeated as often as necessary: either because query logic 2415 of FIG. 24 is set up to make the query on a regular basis, or because there are multiple replicas to query (for example, there may be multiple secondary replicas to query to calculate all possible remote garbage collection times 2905 of FIG. 29). At block 4145, reception logic 2420 of FIG. 24 may receive free page threshold(s) 2805 of FIG. 28 from the replica(s).

At block 4150, local garbage collection time calculator 2625 of FIG. 26 may calculate the difference between number of free pages 2805 of FIG. 28 and free page threshold 2810 of FIG. 28. This difference represents the number of pages that need to be freed to bring primary replica 2315 of FIG. 23 out of the garbage collection state. At block 4155, local garbage collection time calculator 2625 of FIG. 26 may add a delay associated with Programming valid pages in blocks being erased. At block 4160, local garbage collection time calculator 2625 of FIG. 26 may calculate local garbage collection time 2820 of FIG. 28 by multiplying the above result by local average garbage collection time 2815 of FIG. 28.

Figure 42:
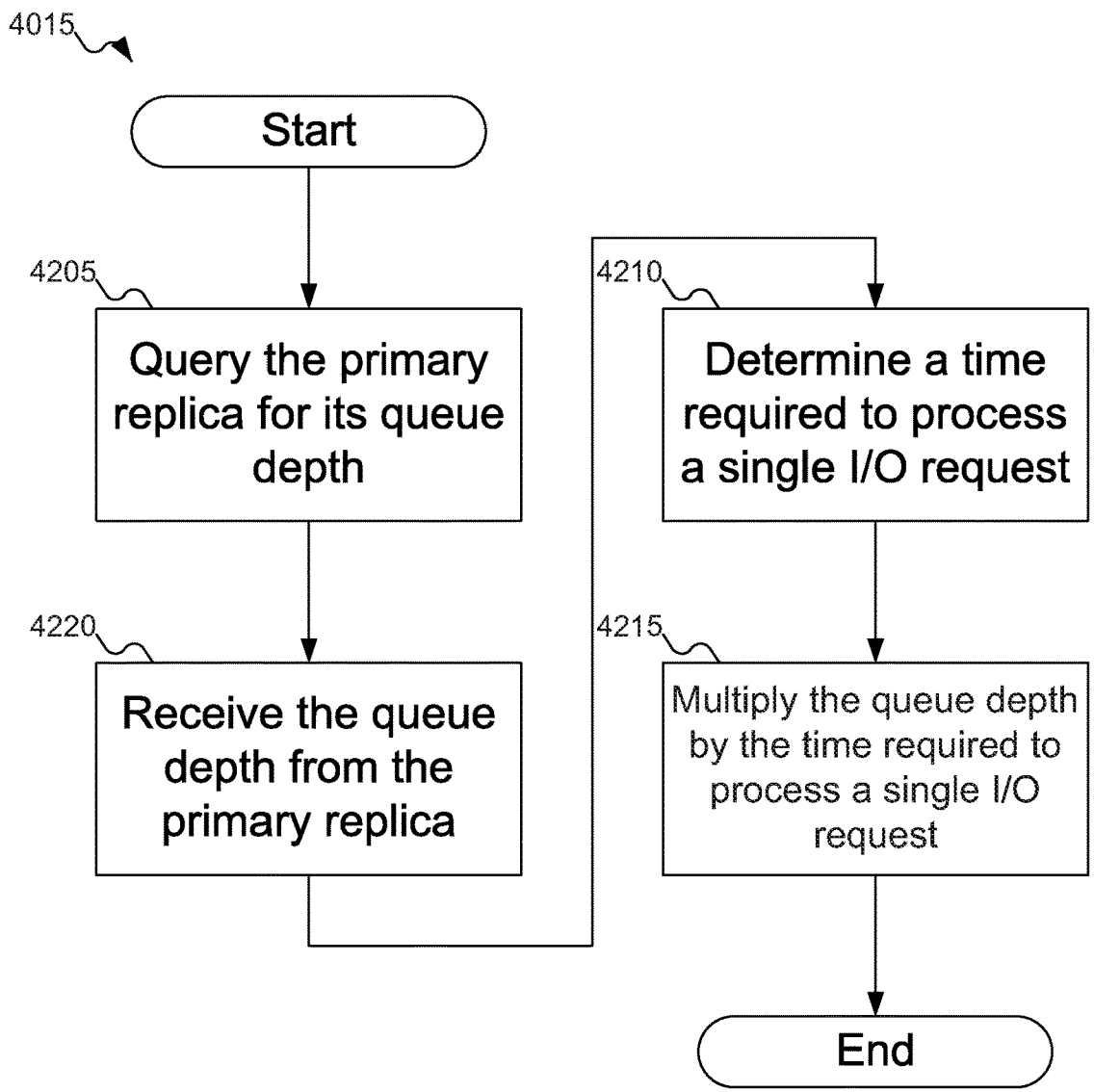
FIG. 42 shows a flowchart of a procedure for the queue processing time calculator of FIG. 26 to calculate the queue processing time, according to an embodiment of the inventive concept.

FIG. 42 shows a flowchart of a procedure for queue processing time calculator 2615 of FIG. 26 to calculate queue processing time 3015 of FIG. 30, according to an embodiment of the inventive concept. In FIG. 42, at block 4205, query logic 2415 of FIG. 24 may request a queue depth (that is, number of pending I/O requests 3005 of FIG. 30) at primary replica 2315 of FIG. 23. At block 4210, reception logic 2420 of FIG. 24 may receive the queue depth from primary replica 2315 of FIG. 23. At block 4210, queue processing time calculator 2615 of FIG. 26 may determine time required 3010 of FIG. 30 to process a single I/O request. At block 4215, queue processing time calculator 2615 of FIG. 26 may calculate queue processing time 3015 of FIG. 30 by multiplying queue depth 3005 of FIG. 30 by time required 3010 of FIG. 30 to process a single I/O request.

Figure 43:
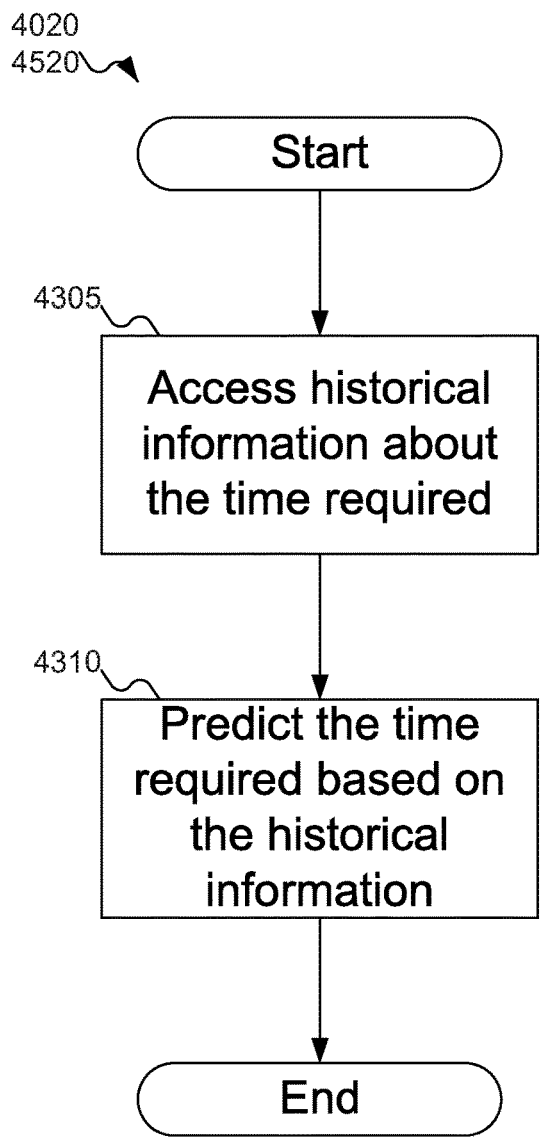
FIG. 43 shows a flowchart of a procedure for predicting the time required to process an I/O request, according to an embodiment of the inventive concept.

FIG. 43 shows a flowchart of a procedure for predicting the time required to process I/O request 905 of FIG. 23, according to an embodiment of the inventive concept. FIG. 43 may show the procedure used by either local predictive analyzer 2430 of FIG. 24 or remote predictive analyzer 2435 of FIG. 24; any reference to local predictive analyzer 2430 of FIG. 24 is also intended to refer to remote predictive analyzer 2435 of FIG. 24.

At block 4305, local predictive analyzer 2430 of FIG. 24 may access historical information from database 2425 of FIG. 24. At block 4310, local predictive analyzer 2430 of FIG. 24 may predict the time required based on the historical information in database 2425 of FIG. 24. Local predictive analyzer 2430 of FIG. 24 may use any desired approach to predict the time required. Example approaches include calculating the mean, median, or mode of the historical information, applying weighted functions to the historical information, and performing a linear regression analysis. Embodiments of the inventive concept may apply other approaches to predicting the time required as well.

Figure 44:
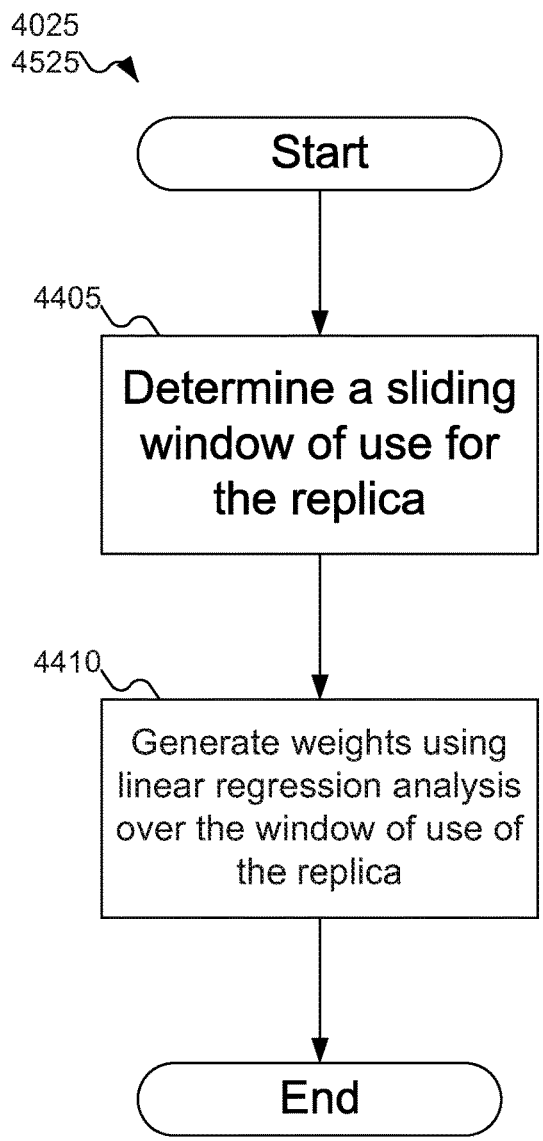
FIG. 44 shows a flowchart of a procedure for using linear regression analysis to determine the weights of FIGS. 26 and 27, according to an embodiment of the inventive concept.

FIG. 44 shows a flowchart of a procedure for using linear regression analysis to determine weights 2635, 2640, and 2645 of FIG. 26, weights 2735, 2740, and 2745 of FIG. 27, weight 3310 of FIG. 33, and weight 3715 of FIG. 37, according to an embodiment of the inventive concept. At block 4405, weight generators 2630 of FIGS. 26 and 2730 of FIG. 27 may determine a sliding window to use for the historical information in database 2425 of FIG. 24. At block 4410, weight generators 2630 of FIGS. 26 and 2730 of FIG. 27 may use linear regression analysis over the windows into database 2425 of FIG. 24 to generate the weights.

Figure 45:
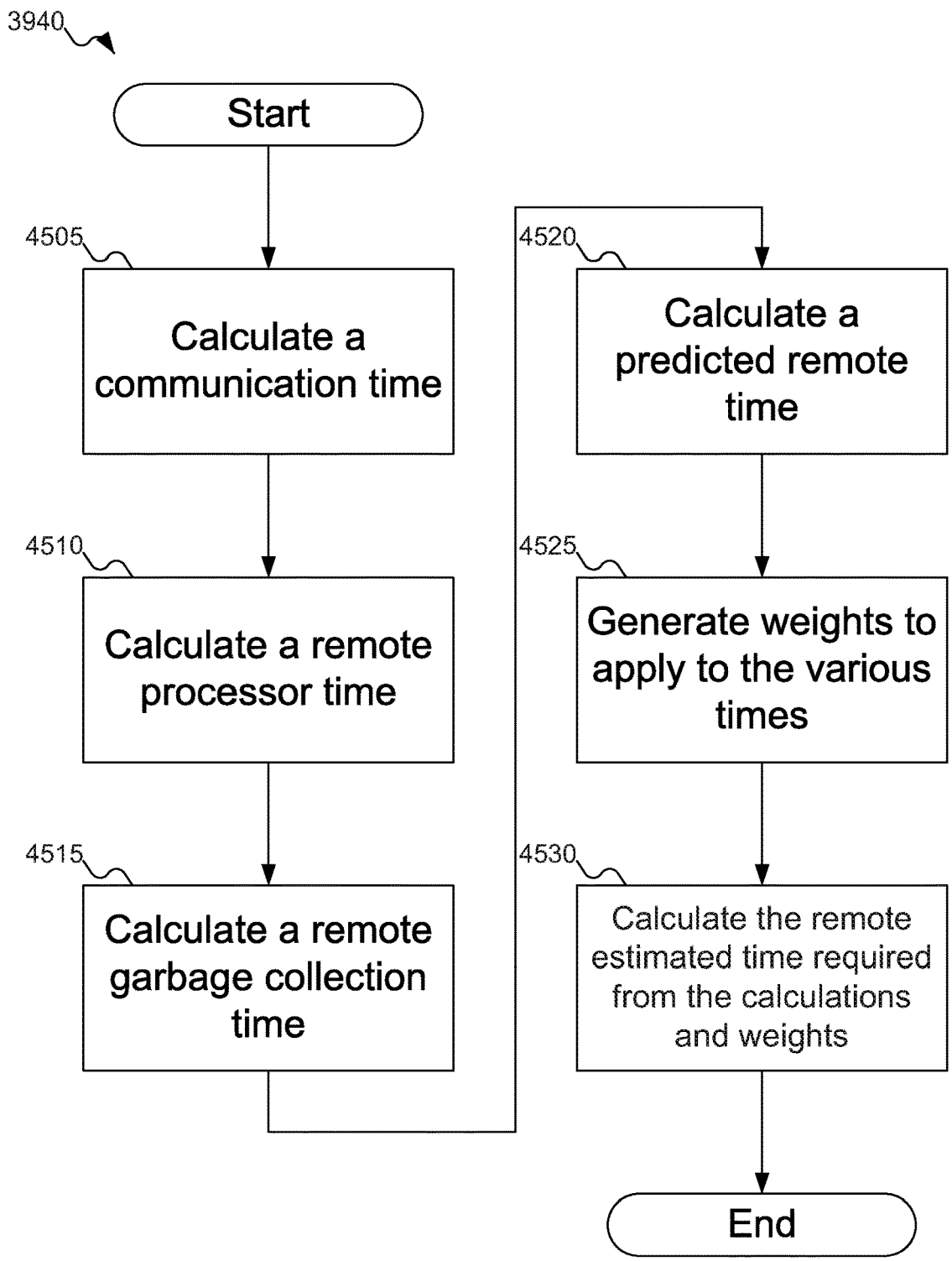
FIG. 45 shows a flowchart of a procedure for the remote estimated time required calculator of FIG. 27 to calculate the remote estimated time required, according to an embodiment of the inventive concept.

FIG. 45 shows a flowchart of a procedure for remote estimated time required calculator 2725 of FIG. 27 to calculate remote estimated time required 3710 of FIG. 37, according to an embodiment of the inventive concept. At block 4505, communication time calculator 2705 of FIG. 27 may calculate communication time 3410 of FIG. 34. At block 4510, remote processor time calculator 2710 of FIG. 27 may calculate remote processor time 3515 of FIG. 35. At block 4515, remote garbage collection time calculator 2715 of FIG. 27 may calculate a remote garbage collection time. At block 4520, remote predictive analyzer 2435 of FIG. 24 may calculate predicted remote time 3605 of FIG. 36. At block 4525, weight generator 2730 of FIG. 27 may calculate weights to be applied to the various times used in calculating remote estimated time required 3710 of FIG. 37. Finally, at block 4530, remote estimated time required calculator 2725 of FIG. 27 may calculate remote estimated time required 3710 of FIG. 37 from all of this information.

Figure 46:
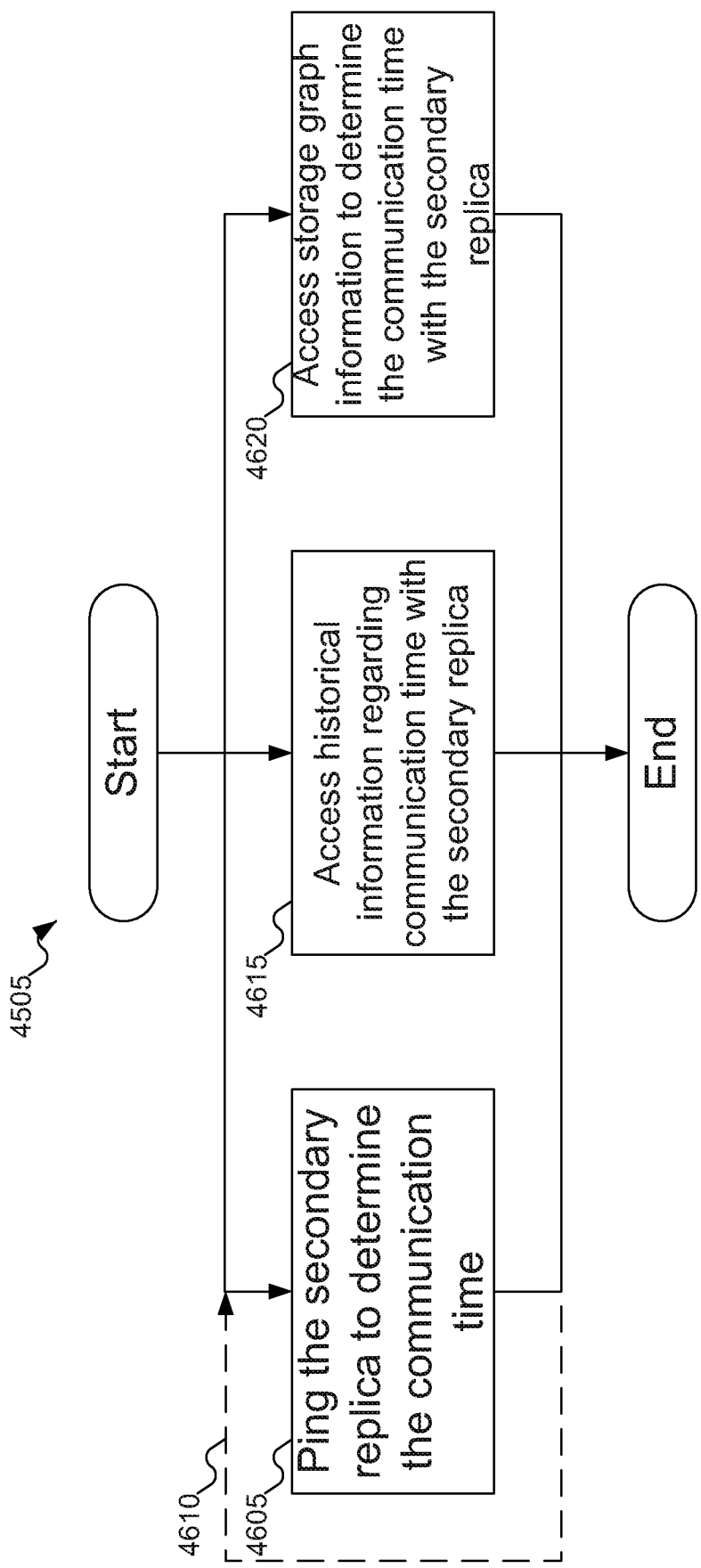
FIG. 46 shows a flowchart of a procedure for the communication time calculator of FIG. 27 to determine the communication time to the secondary replica, according to an embodiment of the inventive concept.

FIG. 46 shows a flowchart of a procedure for communication time calculator 2705 of FIG. 27 to determine communication time 3410 of FIG. 34 to secondary replicas 2320 and 2325 of FIG. 23, according to an embodiment of the inventive concept. In FIG. 46, at block 4605, ping logic 3405 of FIG. 34 may ping each of secondary replicas 2320 and 2325 of FIG. 23. As there may be more than one such secondary replica, dashed arrow 4610 shows that block 4605 may be repeated as often as necessary. Alternatively, at block 4615, communication time calculator 2705 of FIG. 27 may calculate communication time 3410 of FIG. 34 from historical information stored in database 2425 of FIG. 24 to calculate communication time 3410 of FIG. 34. Communication time calculator 2705 of FIG. 27 may use any desired approach to calculate communication time 3410 of FIG. 34, including calculating the mean, median, or mode of the historical information in database 2425 of FIG. 24, or performing a linear regression analysis on the historical information in database 2425 of FIG. 24. Alternatively, communication time calculator 2705 of FIG. 27 may access a storage graph with information about the layout of the various nodes and the distances, latencies, and bandwidth between the nodes. From this information, communication time calculator 2705 of FIG. 27 may calculate communication time 3410 of FIG. 34.

Figure 47:
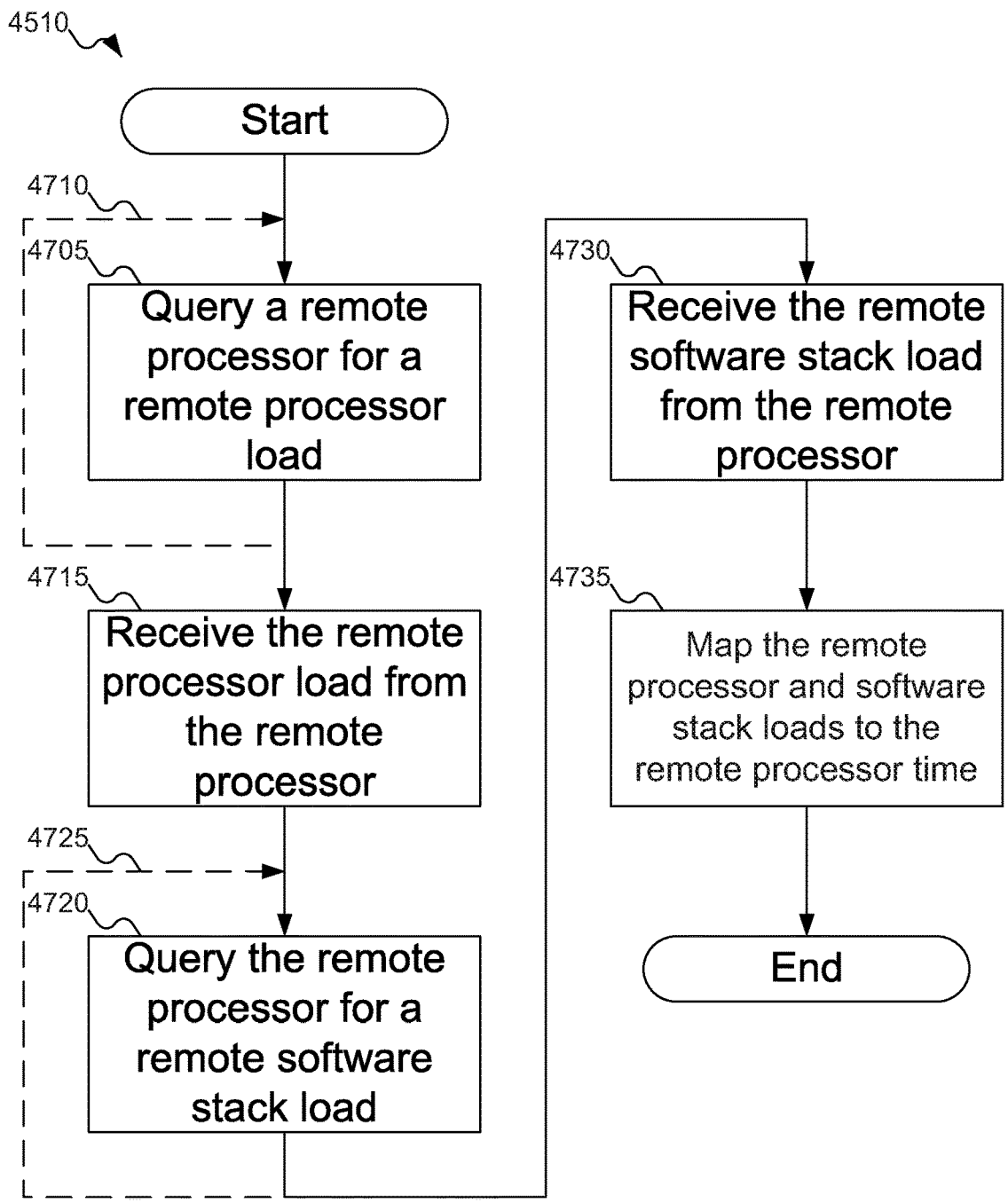
FIG. 47 shows a flowchart of a procedure for the remote processor time calculator of FIG. 27 to determine the remote processor time, according to an embodiment of the inventive concept.

FIG. 47 shows a flowchart of a procedure for remote processor time calculator 2710 of FIG. 27 to determine remote processor time 3515 of FIG. 35, according to an embodiment of the inventive concept. In FIG. 47, at block 4705, query logic 2415 of FIG. 24 may query secondary replicas 2320 and 2325 of FIG. 23 for processor loads 3505 of FIG. 35. As there may be more than one secondary replica, dashed arrow 4710 shows that block 4705 may be repeated as often as necessary to query all the secondary replicas. At block 4715, reception logic 2420 of FIG. 24 may receive remote processor load(s) from the secondary replicas.

At block 4720, query logic 2415 of FIG. 24 may query secondary replicas 2320 and 2325 of FIG. 23 for software stack loads 3510 of FIG. 35. As there may be more than one secondary replica, dashed arrow 4725 shows that block 4720 may be repeated as often as necessary to query all the secondary replicas. At block 4730, reception logic 2420 of FIG. 24 may receive remote software stack load(s) from the secondary replicas.

Finally, at block 4735, remote processor time calculator 2710 of FIG. 27 may map remote processor load(s) 3505 and remote software stack load(s) 3510, both of FIG. 35, to remote processor time 3515 of FIG. 35.

In FIGS. 15A-22B and 39A-47, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a distributed storage system node, comprising:

at least one storage device, the at least one storage device including a primary replica of data;

a cost analyzer to calculate a local estimated time required to complete an Input/Output (I/O) request at the primary replica and at least one remote estimated time required to complete the I/O request at least one secondary replica of the data; and an I/O redirector to direct the I/O request to one of the primary replica and the at least one secondary replica responsive to the local estimated time required and the at least one remote estimated time required.

Statement 2. An embodiment of the inventive concept includes a distributed storage system node according to statement 1, wherein the at least one storage device includes a Solid State Drive (SSD).

Statement 3. An embodiment of the inventive concept includes a distributed storage system node according to statement 1, wherein the distributed storage system node is drawn from a set including a Network Attached Solid State Drive (SSD) and an Ethernet SSD.

Statement 4. An embodiment of the inventive concept includes a distributed storage system node according to statement 1, wherein the I/O redirector is operative to redirect the I/O request only if the at least one storage device is currently undergoing garbage collection.

Statement 5. An embodiment of the inventive concept includes a distributed storage system node according to statement 4, wherein:

the cost analyzer includes a local time estimator to calculate the local estimated time required to process the I/O request at the primary replica; and the I/O redirector includes:

storage for a threshold time; and a first comparator to compare the local estimated time required with the threshold time.

Statement 6. An embodiment of the inventive concept includes a distributed storage system node according to statement 5, wherein the I/O redirector is operative to direct the I/O request to the primary replica if the local estimated time required is less than the threshold time.

Statement 7. An embodiment of the inventive concept includes a distributed storage system node according to statement 5, wherein the local time estimator includes:

a local garbage collection time calculator to calculate a local garbage collection time;

a local predicted garbage collection time calculator to calculate a local predicted garbage collection time;

storage for a local garbage collection weight and a predicted garbage collection weight; and a local estimated time required calculator to calculate a local estimated time required from the local garbage collection time, the local predicted garbage collection time, the local garbage collection weight, and the predicted garbage collection weight.

Statement 8. An embodiment of the inventive concept includes a distributed storage system node according to statement 7, wherein the local estimated time required calculator is operative to calculate the local estimated time required as a sum of the local garbage collection time multiplied by the local garbage collection weight and the local predicted garbage collection time multiplied by the predicted garbage collection weight.

Statement 9. An embodiment of the inventive concept includes a distributed storage system node according to statement 8, wherein the local estimated time required calculator is operative to calculate the local estimated time required as a sum of the local garbage collection time multiplied by the local garbage collection weight, the local predicted garbage collection time multiplied by the predicted garbage collection weight, and a queue processing time multiplied by a queue processing weight.

Statement 10. An embodiment of the inventive concept includes a distributed storage system node according to statement 7, wherein:

the cost analyzer further comprises:

query logic to query the primary replica for an actual number of free pages; and reception logic to receive from the primary replica the actual number of free pages; and the local garbage collection time calculator is operative to calculate a difference by subtracting the actual number of free pages from a threshold number of free pages for the primary replica and to calculate the local garbage collection time by multiplying the difference by an local average garbage collection time.

Statement 11. An embodiment of the inventive concept includes a distributed storage system node according to statement 10, wherein the local garbage collection time calculator is further operative to add a delay associated with Programming valid pages in each erase block to the local garbage collection time.

Statement 12. An embodiment of the inventive concept includes a distributed storage system node according to statement 10, wherein the query logic is operative to periodically query the primary replica for the actual number of free pages.

Statement 13. An embodiment of the inventive concept includes a distributed storage system node according to statement 7, wherein:

the cost analyzer further includes:

query logic to query the primary replica for an actual number of free pages; and reception logic to receive from the primary replica the actual number of free pages; and the local predicted garbage collection time calculator is operative to calculate a difference by subtracting the actual number of free pages from a threshold number of free pages for the primary replica and to calculate the local predicted garbage collection time by multiplying the difference by an local average garbage collection time.

Statement 14. An embodiment of the inventive concept includes a distributed storage system node according to statement 13, wherein the local predicted garbage collection time calculator is further operative to add a delay associated with Programming valid pages in each erase block to the local predicted garbage collection time.

Statement 15. An embodiment of the inventive concept includes a distributed storage system node according to statement 13, wherein the query logic is operative to periodically query the primary replica for the actual number of free pages.

Statement 16. An embodiment of the inventive concept includes a distributed storage system node according to statement 7, wherein:

the local time estimator includes a queue processing time calculator to calculate a queue processing time;

the storage includes storage for a queue processing weight; and the local estimated time required calculator is operative to calculate the local estimated time required from the local garbage collection time, the local predicted garbage collection time, the queue processing time, the local garbage collection weight, the predicted garbage collection weight, and the queue processing weight.

Statement 17. An embodiment of the inventive concept includes a distributed storage system node according to statement 16, wherein:

the cost analyzer further includes:

query logic to query the primary replica for a number of I/O requests pending at the primary replica; and reception logic to receive from the primary replica the number of I/O requests pending at the primary replica; and the queue processing time calculator is operative to calculate the queue processing time by multiplying the number of I/O requests pending at the primary replica by a time required to process a single I/O request.

Statement 18. An embodiment of the inventive concept includes a distributed storage system node according to statement 17, wherein the query logic is operative to periodically query the primary replica for the number of I/O requests pending at the primary replica.

Statement 19. An embodiment of the inventive concept includes a distributed storage system node according to statement 7, wherein the cost analyzer further includes:

a database storing information including at least one of historical local garbage collection information for the primary replica, a worst case estimate for local garbage collection on the primary replica, an average case estimate for local garbage collection on the primary replica, historical processing time information for the primary replica, a worst case estimate for processing time on the primary replica, and an average case estimate for processing time on the primary replica; and a local predictive analyzer to calculate a predicted local time for the primary replica from the information stored in the database.

Statement 20. An embodiment of the inventive concept includes a distributed storage system node according to statement 19, wherein the local estimated time required calculator is operative to calculate a local estimated time required from the local garbage collection time, the local predicted garbage collection time, the predicted local time, the local garbage collection weight, and the predicted garbage collection weight.

Statement 21. An embodiment of the inventive concept includes a distributed storage system node according to statement 7, wherein the local time estimator further includes a weight generator to generate the local garbage collection weight and the predicted garbage collection weight.

Statement 22. An embodiment of the inventive concept includes a distributed storage system node according to statement 21, wherein the weight generator is operative to generate the local garbage collection weight and the predicted garbage collection weight using a linear regression analysis based on historical data for the primary replica.

Statement 23. An embodiment of the inventive concept includes a distributed storage system node according to statement 22, wherein the historical data is drawn from a sliding window of use of the primary replica.

Statement 24. An embodiment of the inventive concept includes a distributed storage system node according to statement 5, wherein:

the cost analyzer further includes a remote time estimator to calculate the at least one remote estimated time required to process the I/O request at the at least one secondary replica; and the I/O redirector further includes:
a second comparator to compare the local estimated time required with the at least one remote estimated time required; and
a selector to select one of the primary replica and the at least one secondary replica to process the I/O request with a minimum time from the local estimated time required and the at least one remote estimated time required.

Statement 25. An embodiment of the inventive concept includes a distributed storage system node according to statement 24, wherein the remote time estimator includes:

a communication time calculator to calculate a communication time between the distributed storage system node and at least one secondary storage system node including the at least one secondary replica;

a remote processor time calculator to calculate a remote processor time for the at least one secondary storage system node;

a remote garbage collection time calculator to calculate a remote garbage collection time for the at least one secondary replica;

storage for a communication time weight, a remote processor time weight, and a remote garbage collection time weight; and a remote estimated time required calculator to calculate the remote estimated time required from the communication time, the remote processor time, the remote garbage collection time, the communication time weight, the remote processor time weight, and the remote garbage collection time weight.

Statement 26. An embodiment of the inventive concept includes a distributed storage system node according to statement 25, wherein the remote estimated time required calculator is operative to calculate the remote estimated time required as a sum of the communication time multiplied by the communication time weight, the remote processor time multiplied by the remote processor time weight, and the remote garbage collection time multiplied by the remote garbage collection time weight.

Statement 27. An embodiment of the inventive concept includes a distributed storage system node according to statement 25, wherein the communication time calculator includes ping logic to ping the at least one secondary storage system node to measure the communication time.

Statement 28. An embodiment of the inventive concept includes a distributed storage system node according to statement 27, wherein the ping logic is operative to periodically ping the at least one secondary storage system node to measure the communication time.

Statement 29. An embodiment of the inventive concept includes a distributed storage system node according to statement 25, wherein:

the cost analyzer further includes:
query logic to query the at least one secondary storage system node for a remote processor load on the at least one secondary storage system node; and
reception logic to receive from the at least one secondary storage system node the remote processor load; and
the remote processor time calculator is operative to calculate the remote processor time responsive to the remote processor load.

Statement 30. An embodiment of the inventive concept includes a distributed storage system node according to statement 29, wherein the query logic is operative to periodically query the at least one secondary storage system node for the remote processor load.

Statement 31. An embodiment of the inventive concept includes a distributed storage system node according to statement 29, wherein:

the query logic is operative to query the at least one secondary storage system node for a remote software stack load on the at least one secondary storage system node;
the reception logic is operative to receive from the at least one secondary storage system node the remote software stack load; and
the remote processor time calculator is operative to calculate the remote processor time responsive to the remote processor load and the remote software stack load.

Statement 32. An embodiment of the inventive concept includes a distributed storage system node according to statement 31, wherein the query logic is operative to periodically query the at least one secondary storage system node for the remote software stack load.

Statement 33. An embodiment of the inventive concept includes a distributed storage system node according to statement 25, wherein:

the cost analyzer further includes:
query logic to query the at least one secondary replica for an actual number of free pages; and
reception logic to receive from the at least one secondary replica the actual number of free pages; and
the remote garbage collection time calculator is operative to calculate a difference by subtracting the actual number of free pages from a threshold number of free pages for the at least one secondary replica and to calculate the remote garbage collection time by multiplying the difference by a remote average garbage collection time.

Statement 34. An embodiment of the inventive concept includes a distributed storage system node according to statement 33, wherein the remote garbage collection time calculator is further operative to add a delay associated with Programming valid pages in each erase block to the remote garbage collection time.

Statement 35. An embodiment of the inventive concept includes a distributed storage system node according to statement 33, wherein the query logic is operative to periodically query the at least one secondary replica for the actual number of free pages.

Statement 36. An embodiment of the inventive concept includes a distributed storage system node according to statement 25, wherein the cost analyzer further includes:
a database storing information including at least one of historical communication time information with the at least one secondary replica, a worst case estimate for communication time with the at least one secondary replica, an average case estimate for communication time with the at least one secondary replica, historical remote processor time information for the at least one secondary replica, a worst case estimate for remote processor time on the at least one secondary replica, an average case estimate for remote processor time on the at least one secondary replica, historical remote garbage collection information for the at least one secondary replica, a worst case estimate for remote garbage collection on the at least one secondary replica, and an average case estimate for remote garbage collection on the at least one secondary replica; and
a remote predictive analyzer to calculate a predicted remote time for the at least one secondary replica from the information stored in the database.

Statement 37. An embodiment of the inventive concept includes a distributed storage system node according to statement 36, wherein the remote estimated time required calculator is operative to calculate the remote estimated time required from the communication time, the remote processor time, the remote garbage collection time, the predicted remote time, the communication time weight, the remote processor time weight, and the remote garbage collection time weight.

Statement 38. An embodiment of the inventive concept includes a distributed storage system node according to statement 25, wherein the remote time estimator further includes a weight generator to generate the communication time weight, the remote processor time weight, and the remote garbage collection time weight.

Statement 39. An embodiment of the inventive concept includes a distributed storage system node according to statement 38, wherein the weight generator is operative to generate the communication time weight, the remote processor time weight, and the remote garbage collection time weight using a linear regression analysis based on historical data for the at least one secondary replica.

Statement 40. An embodiment of the inventive concept includes a distributed storage system node according to statement 39, wherein the historical data is drawn from a sliding window of use of the at least one secondary replica.

Statement 41. An embodiment of the inventive concept includes a cost analyzer, comprising:

a local time estimator to calculate the local estimated time required to process an Input/Output (I/O) request at a primary replica of data, the primary replica included on a storage device; and
a remote time estimator to calculate at least one remote estimated time required to process the I/O request at least one secondary replica of the data,
wherein the cost analyzer enables an I/O redirector to direct the I/O request to one of the primary replica and the at least one secondary replica responsive to the local estimated time required and the at least one remote estimated time required.

Statement 42. An embodiment of the inventive concept includes a cost analyzer according to statement 41, wherein the storage device includes a Solid State Drive (SSD).

Statement 43. An embodiment of the inventive concept includes a cost analyzer according to statement 41, wherein the cost analyzer is activated only if the primary replica is performing garbage collection.

Statement 44. An embodiment of the inventive concept includes a cost analyzer according to statement 43, wherein the local time estimator includes:
a local garbage collection time calculator to calculate a local garbage collection time;
a local predicted garbage collection time calculator to calculate a local predicted garbage collection time;
storage for a local garbage collection weight and a predicted garbage collection weight; and
a local estimated time required calculator to calculate a local estimated time required from the local garbage collection time, the local predicted garbage collection time, the local garbage collection weight, and the predicted garbage collection weight.

Statement 45. An embodiment of the inventive concept includes a cost analyzer according to statement 44, wherein the local estimated time required calculator is operative to calculate the local estimated time required as a sum of the local garbage collection time multiplied by the local garbage collection weight and the local predicted garbage collection time multiplied by the predicted garbage collection weight.

Statement 46. An embodiment of the inventive concept includes a cost analyzer according to statement 45, wherein the local estimated time required calculator is operative to calculate the local estimated time required as a sum of the local garbage collection time multiplied by the local garbage collection weight, the local predicted garbage collection time multiplied by the predicted garbage collection weight, and a queue processing time multiplied by a queue processing weight.

Statement 47. An embodiment of the inventive concept includes a cost analyzer according to statement 44, wherein:
the cost analyzer further comprises:
query logic to query the primary replica for an actual number of free pages; and
reception logic to receive from the primary replica the actual number of free pages; and
the local garbage collection time calculator is operative to calculate a difference by subtracting the actual number of free pages from a threshold number of free pages for the primary replica and to calculate the local garbage collection time by multiplying the difference by an local average garbage collection time.

Statement 48. An embodiment of the inventive concept includes a cost analyzer according to statement 47, wherein the local garbage collection time calculator is further operative to add a delay associated with Programming valid pages in each erase block to the local garbage collection time.

Statement 49. An embodiment of the inventive concept includes a cost analyzer according to statement 47, wherein the query logic is operative to periodically query the primary replica for the actual number of free pages.

Statement 50. An embodiment of the inventive concept includes a cost analyzer according to statement 44, wherein:
the cost analyzer further includes:
query logic to query the primary replica for an actual number of free pages; and
reception logic to receive from the primary replica the actual number of free pages; and
the local predicted garbage collection time calculator is operative to calculate a difference by subtracting the actual number of free pages from a threshold number of free pages for the primary replica and to calculate the local predicted garbage collection time by multiplying the difference by an local average garbage collection time.

Statement 51. An embodiment of the inventive concept includes a cost analyzer according to statement 50, wherein the local predicted garbage collection time calculator is further operative to add a delay associated with Programming valid pages in each erase block to the local predicted garbage collection time.

Statement 52. An embodiment of the inventive concept includes a cost analyzer according to statement 50, wherein the query logic is operative to periodically query the primary replica for the actual number of free pages.

Statement 53. An embodiment of the inventive concept includes a cost analyzer according to statement 44, wherein:
the local time estimator includes a queue processing time calculator to calculate a queue processing time;
the storage includes storage for a queue processing weight; and
the local estimated time required calculator is operative to calculate the local estimated time required from the local garbage collection time, the local predicted garbage collection time, the queue processing time, the local garbage collection weight, the predicted garbage collection weight, and the queue processing weight.

Statement 54. An embodiment of the inventive concept includes a cost analyzer according to statement 53, wherein:
the cost analyzer further includes:
query logic to query the primary replica for a number of I/O requests pending at the primary replica; and
reception logic to receive from the primary replica the number of I/O requests pending at the primary replica; and
the queue processing time calculator is operative to calculate the queue processing time by multiplying the number of I/O requests pending at the primary replica by a time required to process a single I/O request.

Statement 55. An embodiment of the inventive concept includes a cost analyzer according to statement 54, wherein the query logic is operative to periodically query the primary replica for the number of I/O requests pending at the primary replica.

Statement 56. An embodiment of the inventive concept includes a cost analyzer according to statement 44, further comprising:
a database storing information including at least one of historical local garbage collection information for the primary replica, a worst case estimate for local garbage collection on the primary replica, an average case estimate for local garbage collection on the primary replica, historical processing time information for the primary replica, a worst case estimate for processing time on the primary replica, and an average case estimate for processing time on the primary replica; and
a local predictive analyzer to calculate a predicted local time for the primary replica from the information stored in the database.

Statement 57. An embodiment of the inventive concept includes a cost analyzer according to statement 56, wherein the local estimated time required calculator is operative to calculate a local estimated time required from the local garbage collection time, the local predicted garbage collection time, the predicted local time, the local garbage collection weight, and the predicted garbage collection weight.

Statement 58. An embodiment of the inventive concept includes a cost analyzer according to statement 44, wherein the local time estimator further includes a weight generator to generate the local garbage collection weight and the predicted garbage collection weight.

Statement 59. An embodiment of the inventive concept includes a cost analyzer according to statement 58, wherein the weight generator is operative to generate the local garbage collection weight and the predicted garbage collection weight using a linear regression analysis based on historical data for the primary replica.

Statement 60. An embodiment of the inventive concept includes a cost analyzer according to statement 59, wherein the historical data is drawn from a sliding window of use of the primary replica.

Statement 61. An embodiment of the inventive concept includes a cost analyzer according to statement 43, wherein the remote time estimator includes:
a communication time calculator to calculate a communication time between the distributed storage system node and at least one secondary storage system node including the at least one secondary replica;
a remote processor time calculator to calculate a remote processor time for the at least one secondary storage system node;
a remote garbage collection time calculator to calculate a remote garbage collection time for the at least one secondary replica;
storage for a communication time weight, a remote processor time weight, and a remote garbage collection time weight; and
a remote estimated time required calculator to calculate the remote estimated time required from the communication time, the remote processor time, the remote garbage collection time, the communication time weight, the remote processor time weight, and the remote garbage collection time weight.

Statement 62. An embodiment of the inventive concept includes a cost analyzer according to statement 61, wherein the remote estimated time required calculator is operative to calculate the remote estimated time required as a sum of the communication time multiplied by the communication time weight, the remote processor time multiplied by the remote processor time weight, and the remote garbage collection time multiplied by the remote garbage collection time weight.

Statement 63. An embodiment of the inventive concept includes a cost analyzer according to statement 61, wherein the communication time calculator includes ping logic to ping the at least one secondary storage system node to measure the communication time.

Statement 64. An embodiment of the inventive concept includes a cost analyzer according to statement 63, wherein the ping logic is operative to periodically ping the at least one secondary storage system node to measure the communication time.

Statement 65. An embodiment of the inventive concept includes a cost analyzer according to statement 61, wherein:
the cost analyzer further includes:
query logic to query the at least one secondary storage system node for a remote processor load on the at least one secondary storage system node; and
reception logic to receive from the at least one secondary storage system node the remote processor load; and
the remote processor time calculator is operative to calculate the remote processor time responsive to the remote processor load.

Statement 66. An embodiment of the inventive concept includes a cost analyzer according to statement 65, wherein the query logic is operative to periodically query the at least one secondary storage system node for the remote processor load.

Statement 67. An embodiment of the inventive concept includes a cost analyzer according to statement 65, wherein:
the query logic is operative to query the at least one secondary storage system node for a remote software stack load on the at least one secondary storage system node;
the reception logic is operative to receive from the at least one secondary storage system node the remote software stack load; and
the remote processor time calculator is operative to calculate the remote processor time responsive to the remote processor load and the remote software stack load.

Statement 68. An embodiment of the inventive concept includes a cost analyzer according to statement 67, wherein the query logic is operative to periodically query the at least one secondary storage system node for the remote software stack load.

Statement 69. An embodiment of the inventive concept includes a cost analyzer according to statement 61, wherein:
the cost analyzer further includes:
query logic to query the at least one secondary replica for an actual number of free pages; and
reception logic to receive from the at least one secondary replica the actual number of free pages; and
the remote garbage collection time calculator is operative to calculate a difference by subtracting the actual number of free pages from a threshold number of free pages for the at least one secondary replica and to calculate the remote garbage collection time by multiplying the difference by a remote average garbage collection time.

Statement 70. An embodiment of the inventive concept includes a cost analyzer according to statement 69, wherein the remote garbage collection time calculator is further operative to add a delay associated with Programming valid pages in each erase block to the remote garbage collection time.

Statement 71. An embodiment of the inventive concept includes a cost analyzer according to statement 69, wherein the query logic is operative to periodically query the at least one secondary replica for the actual number of free pages.

Statement 72. An embodiment of the inventive concept includes a cost analyzer according to statement 61, further comprising:
a database storing information including at least one of historical communication time information with the at least one secondary replica, a worst case estimate for communication time with the at least one secondary replica, an average case estimate for communication time with the at least one secondary replica, historical remote processor time information for the at least one secondary replica, a worst case estimate for remote processor time on the at least one secondary replica, an average case estimate for remote processor time on the at least one secondary replica, historical remote garbage collection information for the at least one secondary replica, a worst case estimate for remote garbage collection on the at least one secondary replica, and an average case estimate for remote garbage collection on the at least one secondary replica; and
a remote predictive analyzer to calculate a predicted remote time for the at least one secondary replica from the information stored in the database.

Statement 73. An embodiment of the inventive concept includes a cost analyzer according to statement 72, wherein the remote estimated time required calculator is operative to calculate the remote estimated time required from the communication time, the remote processor time, the remote garbage collection time, the predicted remote time, the communication time weight, the remote processor time weight, and the remote garbage collection time weight.

Statement 74. An embodiment of the inventive concept includes a cost analyzer according to statement 61, wherein the remote time estimator further includes a weight generator to generate the communication time weight, the remote processor time weight, and the remote garbage collection time weight.

Statement 75. An embodiment of the inventive concept includes a cost analyzer according to statement 74, wherein the weight generator is operative to generate the communication time weight, the remote processor time weight, and the remote garbage collection time weight using a linear regression analysis based on historical data for the at least one secondary replica.

Statement 76. An embodiment of the inventive concept includes a cost analyzer according to statement 75, wherein the historical data is drawn from a sliding window of use of the at least one secondary replica.

Statement 77. An embodiment of the inventive concept includes a method, comprising:
receiving at a distributed storage system node an Input/Output (I/O) request, the I/O request requesting data from a primary replica at the distributed storage system node, the primary replica including a storage device;
calculating a local estimated time required to complete the I/O request;
calculating at least one remote estimated time required for at least one secondary replica storing the requested data;
comparing the local estimated time required with the at least one remote estimated time required;
selecting one of the primary replica and the at least one secondary replica responsive to the lowest of the local estimated time required and the at least one remote estimated time required; and
directing the I/O request to the selected one of the primary replica and the at least one secondary replica.

Statement 78. An embodiment of the inventive concept includes a method according to statement 77, wherein receiving at a distributed storage system node an I/O request includes receiving at the distributed storage system node the I/O request, the I/O request requesting data from the primary replica at the distributed storage system node, the primary replica including a Solid State Drive (SSD).

Statement 79. An embodiment of the inventive concept includes a method according to statement 77, wherein the distributed storage system node is drawn from a set including a Network Attached Solid State Drive (SSD) and an Ethernet SSD.

Statement 80. An embodiment of the inventive concept includes a method according to statement 77, further comprising performing the method only if the primary replica is performing garbage collection.

Statement 81. An embodiment of the inventive concept includes a method according to statement 80, further comprising:

comparing the local estimated time required with a threshold time; and if the local estimated time required is less than the threshold time, processing the I/O request at the primary replica.

Statement 82. An embodiment of the inventive concept includes a method according to statement 81, wherein processing the I/O request at the primary replica includes processing the I/O request at the primary replica without calculating the at least one remote estimated time required for the at least one secondary replica storing the requested data, and without comparing the local estimated time required with the at least one remote estimated time required.

Statement 83. An embodiment of the inventive concept includes a method according to statement 80, wherein calculating a local estimated time required to complete the I/O request includes:

calculating a local garbage collection time;

calculating a local predicted garbage collection time;

calculating the local estimated time required from the local garbage collection time, the local predicted garbage collection time, a local garbage collection weight, and a predicted garbage collection weight.

Statement 84. An embodiment of the inventive concept includes a method according to statement 83, wherein calculating the local estimated time required includes calculating the local estimated time required as a sum of the local garbage collection time multiplied by the local garbage collection weight and the local predicted garbage collection time multiplied by the predicted garbage collection weight.

Statement 85. An embodiment of the inventive concept includes a method according to statement 84, wherein calculating the local estimated time required further includes calculating the local estimated time required as the sum of the local garbage collection time multiplied by the local garbage collection weight and the local predicted garbage collection time multiplied by the predicted garbage collection weight, and a queue processing time multiplied by a queue processing weight.

Statement 86. An embodiment of the inventive concept includes a method according to statement 83, wherein calculating a local garbage collection time includes:

determining if the primary replica is currently undergoing garbage collection; and calculating the local garbage collection time only if the primary replica is currently undergoing garbage collection.

Statement 87. An embodiment of the inventive concept includes a method according to statement 86, wherein calculating the local garbage collection time further includes:

querying the primary replica for an actual number of free pages;

calculating a difference by subtracting the actual number of free pages from a threshold number of free pages for the primary replica;

multiplying the difference by an local average garbage collection time to determine the local garbage collection time.

Statement 88. An embodiment of the inventive concept includes a method according to statement 87, wherein calculating the local garbage collection time further includes adding a delay associated with Programming valid pages in each erase block.

Statement 89. An embodiment of the inventive concept includes a method according to statement 87, further comprising periodically querying the primary replica for an actual number of free pages.

Statement 90. An embodiment of the inventive concept includes a method according to statement 86, wherein calculating the local garbage collection time further includes calculating the local garbage collection time using at least one of historical local garbage collection information for the primary replica, a worst case estimate for local garbage collection on the primary replica, and an average case estimate for local garbage collection on the primary replica.

Statement 91. An embodiment of the inventive concept includes a method according to statement 83, wherein calculating a local predicted garbage collection time includes:

determining if the primary replica is expected to begin garbage collection shortly; and calculating the local predicted garbage collection time only if the primary replica is about to undergo garbage collection.

Statement 92. An embodiment of the inventive concept includes a method according to statement 91, wherein calculating the local predicted garbage collection time further includes:

querying the primary replica for an actual number of free pages;

calculating a difference by subtracting the actual number of free pages from a threshold number of free pages for the primary replica;

multiplying the difference by an local average garbage collection time to determine the local estimated time required.

Statement 93. An embodiment of the inventive concept includes a method according to statement 92, wherein calculating the local predicted garbage collection time further includes adding a delay associated with Programming valid pages in each erase block.

Statement 94. An embodiment of the inventive concept includes a method according to statement 92, further comprising periodically querying the primary replica for an actual number of free pages.

Statement 95. An embodiment of the inventive concept includes a method according to statement 91, wherein calculating the local predicted garbage collection time further includes calculating the local predicted garbage collection time using at least one of historical local garbage collection information for the primary replica, a worst case estimate for local garbage collection on the primary replica, and an average case estimate for local garbage collection on the primary replica.

Statement 96. An embodiment of the inventive concept includes a method according to statement 83, wherein calculating a local estimated time required to complete the I/O request further includes calculating a queue processing time.

Statement 97. An embodiment of the inventive concept includes a method according to statement 96, wherein calculating a queue processing time includes:

determining a queue depth for a queue of I/O requests pending for the primary replica; and estimating the queue processing time required to process the queue depth.

Statement 98. An embodiment of the inventive concept includes a method according to statement 97, wherein estimating the queue processing time required to process the queue depth includes:

determining a time required to process a single I/O request; and multiplying the time required to process a single I/O request by the queue depth to determine the queue processing time.

Statement 99. An embodiment of the inventive concept includes a method according to statement 98, wherein determining a time required to process a single I/O request includes determining the time required to process a single I/O request using at least one of historical processing time information for the primary replica, a worst case estimate for processing time on the primary replica, and an average case estimate for processing time on the primary replica.

Statement 100. An embodiment of the inventive concept includes a method according to statement 83, further comprising generating the local garbage collection weight and the predicted garbage collection weight.

Statement 101. An embodiment of the inventive concept includes a method according to statement 100, wherein generating the local garbage collection weight and the predicted garbage collection weight includes generating a queue processing weight.

Statement 102. An embodiment of the inventive concept includes a method according to statement 100, wherein generating the local garbage collection weight, the predicted garbage collection weight, and the queue processing weight includes generating the local garbage collection weight, the predicted garbage collection weight, and the queue processing weight using a linear regression analysis based on historical data for the primary replica.

Statement 103. An embodiment of the inventive concept includes a method according to statement 102, wherein the historical data is drawn from a sliding window of use of the primary replica.

Statement 104. An embodiment of the inventive concept includes a method according to statement 83, wherein:

calculating a local estimated time required to complete the I/O request further includes calculating a predicted local time; and calculating the local estimated time required includes calculating the local estimated time required from the local garbage collection time, the local predicted garbage collection time, the predicted local time, the local garbage collection weight, and the predicted garbage collection weight.

Statement 105. An embodiment of the inventive concept includes a method according to statement 80, wherein calculating at least one remote estimated time required for at least one secondary replica storing the requested data includes:

calculating a communication time for the at least one secondary replica;

calculating a remote processor time for the at least one secondary replica;

calculating a remote garbage collection time for the at least one secondary replica; and calculating the at least one remote estimated time required from the communication time, the remote processor time, the remote garbage collection time, a communication time weight, a remote processor time weight, and a remote garbage collection time weight.

Statement 106. An embodiment of the inventive concept includes a method according to statement 105, wherein calculating the at least one remote estimated time required includes calculating the at least one remote estimated time required as a sum of the communication time multiplied by the communication time weight, the remote processor time multiplied by the remote processor time weight, and the remote garbage collection time multiplied by the remote garbage collection time weight.

Statement 107. An embodiment of the inventive concept includes a method according to statement 105, wherein calculating a communication time for the at least one secondary replica includes one of pinging a second distributed storage system node containing the secondary replica, accessing historical information for the communication time for the at least one secondary replica, and accessing storage graph information for the distributed storage system node and the second distributed storage system node.

Statement 108. An embodiment of the inventive concept includes a method according to statement 107, further comprising periodically pinging the second distributed storage system node containing the secondary replica to determine the communication time.

Statement 109. An embodiment of the inventive concept includes a method according to statement 105, wherein calculating a remote processor time for the at least one secondary replica includes:

querying a remote processor for the at least one secondary replica for a cost for the remote processor; and mapping the cost to the remote processor time.

Statement 110. An embodiment of the inventive concept includes a method according to statement 109, wherein querying a remote processor for the at least one secondary replica for a cost for the remote processor includes querying the remote processor for the at least one secondary replica for a remote processor load.

Statement 111. An embodiment of the inventive concept includes a method according to statement 109, wherein querying a remote processor for the at least one secondary replica for a cost for the remote processor includes querying the remote processor for the at least one secondary replica for a remote software stack load.

Statement 112. An embodiment of the inventive concept includes a method according to statement 109, further comprising periodically querying the remote processor for the at least one secondary replica for the cost for the remote processor.

Statement 113. An embodiment of the inventive concept includes a method according to statement 105, wherein calculating a remote garbage collection time for the at least one secondary replica includes:

querying the at least one secondary replica for an actual number of free pages;

calculating a difference by subtracting the actual number of free pages from a threshold number of free pages for the at least one secondary replica;

multiplying the difference by an remote average garbage collection time to determine the remote garbage collection time.

Statement 114. An embodiment of the inventive concept includes a method according to statement 113, wherein calculating a remote garbage collection time for the at least one secondary replica further includes adding a delay associated with Programming valid pages in each erase block.

Statement 115. An embodiment of the inventive concept includes a method according to statement 113, further comprising periodically querying the at least one secondary replica for the actual number of free pages.

Statement 116. An embodiment of the inventive concept includes a method according to statement 105, wherein calculating a remote garbage collection time for the at least one secondary replica includes calculating the remote garbage collection time for the at least one secondary replica using at least one of historical remote garbage collection information for the at least one secondary replica, a worst case estimate for remote garbage collection on the at least one secondary replica, and an average case estimate for remote garbage collection on the at least one secondary replica.

Statement 117. An embodiment of the inventive concept includes a method according to statement 105, further comprising generating the communication time weight, the remote processor time weight, and the remote garbage collection time weight.

Statement 118. An embodiment of the inventive concept includes a method according to statement 117, wherein generating the communication time weight, the remote processor time weight, and the remote garbage collection time weight includes generating the communication time weight, the remote processor time weight, and the remote garbage collection time weight using a linear regression analysis based on historical data for the primary replica.

Statement 119. An embodiment of the inventive concept includes a method according to statement 118, wherein the historical data is drawn from a sliding window of use of the primary replica.

Statement 120. An embodiment of the inventive concept includes a method according to statement 105, wherein:
calculating at least one remote estimated time required for at least one secondary replica storing the requested data further includes calculating a predicted remote time; and
calculating the at least one remote estimated time required includes calculating the at least one remote estimated time required from the communication time, the remote processor time, the remote garbage collection time, the predicted remote time, the communication time weight, the remote processor time weight, and the remote garbage collection time weight.

Statement 121. An embodiment of the inventive concept includes an article, comprising a tangible storage medium, the tangible storage medium having stored thereon non-transitory instructions that, when executed by a machine, result in:
receiving at a distributed storage system node an Input/Output (I/O) request, the I/O request requesting data from a primary replica at the distributed storage system node, the primary replica including a storage device;
calculating a local estimated time required to complete the I/O request;
calculating at least one remote estimated time required for at least one secondary replica storing the requested data;
comparing the local estimated time required with the at least one remote estimated time required;
selecting one of the primary replica and the at least one secondary replica responsive to the lowest of the local estimated time required and the at least one remote estimated time required; and
directing the I/O request to the selected one of the primary replica and the at least one secondary replica.

Statement 122. An embodiment of the inventive concept includes an article according to statement 121, wherein receiving at a distributed storage system node an I/O request includes receiving at the distributed storage system node the I/O request, the I/O request requesting data from the primary replica at the distributed storage system node, the primary replica including a Solid State Drive (SSD).

Statement 123. An embodiment of the inventive concept includes an article according to statement 121, wherein the distributed storage system node is drawn from a set including a Network Attached Solid State Drive (SSD) and an Ethernet SSD.

Statement 124. An embodiment of the inventive concept includes an article according to statement 121, the tangible storage medium having stored thereon further non-transitory instructions that, when executed by the machine, result in performing the method only if the primary replica is performing garbage collection.

Statement 125. An embodiment of the inventive concept includes an article according to statement 124, the tangible storage medium having stored thereon further non-transitory instructions that, when executed by the machine, result in:
comparing the local estimated time required with a threshold time; and
if the local estimated time required is less than the threshold time, processing the I/O request at the primary replica.

Statement 126. An embodiment of the inventive concept includes an article according to statement 125, wherein processing the I/O request at the primary replica includes processing the I/O request at the primary replica without calculating the at least one remote estimated time required for the at least one secondary replica storing the requested data, and without comparing the local estimated time required with the at least one remote estimated time required.

Statement 127. An embodiment of the inventive concept includes an article according to statement 124, wherein calculating a local estimated time required to complete the I/O request includes:
calculating a local garbage collection time;
calculating a local predicted garbage collection time;
calculating the local estimated time required from the local garbage collection time, the local predicted garbage collection time, a local garbage collection weight, and a predicted garbage collection weight.

Statement 128. An embodiment of the inventive concept includes an article according to statement 127, wherein calculating the local estimated time required includes calculating the local estimated time required as a sum of the local garbage collection time multiplied by the local garbage collection weight and the local predicted garbage collection time multiplied by the predicted garbage collection weight.

Statement 129. An embodiment of the inventive concept includes an article according to statement 128, wherein calculating the local estimated time required further includes calculating the local estimated time required as the sum of the local garbage collection time multiplied by the local garbage collection weight and the local predicted garbage collection time multiplied by the predicted garbage collection weight, and a queue processing time multiplied by a queue processing weight.

Statement 130. An embodiment of the inventive concept includes an article according to statement 127, wherein calculating a local garbage collection time includes:
determining if the primary replica is currently undergoing garbage collection; and
calculating the local garbage collection time only if the primary replica is currently undergoing garbage collection.

Statement 131. An embodiment of the inventive concept includes an article according to statement 130, wherein calculating the local garbage collection time further includes:

querying the primary replica for an actual number of free pages;

calculating a difference by subtracting the actual number of free pages from a threshold number of free pages for the primary replica;

multiplying the difference by an local average garbage collection time to determine the local garbage collection time.

Statement 132. An embodiment of the inventive concept includes an article according to statement 131, wherein calculating the local garbage collection time further includes adding a delay associated with Programming valid pages in each erase block.

Statement 133. An embodiment of the inventive concept includes an article according to statement 131, the tangible storage medium having stored thereon further non-transitory instructions that, when executed by the machine, result in periodically querying the primary replica for an actual number of free pages.

Statement 134. An embodiment of the inventive concept includes an article according to statement 130, wherein calculating the local garbage collection time further includes calculating the local garbage collection time using at least one of historical local garbage collection information for the primary replica, a worst case estimate for local garbage collection on the primary replica, and an average case estimate for local garbage collection on the primary replica.

Statement 135. An embodiment of the inventive concept includes an article according to statement 127, wherein calculating a local predicted garbage collection time includes:

determining if the primary replica is expected to begin garbage collection shortly; and calculating the local predicted garbage collection time only if the primary replica is about to undergo garbage collection.

Statement 136. An embodiment of the inventive concept includes an article according to statement 135, wherein calculating the local predicted garbage collection time further includes:

querying the primary replica for an actual number of free pages;

calculating a difference by subtracting the actual number of free pages from a threshold number of free pages for the primary replica;

multiplying the difference by an local average garbage collection time to determine the local estimated time required.

Statement 137. An embodiment of the inventive concept includes an article according to statement 136, wherein calculating the local predicted garbage collection time further includes adding a delay associated with Programming valid pages in each erase block.

Statement 138. An embodiment of the inventive concept includes an article according to statement 136, the tangible storage medium having stored thereon further non-transitory instructions that, when executed by the machine, result in periodically querying the primary replica for an actual number of free pages.

Statement 139. An embodiment of the inventive concept includes an article according to statement 135, wherein calculating the local predicted garbage collection time further includes calculating the local predicted garbage collection time using at least one of historical local garbage collection information for the primary replica, a worst case estimate for local garbage collection on the primary replica, and an average case estimate for local garbage collection on the primary replica.

Statement 140. An embodiment of the inventive concept includes an article according to statement 127, wherein calculating a local estimated time required to complete the I/O request further includes calculating a queue processing time.

Statement 141. An embodiment of the inventive concept includes an article according to statement 140, wherein calculating a queue processing time includes:

determining a queue depth for a queue of I/O requests pending for the primary replica; and estimating the queue processing time required to process the queue depth.

Statement 142. An embodiment of the inventive concept includes an article according to statement 141, wherein estimating the queue processing time required to process the queue depth includes:

determining a time required to process a single I/O request; and multiplying the time required to process a single I/O request by the queue depth to determine the queue processing time.

Statement 143. An embodiment of the inventive concept includes an article according to statement 142, wherein determining a time required to process a single I/O request includes determining the time required to process a single I/O request using at least one of historical processing time information for the primary replica, a worst case estimate for processing time on the primary replica, and an average case estimate for processing time on the primary replica.

Statement 144. An embodiment of the inventive concept includes an article according to statement 127, the tangible storage medium having stored thereon further non-transitory instructions that, when executed by the machine, result in generating the local garbage collection weight and the predicted garbage collection weight.

Statement 145. An embodiment of the inventive concept includes an article according to statement 144, wherein generating the local garbage collection weight and the predicted garbage collection weight includes generating a queue processing weight.

Statement 146. An embodiment of the inventive concept includes an article according to statement 144, wherein generating the local garbage collection weight, the predicted garbage collection weight, and the queue processing weight includes generating the local garbage collection weight, the predicted garbage collection weight, and the queue processing weight using a linear regression analysis based on historical data for the primary replica.

Statement 147. An embodiment of the inventive concept includes an article according to statement 146, wherein the historical data is drawn from a sliding window of use of the primary replica.

Statement 148. An embodiment of the inventive concept includes an article according to statement 127, wherein:

calculating a local estimated time required to complete the I/O request further includes calculating a predicted local time; and calculating the local estimated time required includes calculating the local estimated time required from the local garbage collection time, the local predicted garbage collection time, the predicted local time, the local garbage collection weight, and the predicted garbage collection weight.

Statement 149. An embodiment of the inventive concept includes an article according to statement 124, wherein calculating at least one remote estimated time required for at least one secondary replica storing the requested data includes:

calculating a communication time for the at least one secondary replica;

calculating a remote processor time for the at least one secondary replica;

calculating a remote garbage collection time for the at least one secondary replica; and calculating the at least one remote estimated time required from the communication time, the remote processor time, the remote garbage collection time, a communication time weight, a remote processor time weight, and a remote garbage collection time weight.

Statement 150. An embodiment of the inventive concept includes an article according to statement 149, wherein calculating the at least one remote estimated time required includes calculating the at least one remote estimated time required as a sum of the communication time multiplied by the communication time weight, the remote processor time multiplied by the remote processor time weight, and the remote garbage collection time multiplied by the remote garbage collection time weight.

Statement 151. An embodiment of the inventive concept includes an article according to statement 149, wherein calculating a communication time for the at least one secondary replica includes one of pinging a second distributed storage system node containing the secondary replica, accessing historical information for the communication time for the at least one secondary replica, and accessing storage graph information for the distributed storage system node and the second distributed storage system node.

Statement 152. An embodiment of the inventive concept includes an article according to statement 151, the tangible storage medium having stored thereon further non-transitory instructions that, when executed by the machine, result in periodically pinging the second distributed storage system node containing the secondary replica to determine the communication time.

Statement 153. An embodiment of the inventive concept includes an article according to statement 149, wherein calculating a remote processor time for the at least one secondary replica includes:

querying a remote processor for the at least one secondary replica for a cost for the remote processor; and mapping the cost to the remote processor time.

Statement 154. An embodiment of the inventive concept includes an article according to statement 153, wherein querying a remote processor for the at least one secondary replica for a cost for the remote processor includes querying the remote processor for the at least one secondary replica for a remote processor load.

Statement 155. An embodiment of the inventive concept includes an article according to statement 153, wherein querying a remote processor for the at least one secondary replica for a cost for the remote processor includes querying the remote processor for the at least one secondary replica for a remote software stack load.

Statement 156. An embodiment of the inventive concept includes an article according to statement 153, the tangible storage medium having stored thereon further non-transitory instructions that, when executed by the machine, result in periodically querying the remote processor for the at least one secondary replica for the cost for the remote processor.

Statement 157. An embodiment of the inventive concept includes an article according to statement 149, wherein calculating a remote garbage collection time for the at least one secondary replica includes:

querying the at least one secondary replica for an actual number of free pages;

calculating a difference by subtracting the actual number of free pages from a threshold number of free pages for the at least one secondary replica;

multiplying the difference by an remote average garbage collection time to determine the remote garbage collection time.

Statement 158. An embodiment of the inventive concept includes an article according to statement 157, wherein calculating a remote garbage collection time for the at least one secondary replica further includes adding a delay associated with Programming valid pages in each erase block.

Statement 159. An embodiment of the inventive concept includes an article according to statement 157, the tangible storage medium having stored thereon further non-transitory instructions that, when executed by the machine, result in periodically querying the at least one secondary replica for the actual number of free pages.

Statement 160. An embodiment of the inventive concept includes an article according to statement 149, wherein calculating a remote garbage collection time for the at least one secondary replica includes calculating the remote garbage collection time for the at least one secondary replica using at least one of historical remote garbage collection information for the at least one secondary replica, a worst case estimate for remote garbage collection on the at least one secondary replica, and an average case estimate for remote garbage collection on the at least one secondary replica.

Statement 161. An embodiment of the inventive concept includes an article according to statement 149, the tangible storage medium having stored thereon further non-transitory instructions that, when executed by the machine, result in generating the communication time weight, the remote processor time weight, and the remote garbage collection time weight.

Statement 162. An embodiment of the inventive concept includes an article according to statement 161, wherein generating the communication time weight, the remote processor time weight, and the remote garbage collection time weight includes generating the communication time weight, the remote processor time weight, and the remote garbage collection time weight using a linear regression analysis based on historical data for the primary replica.

Statement 163. An embodiment of the inventive concept includes an article according to statement 162, wherein the historical data is drawn from a sliding window of use of the primary replica.

Statement 164. An embodiment of the inventive concept includes an article according to statement 149, wherein:

calculating at least one remote estimated time required for at least one secondary replica storing the requested data further includes calculating a predicted remote time; and calculating the at least one remote estimated time required includes calculating the at least one remote estimated time required from the communication time, the remote processor time, the remote garbage collection time, the predicted remote time, the communication time weight, the remote processor time weight, and the remote garbage collection time weight.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A distributed storage system node, comprising:
at least one storage device, the at least one storage device including a primary replica of data;
an analyzer to calculate a local estimated time to complete an Input/Output (I/O) request using the primary replica and pending I/O requests and at least one remote estimated time to complete the I/O request using at least one secondary replica of the data, the at least one remote estimated time based at least in part on a communication time to the at least one secondary replica; and
a redirector to direct the I/O request to one of the primary replica and the at least one secondary replica based on the local estimated time and the at least one remote estimated time.

2. A distributed storage system node according to claim 1, wherein the distributed storage system node is drawn from a set including a Network Attached Solid State Drive (SSD) and an Ethernet SSD.

3. A distributed storage system node according to claim 1, wherein the redirector is operative to redirect the I/O request based at least in part on the at least one storage device performing garbage collection.

4. A distributed storage system node according to claim 3, wherein:
the analyzer includes a local time estimator to calculate the local estimated time to process the I/O request using the primary replica; and
the redirector includes:
storage to store a threshold time; and
a first comparator to compare the local estimated time with the threshold time.

5. A distributed storage system node according to claim 4, wherein the local time estimator includes:
a local time calculator to calculate a local garbage collection time;
a local predicted time calculator to calculate a local predicted garbage collection time;
storage to store a local garbage collection weight and a predicted garbage collection weight; and
a local estimated time calculator to calculate a local estimated time based in part on at least one of the local garbage collection time, the local predicted garbage collection time, the local garbage collection weight, or the predicted garbage collection weight.

6. A distributed storage system node according to claim 5, wherein:
the analyzer further comprises:
query logic to query the primary replica for an actual number of free pages; and
reception logic to receive from the primary replica the actual number of free pages; and
the local time calculator to calculate a difference by subtracting the actual number of free pages from a threshold number of free pages for the primary replica and to calculate the local garbage collection time by multiplying the difference by a local average garbage collection time.

7. A distributed storage system node according to claim 6, wherein the local time calculator is further operative to add a delay associated with programming valid pages in an erase block to the local garbage collection time.

8. A distributed storage system node according to claim 5, wherein the analyzer further includes:
a database storing information including at least one of historical local garbage collection information for the primary replica, a worst case estimate for local garbage collection on the primary replica, an average case estimate for local garbage collection on the primary replica, historical processing time information for the primary replica, a worst case estimate for processing time on the primary replica, and an average case estimate for processing time on the primary replica; and
a predictive analyzer to calculate a predicted local time for the primary replica from the information stored in the database.

9. A distributed storage system node according to claim 4, wherein:
the analyzer further includes a remote time estimator to calculate the at least one remote estimated time to process the I/O request using the at least one secondary replica; and
the redirector further includes:
a second comparator to compare the local estimated time with the at least one remote estimated time; and
a selector to select one of the primary replica and the at least one secondary replica to process the I/O request with a minimum time from the local estimated time and the at least one remote estimated time.

10. A distributed storage system node according to claim 9, wherein the remote time estimator includes:
a communication time calculator to calculate a communication time between the distributed storage system node and at least one secondary storage system node including the at least one secondary replica;
a remote processor time calculator to calculate a remote processor time for the at least one secondary storage system node;
a remote time calculator to calculate a remote garbage collection time for the at least one secondary replica;
storage to store a communication time weight, a remote processor time weight, and a remote garbage collection time weight; and
a remote estimated time calculator to calculate the remote estimated time based in part on at least one of the communication time, the remote processor time, the remote garbage collection time, the communication time weight, the remote processor time weight, or the remote garbage collection time weight.

11. A distributed storage system node according to claim 4, wherein the redirector is operative to direct the I/O request to one of the at least one secondary replica based at least in part on the local estimated time exceeding the threshold time.

12. A distributed storage system node according to claim 4, wherein the redirector is operative to direct the I/O request to the primary replica based at least in part on the local estimated time not exceeding the threshold time.

13. A distributed storage system node according to claim 1, wherein the redirector is operative to direct the I/O request to the primary replica based at least in part on the at least one remote estimated time exceeding the local estimated time.

14. A distributed storage system node according to claim 1, wherein the redirector is operative to direct the I/O request to the at least one secondary replica based at least in part on the local estimated time exceeding the at least one remote estimated time.

15. A method, comprising:
receiving at a distributed storage system node an Input/Output (I/O) request, the I/O request requesting data from a primary replica at the distributed storage system node, the primary replica including a storage device;
calculating a local estimated time to complete the I/O request and pending I/O requests;
calculating at least one remote estimated time for at least one secondary replica storing the requested data based at least in part on a communication time to the at least one secondary replica;
comparing the local estimated time with the at least one remote estimated time;
selecting one of the primary replica and the at least one secondary replica based on the lowest of the local estimated time and the at least one remote estimated time; and
directing the I/O request to the selected one of the primary replica and the at least one secondary replica.

16. A method according to claim 15, wherein the distributed storage system node is drawn from a set including a Network Attached Solid State Drive (SSD) and an Ethernet SSD.

17. A method according to claim 15, further comprising performing the method based at least in part on the primary replica performing garbage collection.

18. A method according to claim 17, wherein calculating a local estimated time to complete the I/O request includes:
calculating a local garbage collection time;
calculating a local predicted garbage collection time;
calculating the local estimated time based at least in part on the local garbage collection time, the local predicted garbage collection time, a local garbage collection weight, or a predicted garbage collection weight.

19. A method according to claim 17, wherein calculating at least one remote estimated time for at least one secondary replica storing the requested data includes:
calculating a communication time for the at least one secondary replica;
calculating a remote processor time for the at least one secondary replica;
calculating a remote garbage collection time for the at least one secondary replica; and
calculating the at least one remote estimated time based at least in part on the communication time, the remote processor time, the remote garbage collection time, a communication time weight, a remote processor time weight, or a remote garbage collection time weight.

20. A distributed storage system node, comprising:
at least one storage device, the at least one storage device including a primary replica of data;
an analyzer to calculate a local estimated time to complete an Input/Output (I/O) request using the primary replica and at least one remote estimated time to complete the I/O request using at least one secondary replica of the data, the analyzer including a local time estimator to calculate the local estimated time to process the I/O request using the primary replica, the at least one remote estimated time based at least in part on a communication time to the at least one secondary replica; and
a redirector to direct the I/O request to one of the primary replica and the at least one secondary replica based on the local estimated time and the at least one remote estimated time, the redirector including:
storage to store a threshold time; and
a first comparator to compare the local estimated time with the threshold time.

21. A method, comprising:
receiving at a distributed storage system node an Input/Output (I/O) request, the I/O request requesting data from a primary replica at the distributed storage system node, the primary replica including a storage device;
calculating a local estimated time to complete the I/O request and pending I/O requests, including:
calculating a local garbage collection time;
calculating a local predicted garbage collection time; and
calculating the local estimated time based at least in part on the local garbage collection time, the local predicted garbage collection time, a local garbage collection weight, or a predicted garbage collection weight;
calculating at least one remote estimated time for at least one secondary replica storing the requested data;
comparing the local estimated time with the at least one remote estimated time;
selecting one of the primary replica and the at least one secondary replica based on the lowest of the local estimated time and the at least one remote estimated time; and
directing the I/O request to the selected one of the primary replica and the at least one secondary replica.

* * * * *